(12) United States Patent
Zhou et al.

(10) Patent No.: US 11,996,923 B2
(45) Date of Patent: May 28, 2024

(54) USER EQUIPMENT CAPABILITY SIGNALING FOR ENHANCED BEAM MANAGEMENT FEATURES

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/819,804

(22) Filed: Aug. 15, 2022

(65) Prior Publication Data

US 2023/0121938 A1   Apr. 20, 2023

Related U.S. Application Data

(60) Provisional application No. 63/261,856, filed on Sep. 30, 2021.

(51) Int. Cl.
*H04B 7/06*  (2006.01)
*H04B 7/08*  (2006.01)
*H04W 72/23* (2023.01)

(52) U.S. Cl.
CPC ......... *H04B 7/0628* (2013.01); *H04B 7/0695* (2013.01); *H04B 7/088* (2013.01); *H04W 72/23* (2023.01)

(58) Field of Classification Search
CPC .... H04B 7/0628; H04B 7/0695; H04B 7/088; H04W 72/23
See application file for complete search history.

(56) References Cited

U.S. PATENT DOCUMENTS

| 2021/0037529 A1* | 2/2021 | Park | H04W 8/24 |
| 2021/0044956 A1* | 2/2021 | Kim | H04L 1/1854 |
| 2021/0235434 A1* | 7/2021 | Raghavan | H04B 7/06966 |

(Continued)

FOREIGN PATENT DOCUMENTS

WO   2020209597 A1   10/2020

OTHER PUBLICATIONS

International Search Report and Written Opinion—PCT/US2022/075018—ISA/EPO—dated Oct. 28, 2022.

(Continued)

*Primary Examiner* — Jaison Joseph
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may transmit a capability message indicating at least one of parameters associated with one or more beam management features or whether the UE supports the one or more beam management features, the one or more beam management features including a unified transmission configuration indicator (TCI) state, inter-cell beam measurements, antenna-panel-specific uplink transmissions, or multiple transmission reception point (TRP) beam failure recovery. The UE may receive configuration information for at least one beam management feature based at least in part on transmitting the capability message. Numerous other aspects are provided.

20 Claims, 10 Drawing Sheets

(56) References Cited

U.S. PATENT DOCUMENTS

| | | | |
|---|---|---|---|
| 2021/0250821 A1 | 8/2021 | Ryu et al. | |
| 2022/0166468 A1* | 5/2022 | Go | H04B 7/0456 |
| 2023/0262608 A1* | 8/2023 | Gao | H04W 52/146 |
| | | | 455/522 |
| 2023/0292144 A1* | 9/2023 | Ying | H04L 5/0035 |
| | | | 370/329 |
| 2023/0318795 A1* | 10/2023 | Xu | H04L 5/0035 |
| | | | 370/329 |

OTHER PUBLICATIONS

Moderator (Samsung): "Moderator Summary or Multi-Beam Enhancement", 3GPP TSG RAN WG1 #104-e, R1-2101185, 3rd Generation Partnership Project (3GPP), Mobile Competence Centre, 650, Route Des Lucioles, F-06921, Sophia-Antipolis Cedex, France, vol. RAN WG1. No. e-Meeting, Jan. 25-Feb. 5, 2021, Jan. 26, 2021, XP051975854, p. 11, last row of the table, 37 Pages.

* cited by examiner

USER EQUIPMENT CAPABILITY SIGNALING FOR ENHANCED BEAM MANAGEMENT FEATURES

CROSS-REFERENCE TO RELATED APPLICATION

This Patent Application claims priority to U.S. Provisional Patent Application No. 63/261,856, filed on Sep. 30, 2021, entitled "USER EQUIPMENT CAPABILITY SIGNALING FOR ENHANCED BEAM MANAGEMENT FEATURES," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for user equipment (UE) capability signaling for enhanced beam management features.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, a user equipment (UE) and a base station may perform one or more beam management operations to select one or more beams for communications between the UE and the base station. A beam management operation may include a beam selection operation, a beam training operation, or a beam refinement operation, among other examples. In some cases, beam management may be associated with different features or operations. In some cases, additional operations or features for beam management may be added or supported by a wireless network (for example, by the base station) over time. For example, the wireless network may support one or more additional operations or features for beam management at a later time that were not supported by the wireless network at an earlier time. As a result, some UEs deployed in the wireless network may support the one or more additional operations or features while other UEs deployed in the wireless network may not support the one or more additional operations or features. Furthermore, the one or more additional operations or features associated with beam management may use information or parameters that were not previously used for beam management. For examples, enhanced or advanced beam management operations or features may use additional information to ensure that the enhanced or advanced beam management operations can be performed or can be performed efficiently and effectively. For example, beam management operations or features associated with inter-cell beam management may use different values for parameters or different parameters than intra-cell beam management.

A base station may configure beam management operations or features for a given UE based at least in part on a capability of the UE. Because the base station may support one or more additional beam management operations or features at a later time that were not supported by the wireless network at an earlier time, some UEs deployed in the wireless network may not indicate a capability to support the one or more additional beam management operations. Additionally or alternatively, some UEs deployed in the wireless network may not indicate capability parameters or information that are used for the one or more beam management operations. As a result, the base station may be unable to configure the one or more additional beam management operations, may configure the one or more additional beam management operations for UEs that are unable to support the one or more additional beam management operations, or may configure the one or more additional beam management operations for a UE using a value for a parameter that is not supported by the UE, among other examples. Therefore, network performance may be degraded because the base station and a UE may be unable to perform the one or more additional beam management operations. Additionally or alternatively, the base station may consume resources (for example, network resources, radio resources, or processing resources) performing the one or more additional beam management operations with a UE that is unable to support the one or more additional beam management operations or is unable to support a value of a parameter associated with the one or more additional beam management operations.

SUMMARY

Some aspects described herein relate to a user equipment (UE) for wireless communication. The UE may include at least one memory and at least one processor, communicatively coupled with the at least one memory. The at least one processor may be configured to cause the UE to transmit, to a base station, a capability message, associated with one or more beam management features, indicating at least one of parameters associated with the one or more beam management features or whether the UE supports the one or more beam management features, the one or more beam management features including at least one of: a unified transmission configuration indicator (TCI) state, inter-cell beam measurements, antenna-panel-specific uplink transmissions, or multiple transmission reception point (TRP) beam failure recovery. The at least one processor may be configured to cause the user equipment to receive, from the base station, configuration information for at least one beam management feature, of the one or more beam management features, based at least in part on transmitting the capability message.

Some aspects described herein relate to a base station for wireless communication. The base station may include at least one memory and at least one processor, communicatively coupled with the at least one memory. The at least one processor may be configured to cause the base station to receive, from a UE, a capability message, associated with one or more beam management features, indicating at least one of parameters associated with the one or more beam management features or whether the UE supports the one or more beam management features, the one or more beam management features including at least one of: a unified TCI state, inter-cell beam measurements, antenna-panel-specific uplink transmissions, or multiple TRP beam failure recovery. The processor-readable code, when executed by the at least one processor, may be configured to cause the base station to transmit, to the UE, configuration information for at least one beam management feature, of the one or more beam management features, based at least in part on transmitting the capability message.

Some aspects described herein relate to a method of wireless communication performed by a UE. The method may include transmitting, to a base station, a capability message, associated with one or more beam management features, indicating at least one of parameters associated with the one or more beam management features or whether the UE supports the one or more beam management features, the one or more beam management features including at least one of: a unified TCI state, inter-cell beam measurements, antenna-panel-specific uplink transmissions, or multiple TRP beam failure recovery. The method may include receiving, from the base station, configuration information for at least one beam management feature, of the one or more beam management features, based at least in part on transmitting the capability message.

Some aspects described herein relate to a method of wireless communication performed by a base station. The method may include receiving, from a UE, a capability message, associated with one or more beam management features, indicating at least one of parameters associated with the one or more beam management features or whether the UE supports the one or more beam management features, the one or more beam management features including at least one of: a unified TCI state, inter-cell beam measurements, antenna-panel-specific uplink transmissions, or multiple TRP beam failure recovery. The method may include transmitting, to the UE, configuration information for at least one beam management feature, of the one or more beam management features, based at least in part on transmitting the capability message.

Some aspects described herein relate to a non-transitory computer-readable medium that stores a set of instructions for wireless communication by a UE. The set of instructions, when executed by one or more processors of the UE, may cause the UE to transmit, to a base station, a capability message, associated with one or more beam management features, indicating at least one of parameters associated with the one or more beam management features or whether the UE supports the one or more beam management features, the one or more beam management features including at least one of: a unified TCI state, inter-cell beam measurements, antenna-panel-specific uplink transmissions, or multiple TRP beam failure recovery. The set of instructions, when executed by one or more processors of the UE, may cause the UE to receive, from the base station, configuration information for at least one beam management feature, of the one or more beam management features, based at least in part on transmitting the capability message.

Some aspects described herein relate to a non-transitory computer-readable medium that stores a set of instructions for wireless communication by a base station. The set of instructions, when executed by one or more processors of the base station, may cause the base station to receive, from a UE, a capability message, associated with one or more beam management features, indicating at least one of parameters associated with the one or more beam management features or whether the UE supports the one or more beam management features, the one or more beam management features including at least one of: a unified TCI state, inter-cell beam measurements, antenna-panel-specific uplink transmissions, or multiple TRP beam failure recovery. The set of instructions, when executed by one or more processors of the base station, may cause the base station to transmit, to the UE, configuration information for at least one beam management feature, of the one or more beam management features, based at least in part on transmitting the capability message.

Some aspects described herein relate to an apparatus for wireless communication. The apparatus may include means for transmitting, to a base station, a capability message, associated with one or more beam management features, indicating at least one of parameters associated with the one or more beam management features or whether the apparatus supports the one or more beam management features, the one or more beam management features including at least one of: a unified TCI state, inter-cell beam measurements, antenna-panel-specific uplink transmissions, or multiple TRP beam failure recovery. The apparatus may include means for receiving, from the base station, configuration information for at least one beam management feature, of the one or more beam management features, based at least in part on transmitting the capability message.

Some aspects described herein relate to an apparatus for wireless communication. The apparatus may include means for receiving, from a UE, a capability message, associated with one or more beam management features, indicating at least one of parameters associated with the one or more beam management features or whether the UE supports the one or more beam management features, the one or more beam management features including at least one of: a unified TCI state, inter-cell beam measurements, antenna-panel-specific uplink transmissions, or multiple TRP beam failure recovery. The apparatus may include means for transmitting, to the UE, configuration information for at least one beam management feature, of the one or more beam management features, based at least in part on transmitting the capability message.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
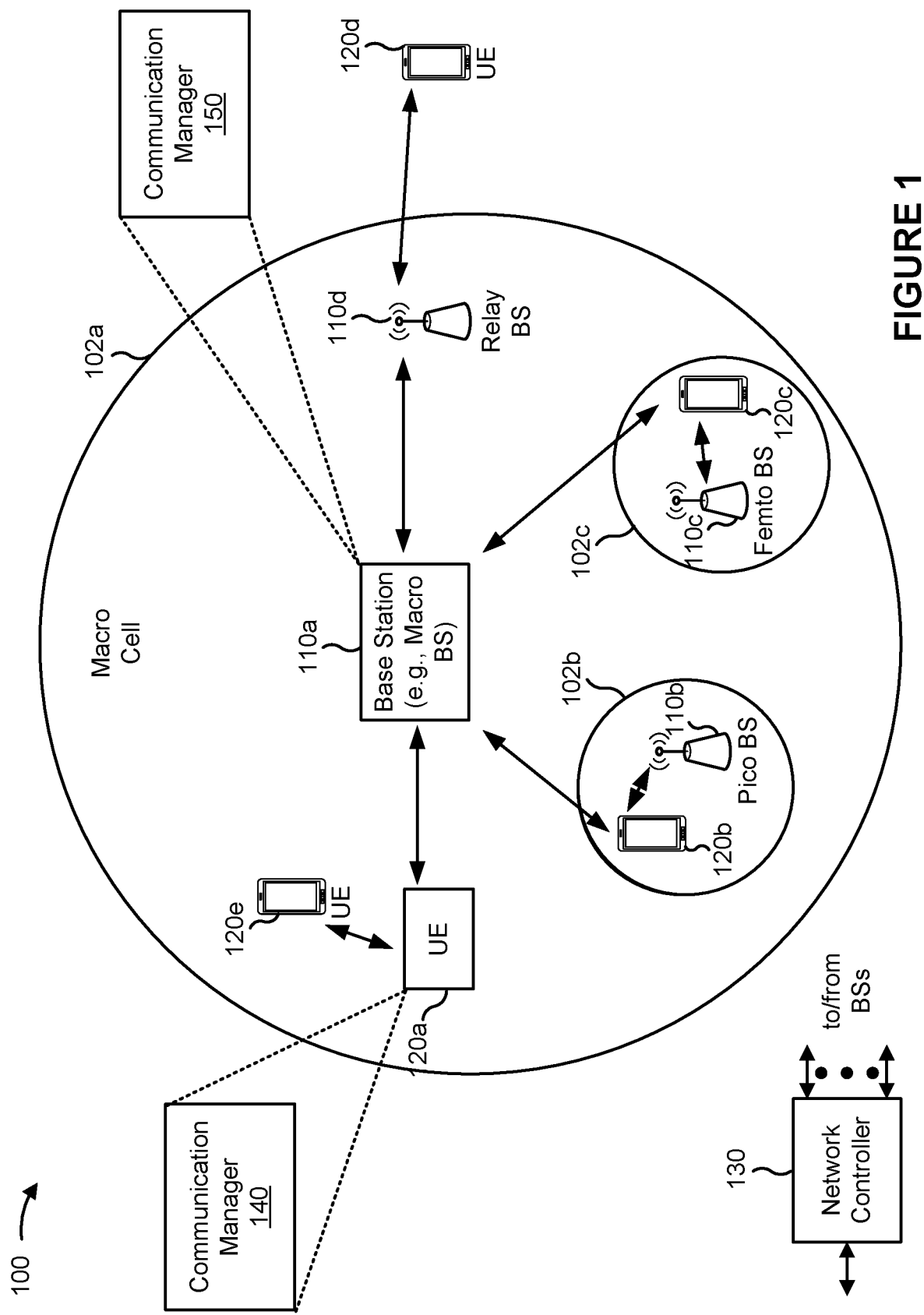
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to user equipment (UE) capability signaling for enhanced beam management features or operations. In some aspects, a UE may transmit a capability message indicating at least one of parameters associated with one or more enhanced beam management features or operations, or indicating whether the UE supports the one or more enhanced beam management features or operations. As used herein, "enhanced beam management feature" or "enhanced beam management operation," which are used interchangeably herein, may refer to a beam management feature or a beam management operation that is supported by some, but not all, UEs deployed within a wireless network. In some aspects, the one or more enhanced beam management features may include support for a unified transmission configuration indicator (TCI) state for providing beam information for both uplink beams and downlink beams, an ability to receive inter-cell beam indications for indicating a beam using a reference signal associated with a non-serving cell, an ability to perform or report inter-cell beam measurements, an ability to transmit an enhanced power management maximum power reduction (P-MPR) report, an ability to support or transmit antenna-panel-specific uplink transmissions, an ability to support report-based beam updates for selecting or activating a beam based on a report transmitted by the UE (for example, without receiving additional signaling from a base station), an ability to transmit a group-based beam report (for example, that includes multiple groups of beams), an ability to perform multiple transmission reception point (TRP) beam failure recovery, or support for enhanced quasi co-location (QCL) rules for multiple physical downlink shared channel (PDSCH) transmissions, among other examples.

The capability message transmitted by the UE may enable the base station to configure or perform the one or more enhanced beam management features or operations. In some aspects, the UE may indicate a capability of the UE for a beam management operation or feature for each physical channel, for each component carrier (CC) configured for the UE, for each bandwidth part (BWP) configured for the UE, or for each reference signal resource or reference signal resource set, among other examples. In some aspects, the UE may indicate a first capability associated with inter-cell beam management for a beam management feature or operation and may indicate a second capability associated with intra-cell beam management for the beam management feature or operation. In some additional aspects, the UE may indicate a quantity of non-serving cells that can be supported by the UE for inter-cell beam management. In some aspects, the UE may indicate one or more types of TCI states supported by the UE, a quantity of configured TCI states supported by the UE, or information associated with a source reference signal for TCI states (for example, whether the UE supports a source reference signal for a TCI state that is associated with a non-serving cell), among other examples. The above-described capabilities are provided as examples and UE capabilities associated with the one or more enhanced beam management features or operations are described in more detail elsewhere herein.

Particular aspects of the subject matter described in this disclosure can be implemented to realize one or more of the following potential advantages. In some examples, the described techniques can be used to improve beam management operations between a UE and a base station. More specifically, performing one or more enhanced beam management operations or implementing one or more enhanced beam management features may improve beam management within the wireless network and may result in improved network performance. For example, performing the one or more enhanced beam management operations may increase the efficiency of beam management operations, or reduce complexity associated with beam management operations, among other examples.

FIG. 1 is a diagram illustrating an example of a wireless network 100 in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, to a base station, a capability message, associated with one or more beam management features, indicating at least one of parameters associated with the one or more beam management features or whether the UE 120 supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions; and receive, from the base station, configuration information for at least one beam management feature, of the one or more beam management features, based at least in part on transmitting the capability message. Additionally or alternatively, the communication manager 140 may perform one or more other operations described herein.

In some aspects, the base station 110 may include a communication manager 150. As described in more detail elsewhere herein, the communication manager 150 may receive, from a UE, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions; and transmit, to the UE, configuration information for at least one beam management feature, of the one or more beam management features, based at least in part on transmitting the capability message. Additionally or alternatively, the communication manager 150 may perform one or more other operations described herein.

Figure 2:
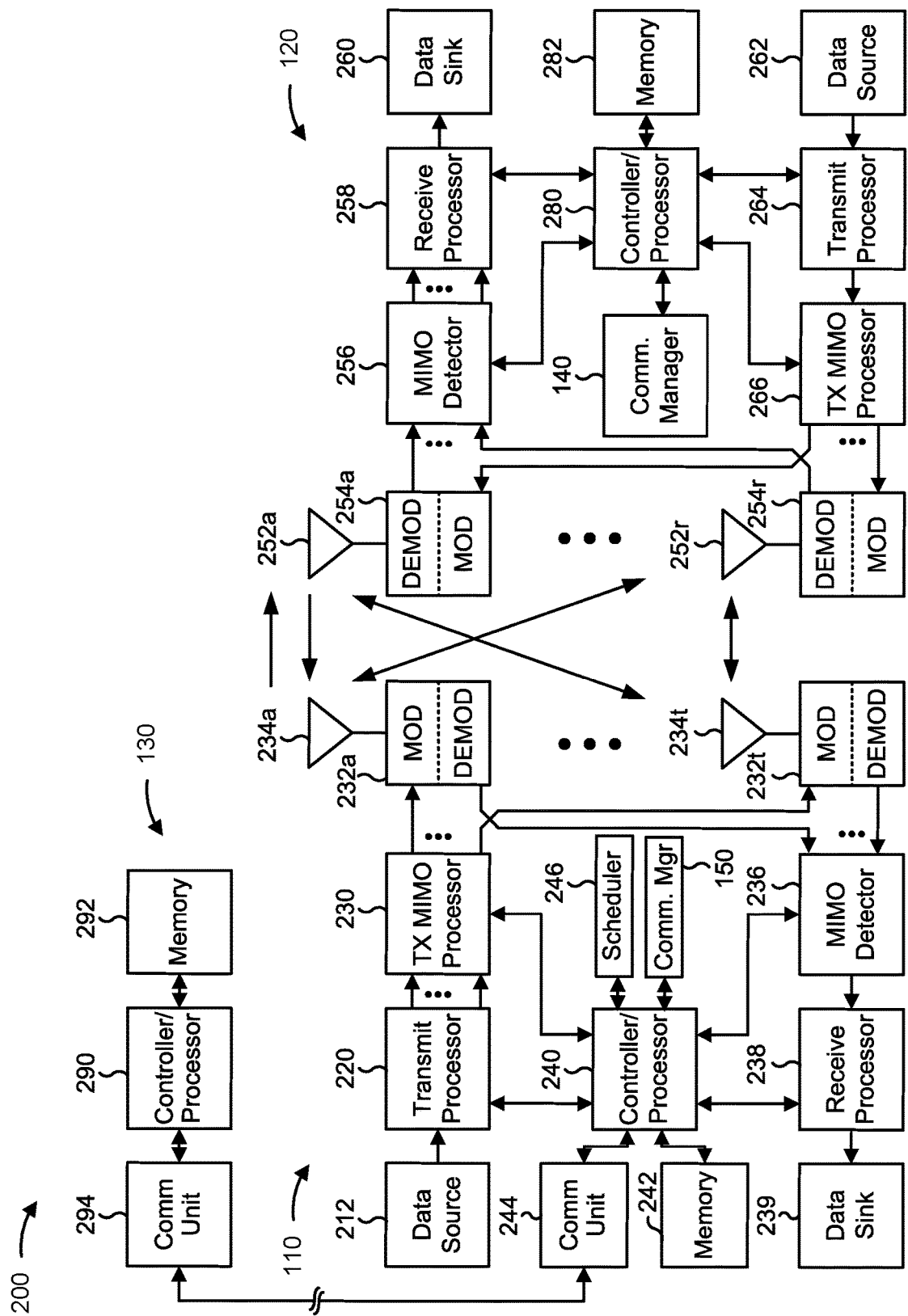
FIG. 2 is a diagram illustrating an example base station in communication with a user equipment (UE) in a wireless network in accordance with the present disclosure.

FIG. 2 is a diagram 200 illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the base station 110 or other base stations 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with UE capability signaling for enhanced beam management features, as described in more detail elsewhere herein. For example, the controller/processor 240 of the base station 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

In some aspects, the UE 120 includes means for transmitting, to a base station, a capability message, associated with one or more beam management features, indicating at least one of parameters associated with the one or more beam management features or whether the UE 120 supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions; or means for receiving, from the base station, configuration information for at least one beam management feature, of the one or more beam management features, based at least in part on transmitting the capability message. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions; or means for transmitting, to the UE, configuration information for at least one beam management feature, of the one or more beam management features, based at least in part on transmitting the capability message. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
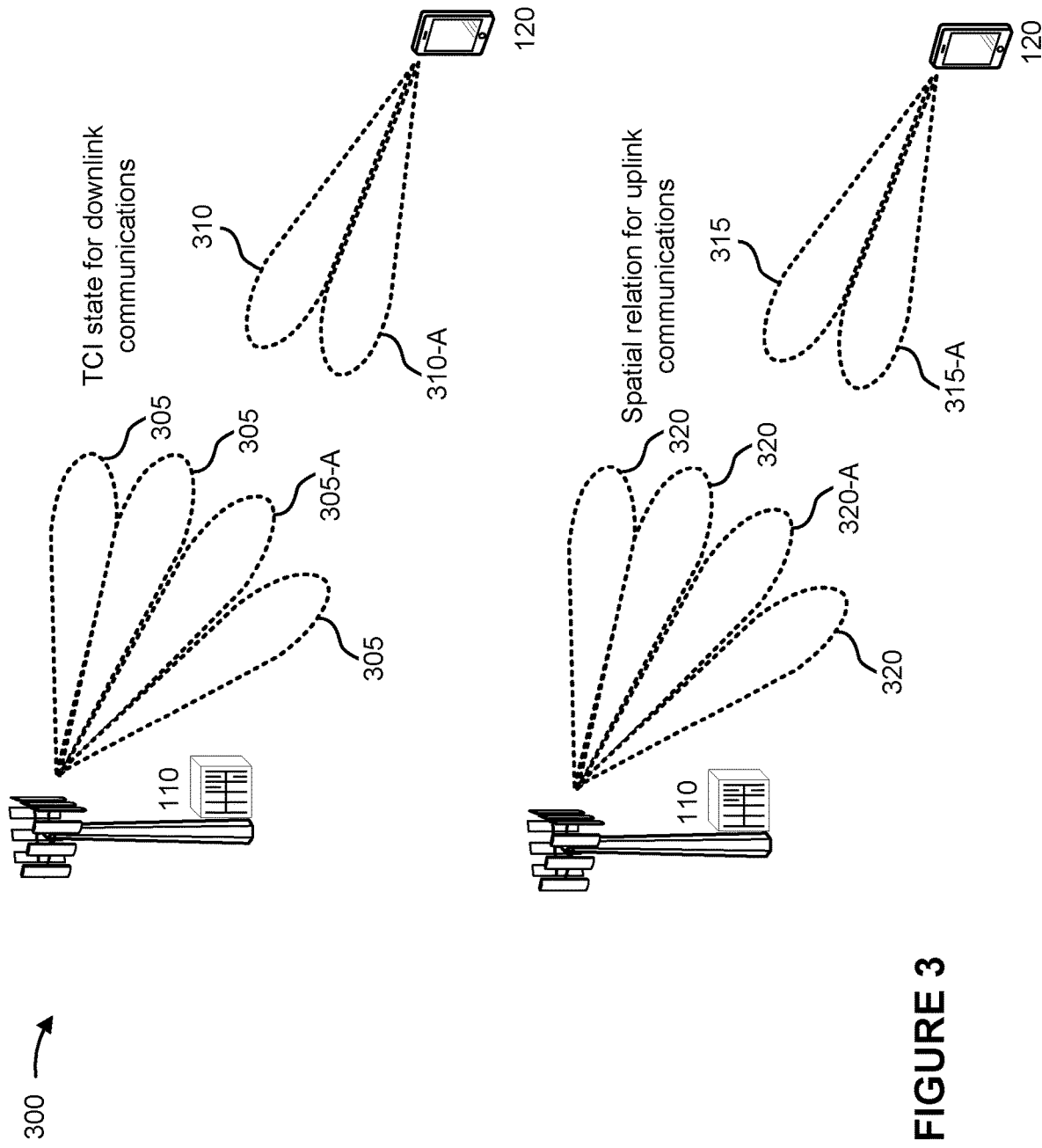
FIG. 3 is a diagram illustrating an example of using beams for communications between a base station and a UE, in accordance with the present disclosure.

FIG. 3 is a diagram illustrating an example of using beams for communications 300 between a base station and a UE, in accordance with the present disclosure. As shown in FIG. 3, a base station 110 and a UE 120 may communicate with one another in a wireless network, such as the wireless network 100.

The base station 110 may transmit to UEs 120 located within a coverage area of the base station 110. The base station 110 and the UE 120 may be configured for beamformed communications, where the base station 110 may transmit in the direction of the UE 120 using a directional base station transmit beam, and the UE 120 may receive the transmission using a directional UE receive beam. Each base station transmit beam may have an associated beam ID, beam direction, or beam symbols, among other examples. The base station 110 may transmit downlink communications via one or more base station transmit beams 305.

The UE 120 may attempt to receive downlink transmissions via one or more UE receive beams 310, which may be configured using different beamforming parameters at receive circuitry of the UE 120. The UE 120 may identify a particular base station transmit beam 305, shown as base station transmit beam 305-A, and a particular UE receive beam 310, shown as UE receive beam 310-A, that provide relatively favorable performance (for example, that have a best channel quality of the different measured combinations of base station transmit beams 305 and UE receive beams 310). In some examples, the UE 120 may transmit an indication of which base station transmit beam 305 is identified by the UE 120 as a selected base station transmit beam, which the base station 110 may select for transmissions to the UE 120. The UE 120 may thus attain and maintain a beam pair link (BPL) with the base station 110 for downlink communications (for example, a combination of the base station transmit beam 305-A and the UE receive beam 310-A), which may be further refined and maintained in accordance with one or more established beam refinement procedures.

A downlink beam, such as a base station transmit beam 305 or a UE receive beam 310, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each base station transmit beam 305 may be associated with a synchronization signal block (SSB), and the UE 120 may indicate a selected base station transmit beam 305 by transmitting uplink transmissions in resources of the SSB that are associated with the selected base station transmit beam 305. A particular SSB may have an associated TCI state (for example, for an antenna port or for beamforming). The base station 110 may, in some examples, indicate a downlink base station transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a base station transmit beam 305 via a TCI indication. For example, a TCI state information element may indicate a TCI state identification (such as a tci-StateID), a QCL type (such as a qcl-Type1, qcl-Type2, qcl-TypeA, a qcl-TypeB, a qcl-TypeC, or a qcl-TypeD), a cell identification (such as a ServCellIndex), a bandwidth part identification (such as a bwp-Id), or a reference signal identification (such as an NZP-CSI-RS-ResourceId or an SSB-Index), among other examples.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional base station receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more base station receive beams 320. The base station 110 may identify a particular UE transmit beam 315, shown as UE transmit beam 315-A, and a particular base station receive beam 320, shown as base station receive beam 320-A, that provide relatively favorable performance (for example, that have a best channel quality of the different measured combinations of UE transmit beams 315 and base station receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the base station receive beam 320-A), which may be further refined and maintained in accordance with one or more established beam refinement procedures. An uplink beam, such as a UE transmit beam 315 or a base station receive beam 320, may be associated with a spatial relation. A spatial relation may indicate a directionality or a characteristic of the uplink beam, similar to one or more QCL properties, as described above.

In a unified TCI framework, the network (for example, the base station 110) may support common TCI state identifier (ID) update and activation to provide common QCL information or common uplink transmission spatial filter or filters across a set of configured component carriers (CCs). This type of beam indication may apply to intra-band CA, as well as to joint DL/UL and separate downlink/uplink beam indications. The common TCI state ID may imply that one reference signal (RS) determined in accordance with the TCI state(s) indicated by a common TCI state ID is used to provide QCL Type-D indication and to determine UL transmission spatial filters across the set of configured CCs. In a unified TCI state framework, a TCI state may be provided for downlink beams and uplink beams. In some cases, a joint uplink and downlink TCI state may be defined that indicates a common beam for both uplink communications and downlink communications. In some examples, separate TCI states may be defined for uplink communications and downlink communications, such as one or more uplink TCI states and one or more downlink TCI states.

Some networks may use different beam indication types for indicating one or more beams to use for communication via a set of channels. In some examples, types of beam indication types may include a beam indication that indicates to use a common beam for multiple channels or resources for reference signals, or beam indication types that include a single beam indication that indicates to use a beam for a single channel or a resource for reference signals.

A first beam indication type may indicate a joint uplink/downlink TCI state to indicate a common beam for at least one downlink channel or resource for downlink reference signals and for at least one uplink channel or resource for uplink reference signals. A second beam indication may indicate a separate downlink common TCI state to indicate a common beam for at least two downlink channels or resources for downlink reference signals. A third beam indication type may indicate a separate uplink common TCI state to indicate a common beam for at least two uplink channels or resources for uplink reference signals.

A fourth beam indication type may indicate a single TCI state to indicate a single beam for a single downlink channel or resource for downlink reference signals. A fifth beam indication type may indicate a single TCI state to indicate a single beam for a single uplink channel or resource for uplink reference signals. A sixth beam indication type may indicate a single uplink spatial relation to indicate a single beam for a single uplink channel or resource for uplink reference signals.

Figure 4:
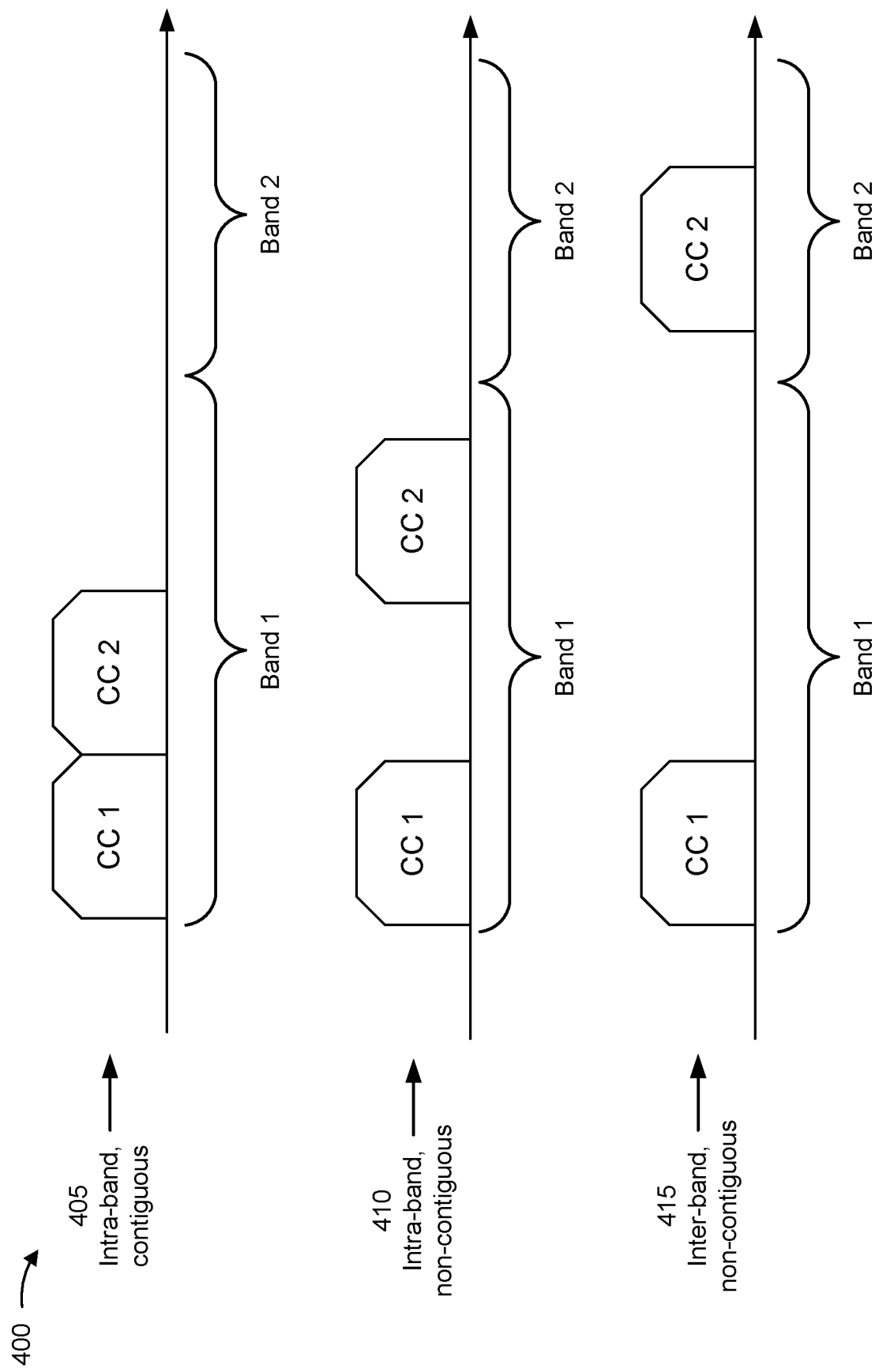
FIG. 4 is a diagram illustrating examples of carrier aggregation, in accordance with the present disclosure.

FIG. 4 is a diagram illustrating examples of carrier aggregation 400, in accordance with the present disclosure. Carrier aggregation is a technology that enables two or more component carriers (CCs, sometimes referred to as carriers) to be combined (for example, into a single channel) for a single UE 120 to enhance data capacity. As shown, carriers can be combined in the same or different frequency bands. Additionally or alternatively, contiguous or non-contiguous carriers can be combined. A base station 110 may configure carrier aggregation for a UE 120, such as in an RRC message, downlink control information (DCI), or another signaling message.

In some examples, carrier aggregation may be configured in an intra-band contiguous mode 405 where the aggregated carriers are contiguous to one another and are in the same band. In some examples, carrier aggregation may be configured in an intra-band non-contiguous mode 410 where the aggregated carriers are non-contiguous to one another and are in the same band. In some examples, carrier aggregation may be configured in an inter-band non-contiguous mode 415 where the aggregated carriers are non-contiguous to one another and are in different bands.

In carrier aggregation, a UE 120 may be configured with a primary carrier or primary cell (PCell) and one or more secondary carriers or secondary cells (SCells). In some examples, the primary carrier may carry control information (for example, downlink control information or scheduling information) for scheduling data communications on one or more secondary carriers, which may be referred to as cross-carrier scheduling. In some examples, a carrier (for example, a primary carrier or a secondary carrier) may carry control information for scheduling data communications on the carrier, which may be referred to as self-carrier scheduling or carrier self-scheduling.

In some examples, a UE 120 may be configured with one or more bandwidth parts (BWPs). A BWP may be a portion of a bandwidth or frequency range configured for the UE 120 (for example, a portion of a bandwidth or frequency range of a CC). A BWP configuration may include a center frequency, a bandwidth, a numerology, or one or more other parameters for physical channel configuration, such as a PDCCH, a PDSCH, a physical uplink control channel (PUCCH), a physical uplink shared channel (PUSCH), or a random access channel (RACH), among other examples. Different BWPs can have the same or different bandwidths, center frequencies, or subcarrier spacing, among other examples, depending on the BWP configuration. BWPs can be used for reduced UE bandwidth capability, for load balancing within a CC, or to facilitate UE power saving, among other examples. In addition, a UE 120 can use BWP switching, where different BWPs are used at different times or for different communications. The BWP switching is indicated in DCI received from a base station (for example, via a 2-bit indicator included in the DCI). In some examples, a UE 120 or a base station 110 may perform beam management operations for each CC or for each BWP configured for the UE 120. For example, active beams or active TCI states may be determined, measured, or refined, among other examples, for each CC or for each BWP configured for the UE 120.

In some examples, a UE and a base station may perform one or more beam management operations to select one or more beams for communications between the UE and the base station. A beam management operation may include a beam selection operation, a beam training operation, or a beam refinement operation, among other examples. In some cases, beam management may be associated with different features or operations. For example, beam management may be associated with a unified TCI framework. As another example, beam management may be associated with inter-cell beam management. "Inter-cell beam management" may refer to beam management associated with a serving cell and one or more non-serving cells. As used herein, a "serving cell" may refer to a cell for which the UE has an active connection (for example, an active RRC connection). For example, the UE may perform operations for beam management for both serving cells and non-serving cells. In some cases, additional operations or features for beam management may be added or supported by the network over time. For example, a wireless network may support one or more operations or features for beam management at a later time that were not supported by the wireless network at an earlier time. As a result, some UEs deployed in the wireless network may support the one or more operations while other UEs deployed in the wireless network may not support one or more operations.

Additionally, the one or more operations or features associated with beam management may use information or parameters that were not previously used or needed for beam management Enhanced or advanced beam management operations or features may use additional information to ensure that the enhanced or advanced beam management operations can be performed or can be performed efficiently and effectively. For example, beam management operations or features associated with inter-cell beam management may use different values for parameters or different parameters than intra-cell beam management. In other words, a base station may configure beam management operations based at least in part on a capability of the UE. However, because the base station may support one or more beam management operations or features for beam management at a later time that were not supported by the wireless network at an earlier time, some UEs deployed in the wireless network may not indicate a capability to support the one or more beam management operations. Additionally or alternatively, some UEs deployed in the wireless network may not indicate capability parameters or information that is used for the one or more beam management operations. As a result, the base station may be unable to configure the one or more beam management operations, may configure the one or more beam management operations for UEs that are unable to support the one or more beam management operations, or may configure the one or more beam management operations for a UE using a value for a parameter that is not supported by the UE, among other examples. Therefore, network performance may be degraded because the base station and a UE may be unable to perform the one or more beam management operations. Additionally or alternatively, the base station may consume resources (for example, network resources, radio resources, or processing resources) performing the one or more beam management operations with a UE that is unable to support the one or more beam management operations or is unable to support a value of a parameter associated with the one or more beam management operations.

Various aspects relate generally to UE capability signaling for enhanced beam management features or operations. In some aspects, a UE transmits a capability message indicating at least one of parameters associated with one or more enhanced beam management features or operations, or indicating whether the UE supports the one or more enhanced beam management features or operations. In some aspects, the one or more enhanced beam management features may include support for a unified TCI state for providing beam information for both uplink beams and downlink beams, an ability to receive inter-cell beam indications for indicating a beam using a reference signal associated with a non-serving cell, an ability to perform or report inter-cell beam measurements, an ability to transmit an enhanced P-MPR report, an ability to support or transmit antenna-panel-specific uplink transmissions, an ability to support report-based beam updates for selecting or activating a beam based on a report transmitted by the UE (for example, without receiving additional signaling from a base station), an ability to transmit a group-based beam report (for example, that includes multiple groups of beams), an ability to perform multiple TRP beam failure recovery, or support for enhanced QCL rules for multiple PDSCH transmissions, among other examples.

The capability message transmitted by the UE may enable the base station to configure or perform the one or more enhanced beam management features or operations. In some aspects, the UE may indicate a capability of the UE for a beam management operation or feature for each physical channel, for each CC configured for the UE, for each BWP configured for the UE, or for each reference signal resource or reference signal resource set, among other examples. In some aspects, the UE may indicate a first capability associated with inter-cell beam management for a beam management feature or operation and may indicate a second capability associated with intra-cell beam management for the beam management feature or operation. In some additional aspects, the UE may indicate a quantity of non-serving cells that can be supported by the UE for inter-cell beam management. In some aspects, the UE may indicate one or more types of TCI states supported by the UE, a quantity of configured TCI states supported by the UE, or information associated with a source reference signal for TCI states (for example, whether the UE supports a source reference signal for a TCI state that is associated with a non-serving cell), among other examples. The above-described capabilities are provided as examples and UE capabilities associated with the one or more enhanced beam management features or operations are described in more detail elsewhere herein.

Particular aspects of the subject matter described in this disclosure can be implemented to realize one or more of the following potential advantages. In some examples, the described techniques can be used to improve beam management operations between a UE and a base station. More specifically, performing one or more enhanced beam management operations or implementing one or more enhanced beam management features may improve beam management within the wireless network and may result in improved network performance. For example, performing the one or more enhanced beam management operations may increase the efficiency of beam management operations, or reduce complexity associated with beam management operations, among other examples.

Figure 5:
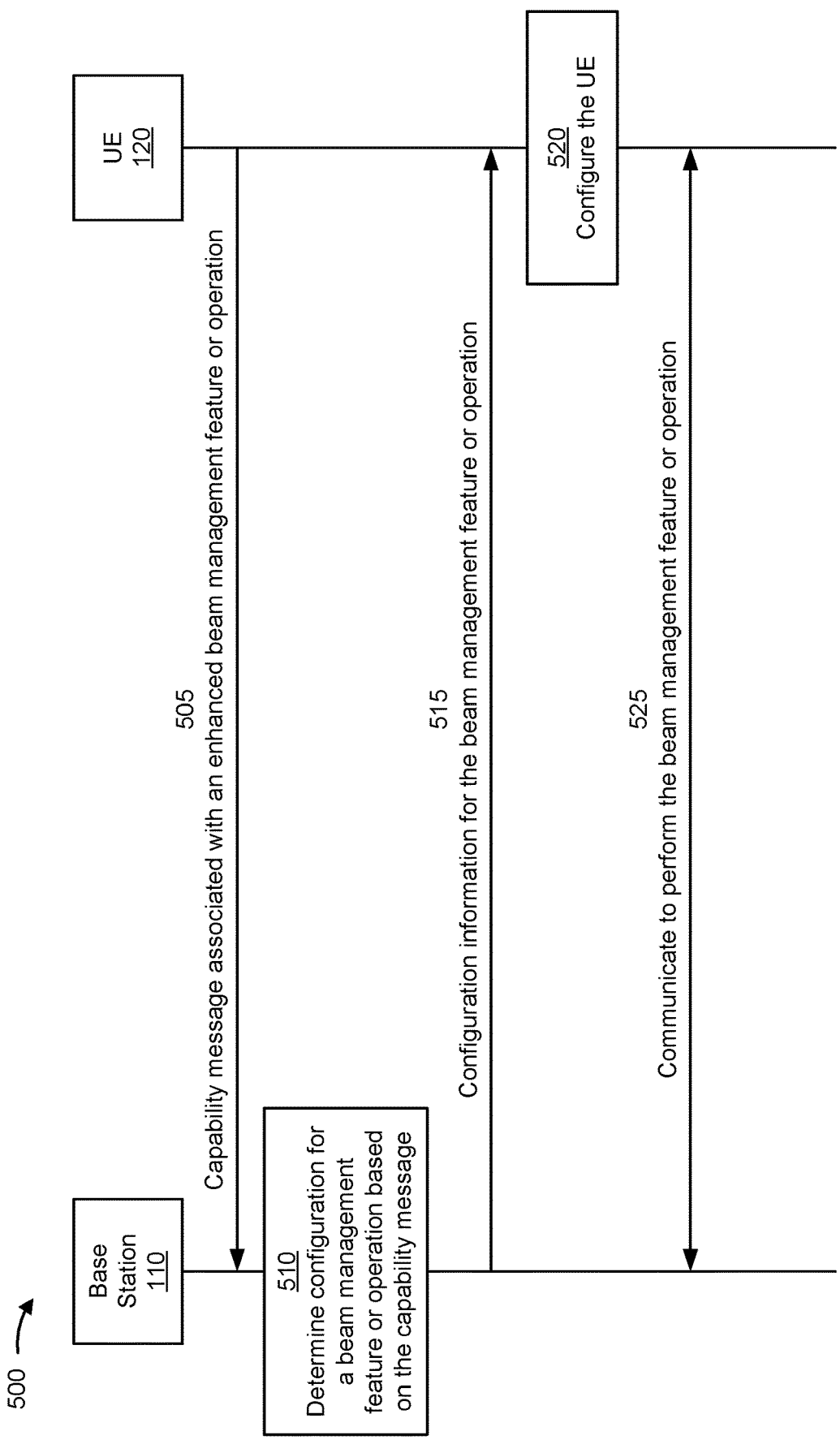
FIG. 5 is a diagram illustrating an example associated with UE capability signaling for enhanced beam management features, in accordance with the present disclosure.

FIG. 5 is a diagram illustrating an example associated with UE capability signaling 500 for enhanced beam management features, in accordance with the present disclosure. As shown in FIG. 5, a base station 110 and a UE 120 may communicate with one another in a wireless network, such as the wireless network 100. In some aspects, the UE 120 and the base station 110 may communicate to configure one or more enhanced beam management features or operations, as described in more detail elsewhere herein.

In a first operation 505, the UE 120 may transmit, and the base station 110 may receive, a capability message. The capability message may be associated with one or more beam management features or operations. The one or more beam management features or operations may be enhanced beam management features or enhanced beam management operations. In some aspects, the UE 120 may transmit the capability message using RRC signaling or using medium access control (MAC) signaling, among other examples. In some aspects, the UE 120 may transmit the capability message using a PUCCH message. In some aspects, the UE 120 may transmit the capability message in a UE capability message (for example, as defined, or otherwise fixed, by a wireless communication standard, such as the 3GPP).

In some aspects, the one or more beam management features or operations may be associated with a Release of a wireless communication standard, such as the 3GPP (for example, the one or more beam management features or operations may be associated with Release 17 or Release 18, or other Releases, of the 3GPP Standards). For example, the one or more beam management features or operations may be associated with features or operations introduced in the Release(s) of the wireless communication standard. In other words, the one or more beam management features or operations may be supported by some UEs deployed within the wireless network (for example, UEs that support the Release(s) of the wireless communication standard) and may not be supported by other UEs deployed within the wireless network (for example, UEs that do not support the Release(s) of the wireless communication standard).

In some aspects, the one or more beam management features or operations may include a unified TCI state framework. Additionally or alternatively, the one or more beam management features or operations may include inter-cell beam indications. Additionally or alternatively, the one or more beam management features or operations may include inter-cell beam measurements. Additionally or alternatively, the one or more beam management features or operations may include an enhanced P-MPR report (for example, associated with mitigating an effect of a maximum permissible exposure (MPE) limit on beam management). Additionally or alternatively, the one or more beam management features or operations may include antenna-panel-specific uplink transmissions. Additionally or alternatively, the one or more beam management features or operations may include report-based beam updates (for example, updating, selecting, or activating a beam based at least in part on a report transmitted by the UE 120 and without additional signaling from the base station 110). Additionally or alternatively, the one or more beam management features or operations may include a group-based beam report. Additionally or alternatively, the one or more beam management features or operations may include multiple TRP (multi-TRP) beam failure recovery. Additionally or alternatively, the one or more beam management features or operations may include enhanced QCL rules for multiple PDSCH (multi-PDSCH) transmissions.

In some aspects, the capability message may indicate one or more parameters associated with the one or more beam management features. For example, the UE 120 may indicate supported parameters or supported values for a parameter associated with at least one of the one or more beam management features. Additionally or alternatively, the capability message may indicate whether the UE 120 supports the one or more beam management features.

As described in more detail elsewhere herein, the one or more beam management features or operations may include a unified TCI state framework. A unified TCI state framework may be associated with different TCI state types for uplink communications and downlink communications. For example, in the unified TCI state framework, a joint downlink and uplink TCI state (for example, a joint DL/UL TCI state) may be defined. The joint downlink and uplink TCI state may provide information for a beam that is to be used for both downlink communications and uplink communications. As another example, in the unified TCI state framework, separate downlink and uplink TCI states may be defined (for example, separate DL and UL TCI states). For example, one or more downlink TCI state types may be defined that provide information for a beam that is to be used for downlink communications (for example, for downlink communications only). Similarly, one or more uplink TCI state types may be defined that provide information for a beam that is to be used for uplink communications (for example, for uplink communications only). For example, prior to the unified TCI state framework, the network (for example, the base station 110) may use TCI states to provide information for downlink beams. For uplink beams, rather than using a TCI state, the network (for example, the base station 110) may use spatial relation information to provide information for the uplink beams. The unified TCI state framework enables the network (for example, the base station 110) to use TCI states to provide UEs with information for both downlink beams and uplink beams.

In the first operation 505, the UE 120 may transmit, and the base station 110 may receive, an indication of whether the UE 120 supports the unified TCI state framework. For example, the UE 120 may transmit, and the base station 110 may receive, an indication of whether the UE 120 supports joint downlink and uplink TCI states, or separate downlink and uplink TCI states. In some aspects, the UE 120 may transmit an indication of whether the UE 120 supports one or more uplink TCI state types. In some aspects, the UE 120 may transmit an indication that the UE 120 supports both joint uplink and downlink TCI states and separate downlink and uplink TCI states. In some other aspects, the UE 120 may transmit an indication that the UE 120 supports one of joint uplink and downlink TCI states or separate downlink and uplink TCI states. In some other aspects, the UE 120 may transmit an indication that the UE 120 does not support either joint downlink and uplink TCI states or separate downlink and uplink TCI states (for example, the UE 120 may transmit an indication that the UE 120 does not support the unified TCI state framework).

In some aspects, an indication that the UE 120 supports the joint downlink and uplink TCI state type may indicate that the UE 120 supports beam correspondence. For example, the UE 120 may be capable of receiving a downlink signal using a downlink beam and may be capable of determining an uplink beam (for example, may be capable of determining in which spatial direction to transmit) for an uplink signal based at least in part on the TCI state or beam direction of the downlink beam (for example, to transmit the uplink signal using the same beam used by the downlink signal). If the UE 120 does not support beam correspondence, then the UE 120 may not support the joint downlink and uplink TCI state type.

In some aspects, the indication that the UE 120 supports a TCI state type may indicate that the UE 120 supports a configuration associated with the TCI state type. For example, the indication that the UE 120 supports a TCI state type may indicate that the UE 120 supports receiving an RRC configuration associated with the TCI state type. Additionally or alternatively, the indication that the UE 120 supports a TCI state type may indicate that the UE 120 supports indication mechanisms associated with the TCI state type. For example, the base station 110 may configure multiple TCI states in an RRC configuration and may activate or reactive one or more of the RRC configured TCI states using an indication mechanism. The indication mechanism may include medium access control (MAC) control element (MAC-CE) signaling or DCI signaling, among other examples.

In some aspects, the indication that the UE 120 supports a TCI state type may indicate that the UE 120 supports one or more QCL rules or QCL rule types associated with the TCI state. In some aspects, the indication that the UE 120 supports a TCI state type may indicate that the UE 120 supports one or more source reference signals or one or more target reference signals associated with the TCI state type. A source reference signal may be a reference signal that is to be received or measured by the UE 120 to obtain the QCL information or other beam information for the TCI state type. A target reference signal may be a reference signal to which the TCI state is to be applied.

In some aspects, the UE 120 may transmit an indication of whether the UE 120 supports a unified TCI state type for intra-cell beam management. Intra-cell beam management may be associated with a TCI state type that is associated with a source reference signal (for example, a QCL source reference signal) that is associated with a physical cell identifier (PCI) of the serving cell of the UE 120. For example, "intra-cell beam management" may refer to a TCI state type that is associated with a source reference signal (for example, a QCL source reference signal) that is associated with a PCI of the base station 110. As described elsewhere herein, inter-cell beam management may be associated with a TCI state type that is associated with a source reference signal (for example, a QCL source reference signal) that is associated with a PCI of a non-serving cell. For example, inter-cell beam management may be associated with a TCI state type that is associated with a source reference signal (for example, a QCL source reference signal) that is not associated with a PCI of the base station 110. In some aspects, the indication of supported TCI state types may be for intra-cell beam management or inter-cell beam management. In some aspects, the UE 120 may support different TCI state types for intra-cell beam management as compared to TCI state types supported for inter-cell beam management.

In some aspects, in the first operation 505, the UE 120 may transmit, and the base station 110 may receive, an indication of whether the UE 120 supports TCI-specific power control parameters for a unified TCI state type. "TCI-specific power control parameters" may refer to power control parameters that are associated with a given TCI states. In other words, if the UE 120 supports TCI-specific power control parameters, then different TCI states may be configured with different power control parameters. If the UE 120 does not support TCI-specific power control parameters, then TCI state independent power control parameters may be configured for the UE 120 (for example, multiple (or all) TCI states may use the same power control parameters). For example, if the UE 120 does not support TCI-specific power control parameters, then the UE 120 may define power control parameters for a channel (for example, the PUCCH or the PUSCH), rather than for a given TCI state, and all signals transmitted using the channel may use the same power control parameters.

In some aspects, the UE 120 may transmit, and the base station 110 may receive, an indication of whether the UE 120 supports TCI-specific power control parameters for each TCI state type supported by the UE 120. In some aspects, the UE 120 may transmit an indication of whether the UE 120 supports TCI-specific power control parameters for each uplink TCI state type, in the unified TCI state framework, supported by the UE 120 (for example, an uplink TCI state type may be a TCI state type that can be used to provide, or define, information for an uplink beam). In other words, the UE 120 may transmit an indication of whether the UE 120 supports TCI-specific power control parameters for each joint downlink and uplink TCI state type or each uplink TCI state type supported by the UE 120.

A power control parameter may include a maximum transmit power level parameter, a target receive power level parameter (for example, a P0 parameter), a fractional power control parameter (for example, an alpha or a parameter), a closed loop index parameter, or a pathloss reference signal parameter, among other examples. In some aspects, a set of power control parameters may be based at least in part on a channel or reference signal type. For example, PUSCH transmissions, PUCCH transmissions, or sounding reference signal (SRS) transmissions may be configured to use different power control parameters or different values for the power control parameters. Therefore, in some aspects, the UE 120 may transmit an indication of whether the UE 120 supports TCI-specific power control parameters for the unified TCI state and an uplink channel of reference signal type. For example, in some cases, configured power control parameters may be associated with a TCI state and an uplink channel or reference signal type (for example, if the UE 120 supports TCI-specific power control parameters for the TCI state).

In some aspects, the UE 120 may transmit, and the base station 110 may receive, an indication of whether the UE 120 supports a receive beam for a pathloss reference signal associated with a unified TCI state being different than a transmit beam indicated by the unified TCI state. For example, the UE 120 may transmit an indication of whether the UE 120 supports a beam misalignment for the pathloss reference signal. A pathloss reference signal may be used by the UE 120 and the base station 110 to track a path loss for a physical channel. A pathloss reference signal may be a periodic reference signal that is measured or received by the UE 120 over time. In some cases, a quantity of pathloss reference signals configured for the UE 120 may be less than a quantity of uplink beam or uplink TCI states configured for the UE 120. Therefore, if the UE 120 does not support a receive beam for a pathloss reference signal associated with a unified TCI state being different than a transmit beam for an uplink TCI state, then the base station 110 may reconfigure or update the pathloss reference signal to ensure that the receive beam associated with the pathloss reference signal aligns with (for example, is the same as) the transmit beam for a configured uplink TCI state. Therefore, the capability indication may enable the base station 110 to ensure that the pathloss reference signal uses a transmit beam that aligns with a configured or active uplink TCI state if the UE 120 does not support beam misalignment for the pathloss reference signal, thereby improving performance of the pathloss reference signal measurements.

In some aspects, in the first operation 505, the UE 120 may transmit, and the base station 110 may receive, an indication of one or more supported beam indication schemes for the unified TCI state framework. For example, the UE 120 may transmit an indication of a supported beam indication scheme for the unified TCI state. As described elsewhere herein, a beam indication scheme may indicate a signaling mechanism for the base station 110 to configure or activate a TCI state. For example, a beam indication scheme may include a MAC-CE based TCI indication. In the MAC-CE based TCI indication, the base station 110 may transmit a MAC-CE activating one or more TCI states (for example, from RRC configured TCI states). As another example, a beam indication scheme may include a MAC-CE based and DCI based TCI indication. For example, a MAC-CE message transmitted by the base station 110 may indicate multiple TCI states and a DCI message transmitted by the base station 110 may indicate (for example, may down select) one or more TCI states, from the multiple TCI states, to be activated for the UE 120 (for example, this may be a two-step TCI indication with the first step including a MAC-CE message and a second step including a DCI message). In some aspects, a beam indication scheme may include a first MAC-CE based and DCI based TCI indication and a second MAC-CE based and DCI based TCI indication. In the first MAC-CE based and DCI based TCI indication, the DCI message that indicates or activates one or more TCI states may schedule a downlink communication. For example, the DCI message may use a DCI format 1_1 or a DCI format 1_2 (for example, as defined, or otherwise fixed, by a wireless communication standard, such as the 3GPP) with a downlink assignment. In the second MAC-CE based and DCI based TCI indication, the DCI message that indicates or activates one or more TCI states may not schedule a downlink communication. For example, the DCI message may use a DCI format 1_1 or a DCI format 1_2 without a downlink assignment.

The UE 120 may transmit an indication of whether the UE 120 supports MAC-CE based TCI indication, MAC-CE based and DCI based TCI indication, the first MAC-CE based and DCI based TCI indication, the second MAC-CE based and DCI based TCI indication, or a combination of the beam indication schemes. In some aspects, the UE 120 or the base station 110 may assume that the UE 120 supports MAC-CE based TCI indication if the UE 120 supports the unified TCI state framework. Therefore, if the UE 120 transmits an indication that the UE 120 supports the unified TCI state framework, then the UE 120 may not transmit an indication that the MAC-CE based TCI indication is supported by the UE 120 (for example, to conserve resources). In some aspects, the UE 120 may transmit an indication of one or more supported DCI formats for the MAC-CE based and DCI based TCI indication.

In some aspects, in the first operation 505, the UE 120 may transmit, and the base station 110 may receive, an indication of a supported time gap from a time at which a DCI-based beam indication is received to a time at which a TCI state indicated by the DCI-based beam indication is applied. The DCI-based beam indication may include the MAC-CE based and DCI based TCI indication, the first MAC-CE based and DCI based TCI indication, or the second MAC-CE based and DCI based TCI indication, among other examples. The supported time gap may indicate an amount of time needed by the UE 120 from receiving a DCI message (for example, that indicates or activates a TCI state) to applying the TCI state to communications. The supported time gap may be a minimum time gap (for example, indicating a minimum amount of time needed by the UE 120 from receiving the DCI to applying the TCI state). The time gap may be used by the UE 120 to decode and process the DCI message.

In some aspects, the supported time gap may be indicated by transmitting an indication of a quantity of slots or symbols (for example, OFDM symbols) associated with the supported time gap. In some aspects, an amount of time associated with a symbol may be based at least in part on a subcarrier spacing (SCS). SCS may also be referred to as tone spacing. For example, the SCS may be the inverse of the symbol duration (for example, the greater the SCS, the shorter the duration of the symbol). Therefore, when the supported time gap is reported by indicating a quantity of symbols, the SCS associated with the symbols may impact the quantity of symbols reported by the UE 120. In some cases, a DCI message may be received in a first CC and the TCI state indicated by the DCI message may be applied in the first CC or a second CC. In some cases, the first CC and the second CC may have the same SCS. In some other cases, the first CC and the second CC may have different SCSs.

In some aspects, the UE 120 may transmit an indication of different supported time gaps for different unified TCI state types. For example, the UE 120 may transmit an indication of a first supported time gap for joint downlink and uplink TCI states, a second supported time gap for downlink only TCI states, or a third supported time gap for uplink only TCI states. For example, different TCI state types may be associated with different processing times at the UE 120. Therefore, this may enable the UE 120 to accurately indicate supported time gaps for the different TCI states (for example, rather than using a single supported time gap for all TCI state types). This may provide additional flexibility for the base station 110 to schedule different TCI states to be applied after different amounts of time.

In some aspects, if the SCS for CC(s) in which the TCI state is to be applied and the SCS for the CC in which the DCI is received is the same, the UE 120 may use the SCS to determine the quantity of symbols to report for the supported time gap. If the SCS for CC(s) in which the TCI state is to be applied and the SCS for the CC in which the DCI is received is are different, then the UE 120 may transmit two values for the supported time gap. For example, where the DCI that indicates a TCI state is associated with a first SCS and the TCI state is associated with a second SCS, the UE 120 may transmit an indication of a first time gap value that is based at least in part on the first SCS, and a second time gap value that is based at least in part on the second SCS. In other words, if the DCI-based beam indication is associated with two different SCSs, then the UE 120 may transmit two different values for the supported time gap.

In some aspects, a TCI state indicated by a DCI message may be applied by the UE 120 in multiple CCs or multiple BWPs. In some aspects, at least two of the multiple CCs or multiple BWPs may have different SCSs. In such examples, the supported time gap reported by the UE 120 may be based at least in part on a largest time gap among multiple time gaps associated with the different SCSs. For example, the UE 120 may report supported time gaps for multiple SCSs. The time gap used by the base station 110 when transmitting the DCI message may be the largest time gap among time gaps associated with the SCSs to which the TCI state(s) indicated by the DCI message are to be applied. In some aspects, a DCI message may indicate multiple TCI states. In such examples, the supported time gap reported by the UE 120 may be based at least in part on a largest time gap among time gaps associated with the multiple TCI states. The UE 120 may transmit an indication of different supported time gaps for different TCI states. For example, the time gap used by the base station 110 when transmitting the DCI message may be the largest time gap among time gaps associated with the multiple TCI states indicated by the DCI message.

As a result, the UE 120 and the base station 110 may apply a TCI state different amounts of time after a DCI message is transmitted or received for different TCI state types, different SCSs, or based at least in part on CCs or BWPs to which a TCI state is to be applied, among other examples. As a result, the capability indication by the UE 120 may enable increased flexibility and granularity for applying TCI states. For example, in some cases, a TCI state may be applied after a lesser amount of time if the UE 120 is capable of decoding or processing the DCI message in a lesser amount of time, thereby reducing a latency associated with applying the TCI state. In other cases, a TCI state may be applied after a greater amount of time to ensure that the UE 120 is able to decode or process the DCI message.

In some aspects, the one or more enhanced beam management features or operations may be associated with applying a single TCI state to multiple CCs or multiple BWPs. For example, multiple CCs may be configured for the UE 120. The multiple CCs may use contiguous or similar frequency domain resources. For example, the multiple CCs may be neighboring CCs. As an example, a frequency band of 800 megahertz (MHz) may be divided into 8 CCs, with each CC being associated with 100 MHz. In such examples, the multiple CCs may be associated with similar beam directions or similar beam information. Therefore, in the first operation 505, the UE 120 may transmit, and the base station 110 may receive, an indication of whether the UE 120 supports a first unified TCI state pool for each bandwidth part or each component carrier, or supports a second unified TCI state pool that is configured on one bandwidth part or one component carrier and that is shared by multiple bandwidth parts or multiple component carriers.

In other words, the first unified TCI state pool may be associated with each BWP or each CC being configured with a TCI state pool. The TCI state pool may include RRC configured TCI states. For example, in some cases, the base station 110 may configure a TCI state pool for each CC or for each BWP. In the second unified TCI state pool, a TCI state pool (for example, RRC configured TCI states) may be configured for a first CC or a first BWP and may be shared among multiple CCs or multiple BWPs. In other words, the base station 110 may configure a TCI state pool for one CC or for one BWP, and the TCI state pool may be associated with multiple CCs or multiple BWPs (for example, thereby conserving signaling overhead associated with transmitting RRC configurations to configure the TCI states). The UE 120 may transmit an indication of whether the UE 120 supports TCI states being configured on one CC or one BWP and being associated with multiple CCs or multiple BWPs. In some aspects, the UE 120 may transmit an indication associated with configuring the TCI state pools only if the second unified TCI state pool is supported by the UE 120. For example, the first TCI state pool may be assumed by the base station 110, and the assumption may be overridden by the capability message indicating that the UE 120 supports efficient configurations for TCI state pools that can be associated with multiple CCs or multiple BWPs.

In some aspects, the UE 120 may transmit an indication of a quantity of TCI state pools that can be configured across all BWPs or CCs in a frequency band. For example, the UE 120 may transmit an indication of a maximum quantity of TCI state pools that the UE 120 can support across BWPs and CCs in a band (for example, in the millimeter wave band or in the sub-6 GHz band).

In some aspects, in the first operation 505, the UE 120 may transmit, and the base station 110 may receive, an indication of whether the UE 120 supports an indicated TCI state (for example, a unified TCI state) being applied to multiple BWPs or multiple CCs. If the UE 120 supports a TCI state being applied to multiple BWPs or multiple CCs, then the base station 110 may activate or update a TCI state for multiple BWPs or multiple CCs using a single beam indication. For example, a single MAC-CE message or a single DCI message may indicate a single TCI state, and the UE 120 may apply the single TCI state to multiple BWPs or multiple CCs. This may enable the base station 110 to conserve resources and time that would have otherwise been used separately transmitting beam indications for each CC or each BWP. In some aspects, the UE 120 may transmit the capability associated with the configuration of the TCI state pools (for example, as described above) based at least in part on the UE 120 supporting a beam indication being applied to multiple BWPs or multiple CCs.

In some aspects, in the first operation 505, the UE 120 may transmit, and the base station 110 may receive, an indication of whether unified TCI states and non-unified TCI states or spatial relation information can be configured for the UE 120. For example, the UE 120 may transmit an indication of whether the UE 120 supports simultaneous configurations of the unified TCI state and a non-unified TCI state or a spatial relation information. In some aspects, the UE 120 may transmit an indication of whether the UE 120 supports simultaneous configurations of the unified TCI state and a non-unified TCI state or a spatial relation information on the same CC or the same BWP (for example, whether the UE 120 supports a unified TCI state configured for a first CC and an uplink spatial relation information configured for the first CC). In some aspects, the UE 120 may transmit an indication of whether the UE 120 supports simultaneous configurations of the unified TCI state and a non-unified TCI state or a spatial relation information across different or multiple CCs or BWPs (for example, whether the UE 120 supports a unified TCI state configured for a first CC and a non-unified TCI state configured for a second CC).

In some aspects, in the first operation 505, the UE 120 may transmit, and the base station 110 may receive, an indication of a quantity of configured or activated unified TCI states supported by the UE 120. In some aspects, the UE 120 may transmit an indication of a first quantity of configured unified TCI states supported by the UE 120 and an indication of a second quantity of activated unified TCI states supported by the UE 120. The quantity of configured or activated unified TCI states supported by the UE 120 may be a maximum quantity of configured or activated unified TCI states supported by the UE 120. In some aspects, the quantity of configured or activated unified TCI states may be associated with a given TCI state type. For example, the quantity of configured or activated unified TCI states may be associated with joint downlink and uplink TCI states, downlink only TCI states, or uplink only TCI states, among other examples. In some aspects, the UE 120 may report a quantity of configured or activated unified TCI states for each TCI state supported by the UE 120. In some aspects, the quantity of configured or activated unified TCI states may be associated with all TCI states supported by the UE 120 (for example, the quantity of configured or activated unified TCI states may be a total quantity across multiple TCI state types). In some aspects, the quantity of configured or activated unified TCI states may be associated with a subset of unified TCI state types.

In some aspects, the quantity of configured or activated unified TCI states may be associated with downlink TCI state types (for example, the quantity of configured or activated unified TCI states may be associated with joint downlink and uplink TCI states, and downlink only TCI states). In some aspects, the quantity of configured or activated unified TCI states may be associated with uplink TCI state types (for example, the quantity of configured or activated unified TCI states may be associated with joint downlink and uplink TCI states, and uplink only TCI states). In some aspects, the UE 120 may report a first quantity of configured or activated unified TCI states associated with downlink TCI state types and a second quantity of configured or activated unified TCI states associated with uplink TCI state types.

In some aspects, the quantity of configured or activated unified TCI states may be associated with a CC. For example, the UE 120 may report a quantity of configured or activated unified TCI states supported by the UE 120 for each CC configured for the UE 120. Additionally or alternatively, the quantity of configured or activated unified TCI states may be associated with multiple CCs. For example, the UE 120 may report a quantity of configured or activated unified TCI states supported by the UE 120 across multiple CCs. In some aspects, the quantity of configured or activated unified TCI states may be associated with a BWP. For example, the UE 120 may report a quantity of configured or activated unified TCI states supported by the UE 120 for each BWP configured for the UE 120. Additionally or alternatively, the quantity of configured or activated unified TCI states may be associated with multiple BWPs. For example, the UE 120 may report a quantity of configured or activated unified TCI states supported by the UE 120 across multiple BWPs. In some aspects, the quantity of configured or activated unified TCI states may be associated with a frequency band. For example, the UE 120 may report a quantity of configured or activated unified TCI states supported by the UE 120 that are associated with the same frequency band. Additionally or alternatively, the quantity of configured or activated unified TCI states may be associated with multiple frequency bands. For example, the UE 120 may report a quantity of configured or activated unified TCI states supported by the UE 120 across multiple frequency bands.

In some aspects, the quantity of configured or activated unified TCI states may be independent of configured or activated non-unified TCI states or uplink spatial relations. For example, the UE 120 may report a quantity of configured or activated unified TCI states supported by the UE 120 that is independent of a quantity of non-unified TCI states or uplink spatial relations configured for the UE 120. In some other aspects, the quantity of configured or activated unified TCI states may be based at least in part on a quantity of configured or activated non-unified TCI states or uplink spatial relations. For example, the UE 120 may report a quantity of configured or activated TCI states supported by the UE 120 that includes unified TCI states, non-unified TCI states, and uplink spatial relations. In some aspects, the UE 120 may transmit an indication of a first quantity of configured or activated TCI states supported by the UE 120 and an indication of a second quantity of configured or activated TCI states supported by the UE 120. The first quantity may be a quantity of unified TCI states supported by the UE 120. The second quantity may be a quantity of unified TCI states, non-unified TCI states, and uplink spatial relations supported by the UE 120.

In some aspects, the one or more enhanced beam management features or operations may include inter-cell beam indications. "Inter-cell beam indication" may refer to a beam indication that indicates a TCI state that is associated with a source reference signal from a non-serving cell. For example, the source reference signal may be associated with a PCI that is not associated with the serving cell of the UE 120. In some aspects, in the first operation 505, the UE 120 may transmit, and the base station 110 may receive, an indication of whether the UE 120 supports inter-cell beam indications. For example, the UE 120 may transmit, and the base station 110 may receive, an indication of whether the UE 120 supports a reference signal from a non-serving cell being an indication reference signal or a source reference signal for a unified TCI state. The source reference signal from the non-serving cell may be used to define a TCI state that is configured or activated for the UE 120. For example, the source reference signal may be a synchronization signal block (SSB) that is associated with a PCI of a non-serving cell. The source reference signal from the non-serving cell may serve as the source reference signal for one or more types of QCL information (for example, for QCL type A, QCL type B, QCL type C, QCL type D, QCL type E, or other QCL types defined, or otherwise fixed, by a wireless communication standard, such as the 3GPP). Additionally or alternatively, the source reference signal from the non-serving cell may provide spatial relation information for uplink spatial relations (for example, to define an uplink beam).

In some aspects, in the first operation 505, the UE 120 may transmit, and the base station 110 may receive, an indication of a supported quantity of control resource sets (CORESETs). In some aspects, the supported quantity of CORESETs may be for each BWP or each CC. Additionally or alternatively, the UE 120 may transmit an indication of a second quantity of CORESET QCL assumptions that can be supported by the UE 120 for each BWP or each CC.

In some aspects, in the first operation 505, the UE 120 may transmit, and the base station 110 may receive, a first one or more capabilities for the one or more beam management features for intra-cell beam management and a second one or more capabilities for the one or more beam management features for inter-cell beam management. The first one or more capabilities or the second one or more capabilities may include capabilities, parameters, indications, or information transmitted by the UE 120 as described herein (for example, as part of the first operation 505). In other words, the UE 120 may report different information for unified TCI states or other enhanced beam management features for intra-cell beam management and for inter-cell beam management. For example, the UE 120 may transmit a first value for a capability for an intra-cell beam and a second value for a capability for an inter-cell beam.

In some aspects, for inter-cell beam management, the UE 120 may receive signals from the serving cell and a non-serving cell at different times. For example, the serving cell and the non-serving cell may be physically located in different locations. Therefore, although the serving cell and the non-serving cell may transmit signals at the same, or substantially the same, time, the signals may arrive at the UE 120 at different times. In some aspects, a cyclic prefix (CP) of the signal(s) may be used by the UE 120 to account for the timing difference of received signals. For example, the UE 120 may adjust a fast Fourier transform (FFT) window, using the CP of the signal(s), to enable the UE 120 to receive the signals using the same FFT window (for example, if the timing difference is an amount of time that is less than a duration of the CP).

In some aspects, in the first operation 505, the UE 120 may transmit, and the base station 110 may receive, an indication of whether the UE 120 supports a receive timing difference between a serving cell and a non-serving cell being larger than a size or duration of a CP used by the UE 120. For example, the UE 120 may be capable of receiving a first signal from a serving cell (for example, from the base station 110) and receiving a second signal from a non-serving cell (for example, from another base station or another TRP) where the first signal and the second signal have a receive timing difference that is greater than a size or duration of a CP used by the UE 120.

In some aspects, the UE 120 may transmit an indication of a quantity of non-serving cells or groups of cells that the UE 120 can support with the receive timing difference (for example, with the serving cell) that is greater than a size or duration of a CP used by the UE 120. In some aspects, the UE 120 may transmit an indication of a supported receive timing difference. The supported receive timing difference may be a maximum receive timing difference between signals transmitted by the serving cell and signals transmitted by a non-serving cell that can be supported by the UE 120. The supported receive timing difference may be indicated in a quantity of symbols (for example, associated with a given SCS). This may enable the base station 110 to determine whether a time gap is needed when the UE 120 is configured to switch to, or activate, a beam associated with a non-serving cell (for example, if the receive timing difference with the non-serving cell is greater than the supported receive timing difference or is greater than a size or duration of a CP used by the UE 120, then the base station 110 may configure a time gap to enable the UE 120 to switch to, or activate, the beam associated with the non-serving cell).

For uplink transmissions, a timing of the uplink frame may need to be adjusted in order to have alignment with a downlink frame in a time domain at a base station 110. For example, an uplink transmission from the UE 120 to the base station 110 may take some time to reach the base station 110. In order to better align uplink frames and downlink frames at the base station 110, the base station 110 may configure a UE 120 to start an uplink frame an amount of time before a corresponding downlink frame. For example, the base station 110 may transmit, and the UE 120 may receive, a timing advance (TA) command indicating a TA value. The UE 120 may determine the amount of time before the start of a downlink frame that a corresponding uplink frame is to start based at least in part on the TA value. In some aspects, in the first operation 505, the UE 120 may transmit, and the base station 110 may receive, an indication of whether the UE 120 supports a first timing advance value for a non-serving cell that is different than a second timing advance value for a serving cell. In other words, the UE 120 may transmit an indication of whether the UE 120 supports different TA values for serving cells and non-serving cells. This may enable the UE 120 to maintain the first TA value for a non-serving cell and a second TA value for the serving cell. As a result, uplink communications may be better aligned than if a single TA value were to be used for both the serving cell and the non-serving cell (for example, because an uplink timing may be different for the serving cell and the non-serving cell). In some aspects, the UE 120 may transmit an indication of a quantity of TA values or TA groups for non-serving cells supported by the UE 120. For example, the quantity of TA values or TA groups may be a maximum quantity of TA values or TA groups that the UE 120 can support for non-serving cells.

In some aspects, the one or more enhanced beam management features or operations may include an inter-cell beam measurement. For example, the UE 120 may measure a downlink reference signal that is transmitted by a non-serving cell as part of a beam management operation (for example, as part of inter-cell beam management). In some aspects, in the first operation 505, the UE 120 may transmit, and the base station 110 may receive, an indication of whether the UE supports beam measurements using a downlink reference signal associated with a non-serving cell. The downlink reference signal may be an SSB that is associated with a PCI that is different than a PCI of the serving cell. Additionally or alternatively, the downlink reference signal may be a CSI-RS associated with the non-serving cell. For example, the CSI-RS may be associated with a source reference signal (for example, an SSB) that is associated with a PCI that is different than a PCI of the serving cell. For example, the source reference signal may directly provide QCL information for the CSI-RS. As another example, the source reference signal may provide QCL information for a TCI state and the CSI-RS may be associated with the TCI state.

In some aspects, the UE 120 may transmit an indication of a quantity of non-serving cells that can be configured for the inter-cell beam measurements. For example, the quantity of non-serving cells that can be configured for the inter-cell beam measurements may be a maximum quantity of non-serving cells that the UE 120 can be configured to measure for inter-cell beam management. In some aspects, the UE 120 may transmit an indication of a quantity of cells that can be configured for Layer 1 RSRP reports associated with inter-cell beam management. For example, a maximum quantity of non-serving cells (for example, a maximum quantity of RRC configured PCIs that are different than the PCI of the serving cell) configured for beam measurement or reporting may be defined (for example, for multi-beam measurement or reporting enhancements for inter-cell beam management and inter-cell multi-TRP communications). In some aspects, the maximum quantity of non-serving cells configured for beam measurement or reporting for L1-RSRP reports may be defined based at least in part on the UE capability (for example, the maximum quantity may be X, where X is reported by the UE 120 in the first operation 505). In some other aspects, the maximum quantity of non-serving cells configured for beam measurement or reporting for L1-RSRP reports may be defined, or otherwise fixed, by a wireless communication standard, such as the 3GPP.

In some aspects, in the first operation 505, the UE 120 may transmit, and the base station 110 may receive, an indication of whether the UE 120 supports measurements associated with a serving cell and a non-serving cell being included in the same measurement report that is transmitted by the UE 120. For example, the UE 120 may transmit an indication of whether the UE 120 supports transmitting a single Layer 1 report that include both serving cell beam measurements and non-serving cell beam measurements. The Layer 1 report may be a Layer 1 RSRP report or a Layer 1 signal-to-interference-plus-noise ratio (SINR) report. In some aspects, the UE 120 may transmit an indication of a quantity of downlink reference signals that can be associated with a single report (for example, when the single report includes both serving cell beam measurements and non-serving cell beam measurements). In some aspects, the UE 120 may transmit an indication of a quantity of non-serving cell measurements that can be reported by the UE 120 in a single report (for example, when the single report includes both serving cell beam measurements and non-serving cell beam measurements). Additionally or alternatively, the UE 120 may transmit an indication of a quantity of serving cell measurements that can be reported by the UE 120 in a single report (for example, when the single report includes both serving cell beam measurements and non-serving cell beam measurements). This may enable the base station 110 to configure the UE 120 to report both serving cell beam measurements and non-serving cell beam measurements in a single report, thereby conserving resources and improving an efficiency associated with inter-cell beam measurement reporting.

In some aspects, the one or more enhanced beam management features or operations may include inter-cell measurements performed by the UE 120 where the measured signals from two different cells at least partially overlap in the time domain. For example, a first signal transmitted by a serving cell and a second signal transmitted by a non-serving cell may be measured by the UE 120 associated with inter-cell beam management. The first signal and the second signal may at least partially overlap in the time domain. For example, the first signal and the second signal may use different frequency domain resources. The time domain resources of the first signal and the second signal may share at least one common symbol (for example, one common OFDM symbol). Therefore, in the first operation 505, the UE 120 may transmit, and the base station 110 may receive, an indication of whether the UE 120 supports measurements of downlink reference signals, associated with different cells and that at least partially overlap in the time domain. Additionally or alternatively, the UE 120 may transmit an indication of whether the UE 120 supports the measurements of downlink reference signals being included in the same measurement report transmitted by the UE 120. For example, the UE 120 may support multiple FFT windows. Therefore, the UE 120 may be capable of measuring multiple reference signals (for example, from different cells) that at least partially overlap in the time domain. Reference signals that at least partially overlap in the time domain may be referred to herein as "overlapped reference signals."

In some aspects, the UE 120 may transmit an indication of whether the UE 120 supports inter-cell beam measurements for time division multiplexed reference signals (for example, reference signals that do not overlap in the time domain) or for overlapped reference signals (for example, where the measurements are reported in the same report). For example, the UE 120 may indicate support of measurement of time division multiplexed reference signals or overlapped downlink reference signals from different cells (for example, including the serving cell and non-serving cell(s)), which are reported in a single report. If the UE 120 supports inter-cell beam measurements of overlapped reference signals, then the UE 120 may transmit an indication of a quantity of downlink reference signals, associated with different cells and that at least partially overlap in a time domain that can be included in the same measurement report. For example, the UE 120 may transmit an indication of a quantity of overlapped reference signals that can be measured by the UE 120 (for example, at one time). The quantity of overlapped reference signals may be a maximum quantity of overlapped reference signals that can be measured by the UE 120 (for example, at one time).

In some aspects, the UE 120 may use a similar (or the same) beam pattern to measure overlapped reference signals. For example, because the inter-cell beam measurements are performed to aid the UE 120 or the base station 110 in determining which cell is associated with a best signal quality or signal strength, the UE 120 may use a similar (or the same) beam pattern to measure overlapped reference signals to ensure that the measurements produce results that can be fairly compared. For example, the UE 120 may use an omni-directional beam (or a pseudo-omni-directional beam) on different antenna panels to simultaneously measure each overlapped reference signal. An omni-directional beam (or a pseudo-omni-directional beam) may be a beam associated with a broad or wide beam width to cover a wider coverage area than a beam typically used for data communications in a wireless network that uses beam-formed signals, such as a millimeter wave network. The UE 120 may report a best or highest measured metric (such as RSRP or SINR) for each overlapped reference signal. This may enable the base station 110 to accurately compare measurements from different cells. This also may reduce latency associated with performing inter-cell measurements because the signals from the different cells may be transmitted at least partially at the same time.

In some aspects, in the first operation 505, the UE 120 may transmit, and the base station 110 may receive, an indication of whether the UE 120 supports a receive timing difference between a serving cell and a non-serving cell being larger than a size of a CP for inter-cell beam measurements. For example, the UE 120 may transmit an indication of whether the UE 120 supports performing a measurement from a serving cell and a measurement from a non-serving cell when the receive timing difference between the serving cell and the non-serving cell is larger than a size or duration of the CP used by the UE 120. For example, the capability described above, associated with the receive timing difference, may be related to whether the UE 120 can communicate with a non-serving cell when the receive timing difference between the serving cell and the non-serving cell is larger than a size or duration of the CP used by the UE 120. Here, the capability reported by the UE 120 may be associated with whether the UE 120 can measure signals from the serving cell and the non-serving cell when the receive timing difference between the serving cell and the non-serving cell is larger than a size or duration of the CP used by the UE 120.

The UE 120 may transmit an indication of similar information for the capability as described above, associated with the receive timing difference. For example, the UE 120 may transmit an indication of a quantity of non-serving cells or groups of cells that the UE 120 can support with the receive timing difference for the inter-cell beam measurements. Additionally or alternatively, the UE 120 may transmit an indication of a supported receive timing difference (for example, in a quantity of symbols for a given SCS) for the inter-cell beam measurements. For example, the supported receive timing difference may be a maximum receive timing difference between the serving cell and a non-serving cell that the UE 120 can support when performing measurements associated with the serving cell and the non-serving cell. The base station 110 may need to configure a time gap (for example, a quantity of symbols) that is greater than the reported supported receive timing difference between downlink reference signal from different cells (for example, at least when the UE 120 indicates support for time division multiplexed measurements and not overlapped reference signal measurements).

In some aspects, the one or more enhanced beam management features or operations may include inter-cell beam management or inter-cell multi-TRP event-driven beam reporting. "Event-driven beam reporting" may refer to the UE 120 transmitting a measurement report (for example, a measurement report indicating measurements of beams from one or more cells) based at least in part on the UE 120 detecting an event. The event may be a Layer 1 event (for example, a DCI-based event). In some aspects, the event may be a MAC-CE based event. Therefore, in some aspects, in the first operation 505, the UE 120 may transmit, and the base station 110 may receive, an indication of whether the UE 120 supports event-driven beam reporting for inter-cell beam management or inter-cell multi-TRP communications. For example, the UE 120 may transmit an indication of whether the UE supports Layer 1 event-based inter-cell beam measurement reporting, or MAC-CE event-based inter-cell beam measurement reporting.

In some aspects, the one or more enhanced beam management features or operations may be associated with an enhanced P-MPR report. The enhanced P-MPR report may also be referred to herein as an enhanced power headroom report. The enhanced P-MPR report may include information associated with an MPE limit for the UE 120. For example, the enhanced P-MPR report may indicate an allowable transmit power (or an allowable power boost) for a beam or antenna panel, where an allowable transmit power (or an allowable power boost) for a beam or antenna panel is based at least in part on an MPE limit of the UE 120.

For example, because UEs may emit RF waves, microwaves, or other radiation, UEs are generally subject to regulatory RF safety requirements that set forth specific guidelines, or MPE limits, that constrain various operations that the UEs can perform. For example, RF emissions may generally increase when the UE 120 is transmitting, and the RF emissions may further increase in cases where the UE 120 is performing frequent transmissions, or high-power transmissions, among other examples. Accordingly, because frequent or high-power transmission may lead to significant RF emissions, regulatory agencies (for example, the Federal Communications Commission (FCC) in the United States) may provide information related to acceptable RF radiation exposure when UEs are communicating using different radio access technologies. For example, when the UE 120 is communicating using radio access technologies that operate in a frequency range below 6 GHz, the applicable RF exposure parameter is a specific absorption rate (SAR), which refers to a rate at which the human body absorbs energy when exposed to RF energy (for example, power absorbed per unit of mass, which may be expressed in watts per kilogram (W/kg)). In particular, SAR requirements generally specify that overall radiated power by the UE 120 is to remain under a certain level to limit heating that may occur when RF energy is absorbed. In another example, when the UE 120 is communicating using a radio access technology that operates in a high frequency range, such as a millimeter wave (mmW) frequency range, the applicable RF exposure parameter is power density, which may be regulated to limit heating of the UE 120 or nearby surfaces.

Accordingly, UEs generally have to satisfy MPE limits, which are typically regulatory requirements that are defined in terms of aggregate exposure over a certain amount of time, and the aggregate exposure may be averaged over a moving integration window (or moving time window). For example, the UE 120 may be subject to an average power limit ($P_{limit}$) that corresponds to an average power at which an MPE limit is satisfied if the UE 120 were to transmit substantially continuously over a moving integration window of N seconds (for example, 100 seconds). Because the base station 110 may be unaware of how much remaining energy budget is available to the UE 120 within the moving integration window, the base station 110 cannot take appropriate action to adapt scheduling to help the UE 120 maintain the uplink connection. Therefore, the UE 120 may transmit an enhanced P-MPR report indicating a remaining energy budget (or an allowable transmit power boost) for a given beam or a given antenna panel. This may enable the base station 110 to identify when the given beam or the given antenna panel is power limited or constrained (for example, due to the MPE limit) and may enable the base station 110 to select a different beam or different antenna panel for the UE 120 to use for communications with the base station 110. This may improve performance of communications between the UE 120 and the base station 110 because the UE 120 may be enabled to use a higher transmit power for communications between the UE 120 and the base station 110.

However, the base station 110 may be unaware of the UE 120 capability associated with the enhanced P-MPR report. Therefore, the base station 110 may be unable to configure the UE 120 to transmit an enhanced P-MPR report, or the base station 110 may configure the UE 120 to transmit an enhanced P-MPR report that exceeds the capability of the UE 120. Therefore, in some aspects, in the first operation 505, the UE 120 may transmit, and the base station 110 may receive, an indication of whether the UE 120 supports transmitting a P-MPR report or a power headroom report for MPE mitigation (for example, an enhanced P-MPR report or an enhanced power headroom report). In some aspects, the UE 120 may transmit an indication of whether the UE 120 supports transmitting the P-MPR report or the power headroom report that includes a resource indicator (for example, an SSB resource indicator or a CSI-RS resource indicator) or a beam indicator. In some aspects, the UE 120 may indicate whether the UE 120 supports beam-level enhanced P-MPR reports (for example, an enhanced P-MPR report that includes information for given beams) or antenna-panel-level enhanced P-MPR reports (for example, an enhanced P-MPR report that includes information for given antenna panels).

In some aspects, the UE 120 may transmit an indication of a quantity of beams or antenna panels (for example, for a serving cell) that can be reported in a single P-MPR report. For example, the UE 120 may report a maximum quantity of beams or antenna panels that can be reported (for example, for enhanced P-MPR reporting) for each serving cell. In some aspects, a beam-level enhanced P-MPR report may be associated with a quantity of beams to be included in the enhanced P-MPR report. In some aspects, the quantity of beams to be included in the enhanced P-MPR report may be defined or fixed (for example, by a wireless communication standard, such as the 3GPP). In some other aspects, the quantity of beams to be included in the enhanced P-MPR report may be configurable by the base station 110 (for example, based at least in part on the reported capability of the UE 120). In some aspects, an antenna-panel-level enhanced P-MPR report may be associated with multiple beams (for example, that are associated with a given antenna panel). In such examples, the UE 120 may transmit an indication of a quantity of supported beam indications (for example, a quantity of support resource indicators) that can be reported in a single-antenna-panel-level enhanced P-MPR report. This may enable the base station 110 (for example, in a second operation 510 or a third operation 515, described in more detail elsewhere herein) to configure a pool of candidate beams or resource indicators to be measured by the UE 120 for the enhanced P-MPR report.

In some aspects, the UE 120 may transmit an indication of whether the UE 120 supports indicating a measurement parameter associated with the resource indicator or the beam indicator in the enhanced P-MPR report. For example, the UE 120 may support transmitting an indication of a measurement parameter, such as RSRP, maximum power reduction (MPR), or a modified virtual power headroom, among other examples, included in the enhanced P-MPR report (for example, for each beam or each reference signal measured by the UE 120). In some aspects, the UE 120 may transmit an indication of which measurement parameter(s) can be reported by the UE 120 in the enhanced P-MPR report. For example, the UE 120 may transmit an indication that the UE 120 supports reporting, for each beam or reference signal resource indicator, a downlink RSRP, a downlink RSRP and MPR, or a modified virtual power headroom, among other examples.

In some aspects, the UE 120 may transmit an indication of reporting mechanism(s) supported by the UE 120 for enhanced P-MPR reports. For example, a reporting mechanism may include a MAC-CE message or a CSI report. The UE 120 may transmit an indication of whether the UE 120 supports transmitting the enhanced P-MPR report via a MAC-CE message or a CSI report, among other examples. In some aspects, the base station 110 (for example, in the second operation 510 or the third operation 515, described in more detail elsewhere herein) may indicate whether an enhanced P-MPR report (for example, for MPE mitigation) or a traditional P-MPR report (for example, without information associated with MPE mitigation) is to be transmitted by the UE 120 (for example, via an RRC flag or indicator).

In some aspects, the enhanced P-MPR reports may be beneficial for supporting separate downlink only TCI states and uplink only TCI states under the unified TCI state framework. For example, MPE limits may not impact downlink communications. MPE limits may only impact transmit power levels for uplink communications. Therefore, enabling enhanced P-MPR reports may necessitate the UE 120 supporting separate downlink only TCI states and uplink only TCI states under the unified TCI state framework (as described in more detail elsewhere herein). For example, the base station 110 may flexibly change the uplink beam (for example, based on an MPE limit), but a downlink beam may remain a best downlink beam. Therefore, the base station 110 may need to configure different beams (or different TCI states) for uplink beams and downlink beams to be used by the UE 120. Therefore, the UE 120 may need to support separate downlink only TCI states and uplink only TCI states under the unified TCI state framework.

In some aspects, the one or more enhanced beam management features or operations may include an enhanced group-based beam report. A "group-based beam report" may be a report that includes two or more beams (for example, a group of beams) that can be received by the UE 120 at the same, or substantially the same, time. An "enhanced group-based beam report" may be a report that includes two or more groups of beams in a single report. In some aspects, beams included in a group may be associated with the same TRP or different TRPs. In some aspects, beams included in a group may be associated with a same resource set (for example, the same reference signal resource set) or different resource sets. The enhanced group-based beam report may enable the base station 110 to select two beams (for example, included in the same group) to be used by the UE 120 (for example, for simultaneous reception at the UE 120) (for example, in a second operation 510 or a third operation 515, described in more detail elsewhere herein). In some aspects, the two selected beams may be from different resource sets. This may enable the base station 110 to easily identify beams that can be received by the UE 120 at the same, or substantially the same, time. Moreover, the enhanced group-based beam report may reduce an overhead associated with transmitting the group-based beam reports because multiple groups of beams may be included in a single report.

Therefore, in some aspects, in the first operation 505, the UE 120 may transmit, and the base station 110 may receive, an indication of one or more capabilities associated with the group-based beam report, where the group-based beam report includes multiple beam groups (for example, an enhanced group-based beam report), and where at least two beam groups, from the multiple beam groups, are associated with different resource sets. The one or more capabilities may include a quantity of beam groups that can be included in the enhanced group-based beam report. For example, the UE 120 may transmit an indication of a maximum quantity of beam groups that the UE 120 can include in a single enhanced group-based beam report. In some aspects, the one or more capabilities may include an indication of one or more supported timing schedules of resources to be measured for the enhanced group-based beam report. The resources may include a channel measurement resource (CMR) or an interference measurement resource (IMR), among other examples. A timing schedule may include periodic transmissions, semi-persistent transmissions, or aperiodic transmissions. The UE 120 may transmit an indication of one or more supported timing schedules (for example, periodic, semi-persistent, or aperiodic) for the resources to be measured by the UE 120 (for example, the UE 120 may support measuring periodic resources, semi-persistent resources, or aperiodic resources for the enhanced group-based beam report). In some aspects, the one or more capabilities may include an indication of one or more supported transmission timing schedules for the group-based beam report. For example, the UE 120 may transmit an indication of whether the UE 120 can transmit the enhanced group-based beam report periodically, semi-persistently, or aperiodically. In some aspects, the UE 120 may transmit an indication of a physical channel on which the UE 120 can transmit the enhanced group-based beam report, such as the PUCCH or the PUSCH.

In some aspects, the one or more capabilities may include an indication of one or more supported measurement parameters for each beam included in the group-based beam report. The measurement parameters may include RSRP, SINR, or RSRQ, among other examples. In some aspects, the one or more capabilities may include reporting a beam group, from the multiple beam groups, that includes a first beam associated with a serving cell and a second beam associated with a non-serving cell. For example, the UE 120 may transmit an indication of whether the UE 120 supports two reported downlink reference signals per group that can be from the serving cell and a non-serving cell.

In some aspects, the one or more enhanced beam management features or operations may include multi-TRP beam failure recovery. For example, the multiple TRPs or the base station 110 may use reference signals (for example, as part of a beam management process) to determine which beams to use for the downlink data communications. For example, the base station 110 may transmit, via the multiple TRPs, reference signals via different beams. A first TRP may transmit reference signals via a first one or more beams, and a second TRP may transmit additional reference signals via a second one or more beams. The UE 120 may receive and measure the reference signals via the beams to determine one or more given beams selected for subsequent communications. The UE 120 may generate a CSI report that indicates a set of given beams (for example, with an indication based at least in part on an associated reference signal) for the subsequent communications. In some aspects, the base station 110 or a TRP may configure a beam failure recovery configuration for multi-TRP scenarios. The beam failure recovery configuration may indicate beam failure recovery reference signals (BFD-RSs) or new beam identification reference signals (NBI-RSs). BFD-RSs may be used by the UE 120 to measure and determine if a beam failure has occurred (for example, if the measurement of a BFD-RS does not satisfy a threshold). NBI-RSs may be measured by the UE 120 to identify one or more candidate beams to be used for subsequent multi-TRP communications (for example, after a beam failure).

For example, the UE may receive (for example, from the base station as part of the third operation 515) configurations of BFD-RSs or NBI-RSs for each beam group (for example, associated with a TRP). Indices of the BFD-RSs may be directly associated with indices of the NBI-RSs. For example, sets of the BFD-RSs may be associated with sets of NBI-RSs. The sets of the BFD-RSs may have 1-to-1 mapping with the sets of the NBI-RSs based at least in part on, for example, a mapping rule configured in a communication protocol or in configuration signaling from the base station 110. In some aspects, the base station 110 may provide a configured association between the sets of the BFD-RSs and the sets of the NBI-RSs. The beams of the BFD-RSs and the NBI-RSs may be indicated via a CSI resource index (CRI) or an SSB index (SSBI), and the UE 120 may determine the association of the beam group to the CRI or the SSBI based at least in part on the BFD-RS and the NBI-RS configurations. However, the base station 110 may be unaware of BFD-RS configurations or NBI-RS configurations supported by the UE 120.

Therefore, in some aspects, in the first operation 505, the UE 120 may transmit, and the base station 110 may receive, an indication of one or more capabilities for the multi-TRP beam failure recovery. The one or more capabilities may include supporting two or more BFD-RS sets for each downlink bandwidth part. For example, this capability may indicate that multi-TRP beam failure recovery is supported by the UE 120 because each BFD-RS set may be associated with a single TRP. Therefore, if the UE 120 supports two or more BFD-RS sets for each downlink bandwidth part, then the UE 120 may support multi-TRP beam failure recovery within a single downlink bandwidth part. In some aspects, the one or more capabilities may include an indication of a quantity of BFD-RS resources that can be included in a BFD-RS resource set. For example, the UE 120 may transmit an indication of a maximum quantity of BFD-RS resources that can be included in a single BFD-RS resource set.

In some aspects, the one or more capabilities may include an indication of a quantity of BFD-RS resources that can be included in BFD-RS resource sets associated with each downlink bandwidth part. For example, the UE 120 may transmit an indication of a maximum quantity of BFD-RSs that can be configured for the UE 120 across all BFD-RS resource sets for each downlink bandwidth part. In some aspects, the one or more capabilities may include an indication of a supported BFD-RS type. A first type of BFD-RS may be a BFD-RS that is identified (for example, by the UE 120) based at least in part on signaling from the base station 110 or a TRP. A second type of BFD-RS may be a BFD-RS that is identified (for example, by the UE 120) based at least in part on one or more rules (for example, without signaling to identify which reference signal is the BFD-RS). The UE 120 may transmit an indication of one or more supported BFD-RS types. In some aspects, a supported type of BFD-RS may be based at least in part on a scenario or type of communication. For example, a scenario or type of communication may include single DCI multi-TRP communications (for example, where a single DCI schedules communications for multiple TRPs), multiple DCI multi-TRP communications (for example, where multiple DCIs schedule communications for multiple TRPs), inter-cell multi-TRP communications, inter-cell beam management, or single frequency network (SFN) CORESET communications with at least two active TCI states, among other examples. "SFN communications" may refer to two or more communications that are transmitted using the same, or substantially the same, frequency domain resources and that are transmitted at the same, or substantially the same, time.

In some aspects, the one or more capabilities associated with multi-TRP beam failure recovery may include supporting two or more NBI-RS resource sets for each downlink bandwidth part. In some aspects, the one or more capabilities associated with multi-TRP beam failure recovery may include an indication of a quantity of NBI reference signals that can be included in an NBI-RS resource set. For example, the UE 120 may transmit an indication of a maximum quantity of NBI-RSs that can be configured in a single NBI-RS resource set. In some aspects, the one or more capabilities associated with multi-TRP beam failure recovery may include an indication of a quantity of NBI-RSs that can be included in NBI-RS resource sets associated with each downlink bandwidth part. For example, the UE 120 may transmit an indication of a maximum quantity of NBI-RSs that can be configured in all NBI-RS resource sets for a single downlink bandwidth part.

In some aspects, the one or more capabilities associated with multi-TRP beam failure recovery may include an indication of a quantity of total resources across one frequency range or all frequency ranges that include BFD-RS resources and NBI-RSs resources for multiple TRP beam failure recovery. For example, the UE 120 may transmit a maxTotalResourcesForAcrossFreqRanges-r16 parameter and a maxTotalResourcesForOneFreqRange-r16 parameter. However, these parameters do not account for BFD-RS resources, NBI-RS resources, pathloss reference signal resources (for example, used for power control associated with the unified TCI state framework), or other reference signal resources introduced by the enhanced beam management features or operations described herein. Therefore, the UE 120 may transmit an indication of a maxTotalResourcesForAcrossFreqRanges parameter or a maxTotalResourcesForOneFreqRange parameter that accounts for BFD-RS resources, NBI-RS resources, pathloss reference signal resources, or other reference signal resource introduced by the enhanced beam management features or operations described herein.

In some aspects, the one or more capabilities associated with multi-TRP beam failure recovery may include an indication of a quantity of PUCCH scheduling request resources that can be included in a cell group for multi-TRP beam failure recovery. For example, PUCCH scheduling request resources may be used by the UE 120 to report beam failure for multi-TRP. The UE 120 may transmit an indication of a maximum quantity of PUCCH scheduling request resources that can be configured for the UE 120 (for example, in a cell group) for multi-TRP beam failure recovery. In some aspects, the one or more capabilities associated with multi-TRP beam failure recovery may include supporting a reset of all CORESETs associated with a failed BFD-RS. A failed BFD-RS may be a BFD-RS that is associated with a measurement value that does not satisfy a threshold (for example, a beam failure threshold). The UE 120 may support resetting all CORESETs associated with a failed BFD-RS after transmitting a beam failure report or after identifying a new beam (for example, associated with an NBI-RS). For example, the UE 120 may reset all CORESETs associated with a failed BFD-RS an amount of time, such as 28 symbols or another amount of time, after receiving a beam failure recovery response from the base station 110 or from a TRP. The UE 120 may transmit, to the base station 110, an indication of whether the UE 120 is capable of performing the resetting of CORESETs associated with a failed BFD-RS.

In some aspects, the one or more enhanced beam management features or operations may include a single DCI message scheduling multiple PDSCH messages. The base station 110 may transmit, to the UE 120, DCI that schedules multiple communications for the UE 120. The multiple communications may be scheduled for at least two different cells or two different CCs. However, the beam to be used for the multiple PDSCH messages may not be known by the UE 120 or the base station 110. Therefore, in some aspects, in the first operation 505, the UE 120 may transmit, and the base station 110 may receive, an indication of whether the UE 120 supports the enhanced QCL rules associated with multiple PDSCH transmissions being scheduled by a DCI message. For example, the UE 120 may transmit an indication of whether the UE 120 is capable of identifying beam(s) for the multiple PDSCH transmissions using enhanced QCL rules described herein.

In some aspects, such as where a scheduling offset between the DCI message and a first (for example, first in time) PDSCH message scheduled by the DCI message is greater than or equal to a threshold amount of time for applying QCL assumptions or a time duration associated with the enhanced QCL rules (for example, a timeDurationForQCL threshold), then the UE 120 may identify the beam to be used for the multiple PDSCH messages based at least in part on an indication included in the DCI message or based at least in part on a beam or a TCI state used by the DCI message. For example, if a tci-PresentInDCI field is configured, then the DCI message may indicate a TCI state for the one or more (or all) of the multiple PDSCHs in a field of the DCI message (for example, in a TCI codepoint field). QCL assumption(s) indicated by the TCI state may be applied to one or more (or all) of the multiple PDSCH messages. If the tci-PresentInDCI field is not configured, then the UE 120 may identify a beam or TCI state for one or more (or all) of the multiple PDSCHs based at least in part on a beam or TCI state used by the DCI message (for example, QCL assumption(s) of the DCI message may be applied to one or more (or all) of the multiple PDSCH messages). In other words, the UE 120 may use the same beam for the DCI message and the multiple PDSCH messages. In some aspects, the UE 120 may transmit, and the base station 110 may receive, an indication of whether the UE 120 supports QCL rules to be applied to the multiple PDSCH transmissions that are indicated by a TCI codepoint included in the DCI message or that are indicated by a TCI state of the single DCI message. For example, the UE 120 may transmit an indication that the UE 120 supports one (or both) of the described techniques for identifying a beam or TCI state of a PDSCH message when a scheduling offset between the DCI message and the PDSCH message scheduled by the DCI message is greater than or equal to a threshold amount of time for applying QCL assumptions (for example, the timeDurationForQCL threshold).

In some aspects, such as where a scheduling offset between the DCI message and a first (for example, first in time) PDSCH message scheduled by the DCI message is greater than or equal to the threshold amount of time for applying QCL assumptions (for example, a timeDurationForQCL threshold), then the UE 120 may support different capabilities for identifying a beam to be used for one or more (or all) of the multiple PDSCH messages. For example, the UE 120 may transmit an indication that the UE 120 supports the same one or more QCL assumptions being applied to all PDSCH transmissions included in the multiple PDSCH transmissions. For example, when a scheduling offset between the DCI message and a PDSCH message scheduled by the DCI message is greater than or equal to a threshold amount of time for applying QCL assumptions, a default beam or default QCL assumption(s) may be applied to the PDSCH message. Additionally or alternatively, the UE 120 may transmit an indication that the UE 120 supports multiple QCL assumptions being applied to the multiple PDSCH transmissions. For example, a default beam or default QCL assumption(s) may be applied for PDSCH message(s), of the multiple PDSCH messages, that are scheduled an amount of time that is less than the threshold amount of time for applying QCL assumptions. For PDSCH message(s), of the multiple PDSCH messages scheduled by the same DCI, that are scheduled an amount of time that is greater than or equal to the threshold amount of time for applying QCL assumptions, the techniques described above for identifying a beam or TCI state of a PDSCH message may be used by the UE 120. The UE 120 may transmit an indication of which technique(s) the UE 120 supports for identifying beam(s), TCI state(s), or QCL assumption(s) for multiple PDSCH messages scheduled by a single DCI message.

In some aspects, a single DCI message may schedule multiple transport blocks (TBs). For example, a PDSCH message may be associated with, or may correspond to, a TB. However, the UE 120 may not support a single DCI scheduling multiple TBs or multiple PDSCH messages in all cases or scenarios. Therefore, in the first operation 505, the UE 120 may transmit, and the base station 110 may receive, an indication that the UE 120 supports a single DCI message scheduling multiple TBs or multiple PDSCH messages for one or more scenarios. A scenario may include single TRP communications, multiple DCI multiple TRP communications, single DCI multiple TRP communications, inter-cell multiple TRP communications, inter-cell beam management communications, or SFN based multiple TRP communications, among other examples. For example, the UE 120 may transmit an indication of one or more supported scenarios or one or more scenarios that are not supported for a single DCI scheduling multiple TBs or multiple PDSCH messages.

In some aspects, the one or more enhanced beam management features or operations may be associated with antenna-panel-specific uplink transmissions. For example, the UE 120 may be configured to transmit uplink transmissions on a given or specific antenna panel. For example, the UE 120 may be configured (for example, by the base station 110 in the second operation 510 or the third operation 515) to transmit one or more SRSs on a given antenna panel. However, the base station 110 may be unaware of how many SRS resources or resource sets can be configured for a given antenna panel or an SRS port. Moreover, the base station 110 may be unaware of whether the UE 120 supports multiple SRS resource sets or resources with different quantities of SRS antenna ports.

Therefore, in the first operation 505, the UE 120 may transmit, and the base station 110 may receive, an indication of whether the UE 120 supports one or more SRS ports being associated with multiple SRS resources or multiple SRS resource sets. Additionally or alternatively, the UE 120 may transmit an indication of one or more supported parameters for an antenna panel or an antenna panel group associated with an SRS resource or an SRS resource set from the multiple SRS resources or the multiple SRS resource sets. A parameter for an antenna panel or an antenna panel group may include an uplink rank (for example, a maximum uplink rank), a quantity of SRS ports for the SRS resource or the SRS resource set, or a coherence type for antenna ports associated with the antenna panel or the antenna panel group, among other examples. For example, the coherence type may be coherent, non-coherent, fully and partially and non-coherent (for example, indicating that coherent, partially coherent, and non-coherent types are supported), partially and non-coherent (for example, indicating that partially coherent and non-coherent types are supported), among other examples. For example, antennas of a multi-antenna UE (for example, the UE 120) may be classified into one of three groups depending on coherence of the antenna ports of the UE. A set of antenna ports (for example, two antenna ports) are coherent if the relative phase among the set of antenna ports (for example, between the two antenna ports) remains the same between the time of an SRS transmission from those antenna ports and a subsequent PUSCH transmission from those antenna ports. A set of antenna ports is considered non-coherent if the relative phase among the set of antenna ports is different for the SRS transmission than for the PUSCH transmission. A set of antenna ports is considered partially coherent if a first subset of the set of antenna ports is coherent with one another and a second subset of the set of antenna ports is coherent with one another, but the first subset of antenna ports and the second subset of antenna ports are not coherent with one another.

For example, the UE 120 may transmit an indication of whether the UE 120 supports multiple SRS resource sets or resources with different quantities of SRS antenna ports. In some aspects, the UE 120 may transmit an indication of a quantity (for example, a maximum quantity) of SRS resource sets (for example, SRS resource sets that can be associated with different quantities of SRS antenna ports or multiple SRS antenna ports) that can be supported by the UE 120. In some aspects, the UE 120 may transmit an indication of a quantity (for example, a maximum quantity) of SRS resources that can be included in an SRS resource set that can be associated with different quantities of SRS antenna ports or multiple SRS antenna ports.

In some aspects, the UE 120 may transmit an indication of one or more supported SRS usage types for the multiple SRS resources or the multiple SRS resource sets (for example, that can be associated with different quantities of SRS antenna ports or multiple SRS antenna ports). For example, a base station 110 may configure a UE 120 with one or more SRS resource sets to allocate resources for SRS transmissions by the UE 120 (for example, in the second operation 510 or the third operation 515). An SRS resource may include one or more antenna ports (for example, an SRS port) on which an SRS is to be transmitted (for example, in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case or usage type (for example, in an SRS-SetUse information element) for the SRS resource set. For example, an SRS resource set may have a usage of antenna switching, codebook, non-codebook, or beam management, among other examples. An antenna switching SRS resource set may be used to indicate downlink CSI with reciprocity between an uplink and downlink channel A codebook SRS resource set may be used to indicate uplink CSI when a base station 110 indicates an uplink precoder to the UE 120. A non-codebook SRS resource set may be used to indicate uplink CSI when the UE 120 selects an uplink precoder. A beam management SRS resource set may be used for indicating CSI for millimeter wave communications. The UE 120 may indicate one or more supported SRS usage types for the multiple SRS resources or the multiple SRS resource sets (for example, that can be associated with different quantities of SRS antenna ports or multiple SRS antenna ports), such as one or more of an antenna switching usage, a codebook usage, a non-codebook usage, or a beam management usage, among other examples.

In some aspects, an SRS resource set may be associated with an antenna panel group (for example, an SRS resource set identifier may be associated with an antenna panel group identifier) or an SRS resource set may be associated with an antenna panel (for example, an SRS resource set identifier may be associated with an antenna panel identifier). Therefore, the UE 120 may be configured (for example, in the third operation 515) to transmit multiple SRSs from different antenna panels in accordance with capabilities associated with the SRS resource set or the antenna panel (for example, in accordance with the capabilities described above). In some aspects, the UE 120 may transmit an indication of a supported application time for associating a resource indicator with at least one of: an SRS resource set identifier, an antenna panel group identifier, an SRS resource identifier, a panel identifier, or one or more supported parameters, for the antenna-panel-specific uplink transmissions. The supported application time may be an amount of time after the UE 120 reports the capabilities associated with an SRS resource set, an antenna panel, or an antenna panel group. The application time may be configured by the base station 110 (for example, in the third operation 515) based at least in part on a fixed value or based at least in part on the UE capability for the supported application time. In some aspects, the supported application time may be based at least in part on an SCS of the UE capability message or an SCS of a scheduling DCI transmitted by the base station 110 (for example, that schedules an SRS transmission). In some aspects, the base station 110 (for example, in the third operation 515) may indicate whether antenna panel capabilities should be reported by the UE 120 via an RRC flag or indicator (for example, based at least in part on the capability of the UE 120, as described above). In some aspects, where multiple SRS resource sets are scheduled for antenna panel-specific uplink transmissions, a DCI that schedules the multiple SRS resource sets to be transmitted may indicate which resource(s) are selected for an indication of a transmit precoder matrix indicator (TPMI) or for non-codebook transmission (for example, via a field in the DCI message, such as an SRS resource indicator (SRI) field). The multiple SRS resources to be transmitted by the UE 120 may be included in the same SRS resource set or different SRS resource sets.

In some aspects, a reported capability associated with an antenna panel or an antenna panel group associated with a downlink reference signal in one CC may be applied (for example, by the base station 110) to multiple CCs. For example, when the downlink reference signal serves as a QCL assumption (for example, a QCL type D) source reference signal for the TCI state(s) associated with other CCs, the base station 110 may assume that a reported capability associated with an antenna panel or an antenna panel group associated with the downlink reference signal may be applied to the other CCs. In some aspects, the multiple CCs may be CCs that are in the same band as the CC associated with the downlink reference signal. Additionally or alternatively, the multiple CCs may be CCs that are in a band combination (for example, for common beam management) with the CC associated with the downlink reference signal. The band combination may be transmitted by the UE 120 to the base station 110 in the first operation 505. Additionally or alternatively, the multiple CCs may be CCs that are included in the same CC list (for example, configured by the base station 110) as the CC associated with the downlink reference signal. The CC list may be associated with simultaneous spatial relation updates across multiple CCs. The reported capability associated with an antenna panel or an antenna panel group may include the capabilities associated with multiple SRS resources, multiple SRS resource sets, or antenna-panel-specific uplink transmissions (for example, as described elsewhere herein in more detail).

In some aspects, the UE 120 may send antenna panel related information associated with a downlink reference signal (for example, a downlink reference signal configured for the UE 120) in a report to base station 110. The reported panel related information may include a coherence type (for example, fully coherent, partially coherent, or non-coherent), associated with codebook-based SRS resources and an antenna port identifier of SRS resources (for example, that are associated with the downlink reference signal). For example, the downlink reference signal may configured to provide an indication (for example, a direct indication or indirect indication) to determine common uplink transmit spatial filter(s) at least for the codebook-based SRS resources. The reported antenna panel related information may be applied to a set of BWPs or a set of CCs, which includes the CC on which the downlink reference signal is configured (for example, when the codebook-based SRS resources are configured across the set of BWPs or the set of CCs). For example, the UE 120 may transmit, to the base station 110, an indication of the antenna panel related information (for example, associated with an SRS resource, such as a codebook-based SRS resource) for a downlink reference signal when the downlink reference signal provides an indication of the common uplink transmit spatial filter(s) for at least the SRS resource (for example, across a set of BWPs or a set of CCs).

In some aspects, the one or more enhanced beam management features or operations may include report-based beam updates. "Report-based beam updates" may refer to a UE 120 selecting or activating a beam based at least in part on a report transmitted by the UE 120 (for example, without receiving additional signaling from the base station 110). For example, rather than waiting for a command from the base station 110 after transmitting a report (for example, a beam measurement report), the UE 120 may select or activate a beam based at least in part on the report. The base station 110 may assume that the UE 120 has selected or activated the beam based at least in part on receiving the report. This may reduce latency and conserve resources associated with selecting or activating a beam to be used for communications between the UE 120 and the base station 110. However, the base station 110 may be unaware of whether the UE 120 is capable of updating or selecting a beam based at least in part on a report transmitted by the UE 120. Therefore, in the first operation 505, the UE 120 may transmit, and the base station 110 may receive, an indication of whether the UE 120 supports updating a beam used by the UE 120 based at least in part on a report transmitted by the UE 120 and without receiving signaling from the base station 110. In other words, the UE 120 may transmit an indication of whether the UE 120 supports report-based beam updates.

In some aspects, the UE 120 may transmit an indication of one or more supported features associated with report-based beam updates. The one or more supported features may include beam selection that is based at least in part on the report transmitted by the UE 120. In some aspects, the UE 120 may indicate whether the UE 120 supports downlink beam selection based on the report or downlink and uplink beam selection based on the report. In some aspects, the one or more supported features may include reporting the selected beam. For example, the UE 120 may transmit an indication that the UE 120 supports reporting the selected beam via an uplink control information (UCI) message, a MAC-CE message, an uplink configured grant message, a contention-based random access (CBRA) message (for example, a type 1 or type 2 CBRA message, as defined by a wireless communication standard, such as the 3GPP), or a contention-free random access (CFRA) message (for example, a type 1 or type 2 CFRA message, as defined by a wireless communication standard, such as the 3GPP), among other examples. In some aspects, the UE 120 may transmit an indication that the UE 120 supports transmitting the selected beam via a UE beam report.

In some aspects, the one or more supported features may include beam activation that is based at least in part on the report transmitted by the UE 120. For example, the UE 120 may support a beam (for example, a reported beam) being activated (for example, may activate a TCI state or a spatial relation associated with the beam) by the UE 120 automatically without having received an activation command (for example, a DCI message or a MAC-CE message) from the base station 110. In some aspects, the one or more supported features may include UE initiated uplink only beam selection (for example, report-based beam selection). In some aspects, the base station 110 may configure a set of beams (for example, a set of uplink beams) available to be used by the UE 120. The base station 110 may configure an active uplink beam for the UE 120. The one or more supported features may include uplink beam selection, from a set of configured uplink beams, that is based at least in part on the report transmitted by the UE. The UE 120 may select a beam (for example, that is included in a report transmitted by the UE 120) based at least in part on the beam being included in the set of beams (for example, the same set of beams that included the currently active uplink beam). This may reduce a likelihood of a beam misalignment between the base station 110 and the UE 120 (for example, because the UE 120 is limited to selecting beams from a defined set of beams).

In the second operation 510, the base station 110 may determine a configuration for a beam management feature or operation based at least in part on a capability reported by the UE 120. For example, the base station 110 may configure the UE 120 to perform one or more enhanced beam management operations in accordance with the capability reported by the UE 120 for the one or more enhanced beam management operations, as described in more detail elsewhere herein. For example, the base station 110 may determine whether the UE 120 is capable of performing the one or more enhanced beam management operations based at least in part on a capability reported by the UE 120. Additionally or alternatively, the base station 110 may determine one or more supported parameters or supported configurations for the one or more enhanced beam management operations based at least in part on a capability reported by the UE 120. As a result, the base station 110 may ensure that the determined configuration for the UE 120 for the one or more enhanced beam management operations is in accordance with the capability of the UE 120.

In the third operation 515, the base station 110 may transmit, and the UE 120 may receive, configuration information for at least one beam management feature, of the one or more enhanced beam management features, based at least in part on the UE 120 transmitting the capability message to the base station 110. For example, the base station 110 may transmit a configuration (for example, an RRC configuration) associated with a unified TCI state, inter-cell beam indications, inter-cell beam measurements, an enhanced P-MPR report, antenna-panel-specific uplink transmissions, report-based beam updates, a group-based beam report, multi-TRP beam failure recovery, or enhanced QCL rules for multiple PDSCH transmissions, among other examples. In some aspects, the UE 120 may receive the configuration information via RRC signaling or MAC signaling (for example, MAC-CEs). In some aspects, the configuration information may include an indication of one or more configuration parameters (for example, already known to the UE 120) for selection by the UE 120 or explicit configuration information for the UE 120 to use to configure the UE 120.

In a fourth operation 520, the UE 120 may configure the UE 120 for communicating with the base station 110. In some aspects, the UE 120 may configure the UE 120 based at least in part on the configuration information. In some aspects, the UE 120 may be configured to perform one or more operations described herein. For example, the UE 120 may be configured to perform one or more enhanced beam management features or operations described herein.

In some other aspects, rather than transmitting a configuration, the base station 110 and the UE 120 may perform the one or more enhanced beam management features or operations in accordance with the reported capability of the UE 120. For example, the UE 120 and the base station 110 may assume that the one or more enhanced beam management features or operations are to be performed in accordance with the reported capability of the UE 120 (for example, without signaling a configuration for the one or more enhanced beam management features).

In a fifth operation 525, the UE 120 and the base station 110 may communicate (for example, transmit or receive signals) to perform at least one enhanced beam management feature or operation of the one or more enhanced beam management features or operations described herein. The UE 120 and the base station 110 may perform the at least one enhanced beam management feature or operation in accordance with the reported capability of the UE 120 (for example, based at least in part on the configuration information transmitted in the third operation 515 or based at least in part on the capability message transmitted in the first operation 505). For example, the UE 120 and the base station 110 may communicate using a unified TCI state. As another example, the UE 120 and the base station 110 may communicate to perform inter-cell beam management. As another example, the UE 120 may measure a signal transmitted by a non-serving cell in accordance with an inter-cell beam management configuration transmitted by the base station 110. As another example, the UE 120 may transmit an enhanced P-MPR report for MPE mitigation. As another example, the UE 120 may transmit one or more SRS transmissions using antenna-panel-specific uplink transmissions (for example, in accordance with a capability that is specific to an antenna panel used by the UE 120). As another example, the UE 120 may select or activate a beam based at least in part on a beam measurement report transmitted by the UE 120. As another example, the UE 120 may transmit a group-based beam measurement report that includes multiple groups of beams. As another example, the UE 120 may perform one or more operations associated with multi-TRP beam failure recovery (for example, based at least in part on a BFD-RS configuration or an NBI-RS configuration that is in accordance with the capability of the UE 120). As another example, the UE 120 may receive a single DCI that schedules multiple PDSCH messages or multiple TBs and may be enabled to identify beam(s) for the multiple PDSCH messages or the multiple TBs.

As a result, the described techniques can be used to improve beam management operations between the UE 120 and the base station 110. In some examples, the capability message transmitted by the UE 120 (for example, in the first operation 505) may enable the base station 110 to configure (for example, in the second operation 510 or the third operation 515) or perform (for example, in the fifth operation 525) the one or more enhanced beam management features or operations. Performing the one or more enhanced beam management features or operations may improve beam management within the wireless network and may result in improved network performance. For example, performing the one or more enhanced beam management features or operations may increase efficiency of beam management operations, or reduce complexity associated with beam management operations, among other examples.

Figure 6:
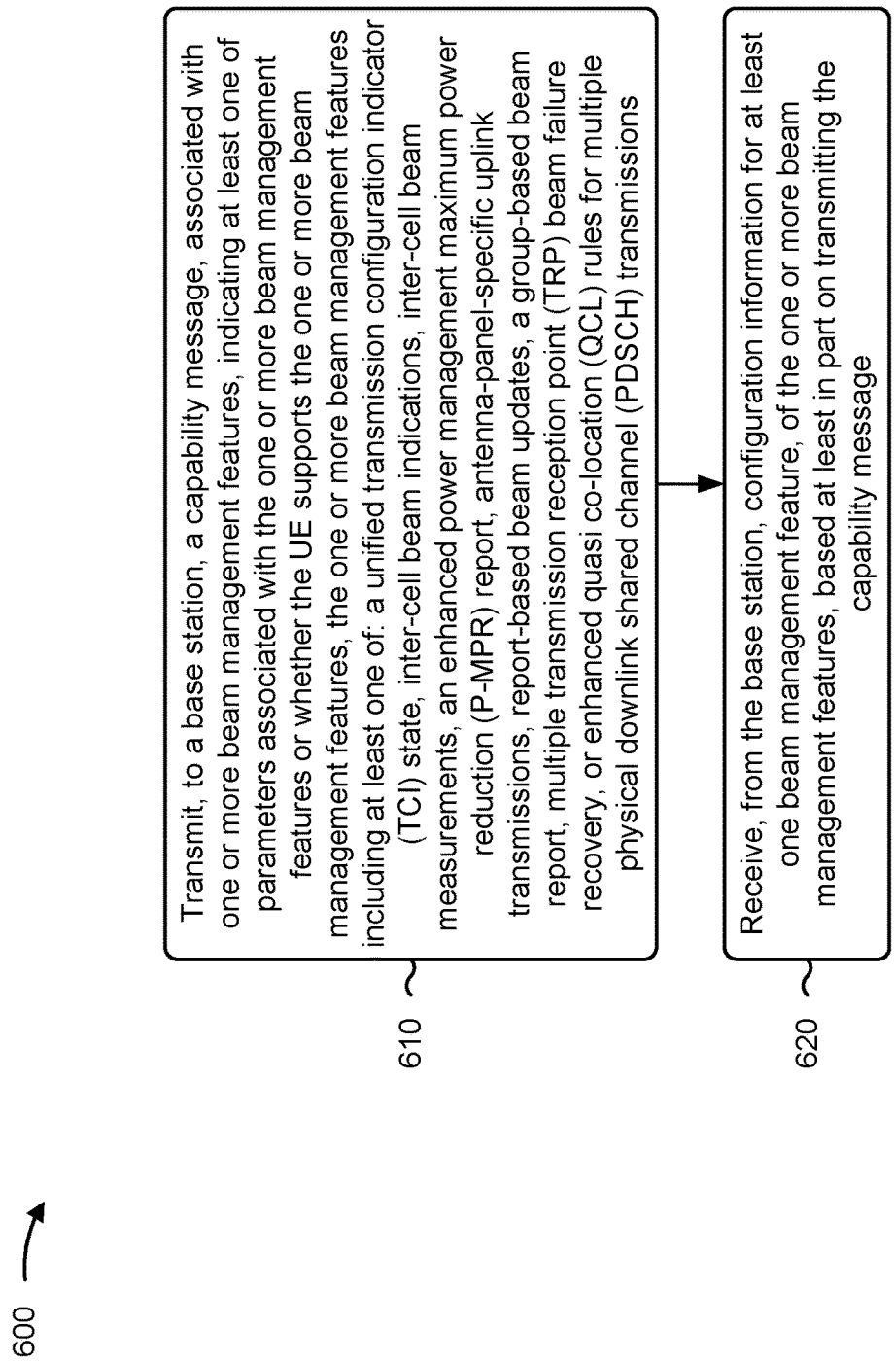
FIG. 6 is a flowchart illustrating an example process performed, for example, by a UE, associated with UE capability signaling for enhanced beam management features, in accordance with the present disclosure.

FIG. 6 is a flowchart illustrating an example process 600 performed, for example, by a UE, associated with UE capability signaling for enhanced beam management features, in accordance with the present disclosure. Example process 600 is an example where the UE (for example, UE 120) performs operations associated with UE capability signaling for enhanced beam management features.

As shown in FIG. 6, in some aspects, process 600 may include transmitting, to a base station, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions (block 610). For example, the UE (such as by using communication manager 140 or transmission component 804, depicted in FIG. 8) may transmit, to a base station, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions, as described above.

As further shown in FIG. 6, in some aspects, process 600 may include receiving, from the base station, configuration information for at least one beam management feature, of the one or more beam management features, based at least in part on transmitting the capability message (block 620). For example, the UE (such as by using communication manager 140 or reception component 802, depicted in FIG. 8) may receive, from the base station, configuration information for at least one beam management feature, of the one or more beam management features, based at least in part on transmitting the capability message, as described above.

Process 600 may include additional aspects, such as any single aspect or any combination of aspects described below or in connection with one or more other processes described elsewhere herein.

In a first additional aspect, the one or more beam management features include the unified TCI state, and the capability message includes an indication of whether the UE supports at least one of joint downlink and uplink TCI states, or separating downlink and uplink TCI states.

In a second additional aspect, alone or in combination with the first aspect, transmitting the indication includes transmitting an indication of whether the UE supports a unified TCI state type for intra-cell beam management.

In a third additional aspect, alone or in combination with one or more of the first and second aspects, the one or more beam management features include the unified TCI state, and the capability message includes an indication of whether the UE supports TCI-specific power control parameters for the unified TCI state.

In a fourth additional aspect, alone or in combination with one or more of the first through third aspects, transmitting the indication of whether the UE supports TCI-specific power control parameters for the unified TCI state includes transmitting an indication of whether the UE supports TCI-specific power control parameters for the unified TCI state and an uplink channel of reference signal type.

In a fifth additional aspect, alone or in combination with one or more of the first through fourth aspects, the one or more beam management features include the unified TCI state, and the capability message includes an indication of whether the UE supports a receive beam for a pathloss reference signal associated with the unified TCI state being different than a transmit beam indicated by the unified TCI state.

In a sixth additional aspect, alone or in combination with one or more of the first through fifth aspects, the one or more beam management features include the unified TCI state, and the capability message includes an indication of a supported beam indication scheme for the unified TCI state, where the supported beam indication scheme includes at least one of a MAC-CE based TCI indication, a first MAC-CE based and DCI based TCI indication, where a DCI associated with the supported beam indication scheme schedules a downlink communication, or a second MAC-CE based and DCI based TCI indication, where the DCI associated with the supported beam indication scheme does not schedule any downlink communications.

In a seventh additional aspect, alone or in combination with one or more of the first through sixth aspects, the one or more beam management features include the unified TCI state, and the capability message includes an indication of a supported time gap from a time at which a DCI-based beam indication is received to a time at which a TCI state indicated by the DCI-based beam indication is applied.

In an eighth additional aspect, alone or in combination with one or more of the first through seventh aspects, the DCI-based beam indication is associated with a first SCS and the TCI state is associated with a second SCS, and transmitting the indication of the supported time gap includes transmitting an indication of a first time gap value that is based at least in part on the first SCS, and a second time gap value that is based at least in part on the second SCS.

In a ninth additional aspect, alone or in combination with one or more of the first through eighth aspects, the TCI state is associated with multiple SCSs across one or more bandwidth parts or one or more component carriers, and the supported time gap is based at least in part on a largest time gap among multiple time gaps associated with the multiple SCSs.

In a tenth additional aspect, alone or in combination with one or more of the first through ninth aspects, the one or more beam management features include the unified TCI state, and the capability message includes an indication of whether the unified TCI state can be applied to multiple bandwidth parts or multiple component carriers.

In an eleventh additional aspect, alone or in combination with one or more of the first through tenth aspects, the one or more beam management features include the unified TCI state, and the capability message includes an indication of whether the UE supports a first unified TCI state pool for each bandwidth part or each component carrier, or supports a second unified TCI state pool that is configured on one bandwidth part or one component carrier and that is shared by multiple bandwidth parts or multiple component carriers.

In a twelfth additional aspect, alone or in combination with one or more of the first through eleventh aspects, the one or more beam management features include the unified TCI state, and the capability message includes an indication of a quantity of TCI state pools that can be configured across all bandwidth parts or component carriers in a frequency band.

In a thirteenth additional aspect, alone or in combination with one or more of the first through twelfth aspects, the one or more beam management features include the unified TCI state, and the capability message includes an indication of whether the UE supports simultaneous configurations of the unified TCI state and a non-unified TCI state, or a spatial relation on the same bandwidth part or the same component carrier or across multiple bandwidth parts or multiple component carriers.

In a fourteenth additional aspect, alone or in combination with one or more of the first through thirteenth aspects, the one or more beam management features include the unified TCI state, and the capability message includes an indication of a quantity of configured or activated unified TCI states supported by the UE.

In a fifteenth additional aspect, alone or in combination with one or more of the first through fourteenth aspects, the quantity of configured or activated unified TCI states is associated with at least one of a unified TCI state type, all unified TCI state types, a subset of unified TCI state types, activating joint downlink and uplink TCI state types and uplink only TCI state types, activating joint downlink and uplink TCI state types and downlink only TCI state types, a bandwidth part, a component carrier, multiple bandwidth parts, multiple component carriers, a frequency band, or multiple frequency bands.

In a sixteenth additional aspect, alone or in combination with one or more of the first through fifteenth aspects, the quantity of configured or activated unified TCI states is independent of configured or activated non-unified TCI states or spatial relations.

In a seventeenth additional aspect, alone or in combination with one or more of the first through sixteenth aspects, the quantity of configured or activated unified TCI states is based at least in part on a quantity of configured or activated non-unified TCI states or spatial relations.

In an eighteenth additional aspect, alone or in combination with one or more of the first through seventeenth aspects, the one or more beam management features include the unified TCI state and the inter-cell beam indications, and the capability message includes an indication of whether the UE supports a reference signal from a non-serving cell being a source reference signal for the unified TCI state.

In a nineteenth additional aspect, alone or in combination with one or more of the first through eighteenth aspects, the one or more beam management features include the unified TCI state, and the capability message includes an indication of a first supported quantity of CORESETs or a second supported quantity of CORESET QCL assumptions for each bandwidth part or each component carrier in a frequency band.

In a twentieth additional aspect, alone or in combination with one or more of the first through nineteenth aspects, the capability message includes a first one or more capabilities for the one or more beam management features for intra-cell beam management, and transmitting a second one or more capabilities for the one or more beam management features for inter-cell beam management.

In a twenty-first additional aspect, alone or in combination with one or more of the first through twentieth aspects, the one or more beam management features include the unified TCI state and the inter-cell beam indications, and the capability message includes an indication of whether the UE supports a receive timing difference between a serving cell and a non-serving cell being larger than a size of a CP used by the UE.

In a twenty-second additional aspect, alone or in combination with one or more of the first through twenty-first aspects, transmitting the indication of whether the UE supports the receive timing difference between the serving cell and the non-serving cell being larger than the size of the CP used by the UE includes transmitting an indication of a quantity of non-serving cells or groups of cells that the UE can support with the receive timing difference.

In a twenty-third additional aspect, alone or in combination with one or more of the first through twenty-second aspects, transmitting the indication of whether the UE supports the receive timing difference between the serving cell and the non-serving cell being larger than the size of the CP used by the UE includes transmitting an indication of a supported receive timing difference.

In a twenty-fourth additional aspect, alone or in combination with one or more of the first through twenty-third aspects, the one or more beam management features include the unified TCI state and the inter-cell beam indications, and the capability message includes an indication of whether the UE supports a first timing advance value for a non-serving cell that is different than a second timing advance value for a serving cell.

In a twenty-fifth additional aspect, alone or in combination with one or more of the first through twenty-fourth aspects, the capability message includes an indication of a quantity of timing advance values or timing advance groups for the non-serving cell supported by the UE.

In a twenty-sixth additional aspect, alone or in combination with one or more of the first through twenty-fifth aspects, the one or more beam management features include the unified TCI state and the inter-cell beam measurements, and the capability message includes an indication of whether the UE supports beam measurements using a downlink reference signal associated with a non-serving cell.

In a twenty-seventh additional aspect, alone or in combination with one or more of the first through twenty-sixth aspects, the capability message includes an indication of a quantity of non-serving cells that can be configured for the inter-cell beam measurements.

In a twenty-eighth additional aspect, alone or in combination with one or more of the first through twenty-seventh aspects, the capability message includes an indication of a quantity of cells that can be configured for Layer 1 RSRP reports associated with inter-cell beam management.

In a twenty-ninth additional aspect, alone or in combination with one or more of the first through twenty-eighth aspects, the one or more beam management features include the unified TCI state and the inter-cell beam measurements, and the capability message includes an indication of whether the UE supports measurements associated with a serving cell and a non-serving cell being included in the same measurement report transmitted by the UE.

In a thirtieth additional aspect, alone or in combination with one or more of the first through twenty-ninth aspects, the one or more beam management features include the unified TCI state and the inter-cell beam measurements, and the capability message includes an indication of whether the UE supports measurements of downlink reference signals, associated with different cells and that at least partially overlap in a time domain, being included in the same measurement report transmitted by the UE.

In a thirty-first additional aspect, alone or in combination with one or more of the first through thirtieth aspects, the one or more beam management features include the unified TCI state and the inter-cell beam measurements, and the capability message includes an indication of a quantity of downlink reference signals, associated with different cells and that at least partially overlap in a time domain that can be included in the same measurement report.

In a thirty-second additional aspect, alone or in combination with one or more of the first through thirty-first aspects, the one or more beam management features include the unified TCI state and the inter-cell beam measurements, and the capability message includes an indication of whether the UE supports a receive timing difference between a serving cell and a non-serving cell being larger than a size of a CP for the inter-cell beam measurements.

In a thirty-third additional aspect, alone or in combination with one or more of the first through thirty-second aspects, transmitting the indication of whether the UE supports the receive timing difference between the serving cell and the non-serving cell being larger than the size of the CP includes transmitting an indication of a quantity of non-serving cells or groups of cells that the UE can support with the receive timing difference for the inter-cell beam measurements.

In a thirty-fourth additional aspect, alone or in combination with one or more of the first through thirty-third aspects, transmitting the indication of whether the UE supports the receive timing difference between the serving cell and the non-serving cell being larger than the size of the CP used by the UE includes transmitting an indication of a supported receive timing difference for the inter-cell beam measurements.

In a thirty-fifth additional aspect, alone or in combination with one or more of the first through thirty-fourth aspects, the one or more beam management features include the unified TCI state and the inter-cell beam measurements, and the capability message includes an indication of whether the UE supports at least one of Layer 1 event-based inter-cell beam measurement reporting, or MAC-CE event-based inter-cell beam measurement reporting.

In a thirty-sixth additional aspect, alone or in combination with one or more of the first through thirty-fifth aspects, the one or more beam management features include the enhanced P-MPR report, and the capability message includes an indication of whether the UE supports transmitting a P-MPR report or a power headroom report for MPE mitigation, where the P-MPR report or the power headroom report includes a resource indicator or a beam indicator.

In a thirty-seventh additional aspect, alone or in combination with one or more of the first through thirty-sixth aspects, the capability message includes an indication of a quantity of beams or antenna panels for a serving cell that can be reported in a single P-MPR report.

In a thirty-eighth additional aspect, alone or in combination with one or more of the first through thirty-seventh aspects, the capability message includes an indication of whether the UE supports a beam-level P-MPR report or an antenna-panel-level P-MPR report.

In a thirty-ninth additional aspect, alone or in combination with one or more of the first through thirty-eighth aspects, the capability message includes an indication of whether the UE supports indicating a measurement parameter associated with the resource indicator or the beam indicator in the enhanced P-MPR report.

In a fortieth additional aspect, alone or in combination with one or more of the first through thirty-ninth aspects, the capability message includes an indication of whether the UE supports transmitting the enhanced P-MPR report via a MAC-CE message or a CSI report.

In a forty-first additional aspect, alone or in combination with one or more of the first through fortieth aspects, the one or more beam management features include the antenna-panel-specific uplink transmissions, and the capability message includes an indication of whether the UE supports one or more SRS ports being associated with multiple SRS resources or multiple SRS resource sets.

In a forty-second additional aspect, alone or in combination with one or more of the first through forty-first aspects, the capability message includes an indication of a supported parameter for an antenna panel or an antenna panel group associated with an SRS resource or an SRS resource set from the multiple SRS resources or the multiple SRS resource sets, where the supported parameter includes at least one of an uplink rank, a quantity of SRS ports for the SRS resource or the SRS resource set, or a coherence type for antenna ports associated with the antenna panel or the antenna panel group.

In a forty-third additional aspect, alone or in combination with one or more of the first through forty-second aspects, the capability message includes an indication of one or more supported SRS usage types for the multiple SRS resources or the multiple SRS resource sets.

In a forty-fourth additional aspect, alone or in combination with one or more of the first through forty-third aspects, the capability message includes an indication of a supported application time for associating a resource indicator with at least one of an SRS resource set identifier, an antenna panel group identifier, an SRS resource identifier, a panel identifier, or one or more supported parameters, for the antenna-panel-specific uplink transmissions.

In a forty-fifth additional aspect, alone or in combination with one or more of the first through forty-fourth aspects, the one or more beam management features include the report-based beam updates, and the capability message includes an indication of whether the UE supports updating a beam used by the UE based at least in part on a report transmitted by the UE and without receiving signaling from the base station.

In a forty-sixth additional aspect, alone or in combination with one or more of the first through forty-fifth aspects, the capability message includes an indication of whether the UE supports at least one of beam selection that is based at least in part on the report transmitted by the UE, beam activation that is based at least in part on the report transmitted by the UE, or uplink beam selection, from a set of configured uplink beams, that is based at least in part on the report transmitted by the UE.

In a forty-seventh additional aspect, alone or in combination with one or more of the first through forty-sixth aspects, the one or more beam management features include the group-based beam report, and the capability message includes an indication of one or more capabilities associated with the group-based beam report, where the group-based beam report includes multiple beam groups, and where at least two beam groups, from the multiple beam groups, are associated with different resource sets.

In a forty-eighth additional aspect, alone or in combination with one or more of the first through forty-seventh aspects, the one or more capabilities include at least one of a quantity of beam groups that can be included in the group-based beam report, one or more supported timing schedules of resources to be measured for the group-based beam report, one or more supported transmission timing schedules for the group-based beam report, one or more supported measurement parameters for each beam included in the group-based beam report, or reporting a beam group, from the multiple beam groups, that includes a first beam associated with a serving cell and a second beam associated with a non-serving cell.

In a forty-ninth additional aspect, alone or in combination with one or more of the first through forty-eighth aspects, the one or more beam management features include the multiple TRP beam failure recovery, and the capability message includes an indication of one or more capabilities for the multiple TRP beam failure recovery.

In a fiftieth additional aspect, alone or in combination with one or more of the first through forty-ninth aspects, the one or more supported capabilities for the multiple TRP beam failure recovery include at least one of supporting two or more BFD reference signal sets for each downlink bandwidth part (for example, in a frequency band), a first quantity of BFD reference signal resources that can be included in a BFD reference signal resource set, a second quantity of BFD reference signals that can be included in BFD reference signal resource sets associated with each downlink bandwidth part, one or more supported BFD reference signal types, supporting two or more NBI reference signal sets for each downlink bandwidth part, a third quantity of NBI reference signals that can be included in an NBI reference signal resource set, a fourth quantity of NBI reference signals that can be included in NBI reference signal resource sets associated with each downlink bandwidth part (for example, in a frequency band), a quantity of total resources across one frequency range or all frequency ranges that includes BFD reference signal resources and NBI reference signal resources for multiple TRP beam failure recovery, a fifth quantity of PUCCH scheduling request resources that can be included in a cell group for multiple TRP beam failure recovery, or supporting a reset of all CORESETs associated with a failed BFD reference signal.

In a fifty-first additional aspect, alone or in combination with one or more of the first through fiftieth aspects, the one or more beam management features include the enhanced QCL rules for multiple PDSCH transmissions, and the capability message includes an indication of whether the UE supports the enhanced QCL rules associated with the multiple PDSCH transmissions being scheduled by a single DCI message.

In a fifty-second additional aspect, alone or in combination with one or more of the first through fifty-first aspects, a scheduling offset for all PDSCH transmissions included in the multiple PDSCH transmissions is greater than or equal to a time duration associated with the enhanced QCL rules, and the enhanced QCL rules associated with the multiple PDSCH transmissions are indicated by a TCI codepoint included in the single DCI message or are indicated by a TCI state of the single DCI message.

In a fifty-third additional aspect, alone or in combination with one or more of the first through fifty-second aspects, a scheduling offset for at least one PDSCH transmission included in the multiple PDSCH transmissions is less than a time duration associated with the enhanced QCL rules, and the capability message includes an indication that the UE supports at least one of the same one or more QCL assumptions being applied to all PDSCH transmissions included in the multiple PDSCH transmissions, or multiple QCL assumptions being applied to the multiple PDSCH transmissions.

In a fifty-fourth additional aspect, alone or in combination with one or more of the first through fifty-third aspects, the capability message includes an indication that the UE supports a single DCI message scheduling multiple transport blocks for one or more scenarios, where the one or more scenarios include at least one of single TRP communications, multiple DCI multiple TRP communications, single DCI multiple TRP communications, inter-cell multiple TRP communications, inter-cell beam management communications, or single frequency network based multiple TRP communications.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
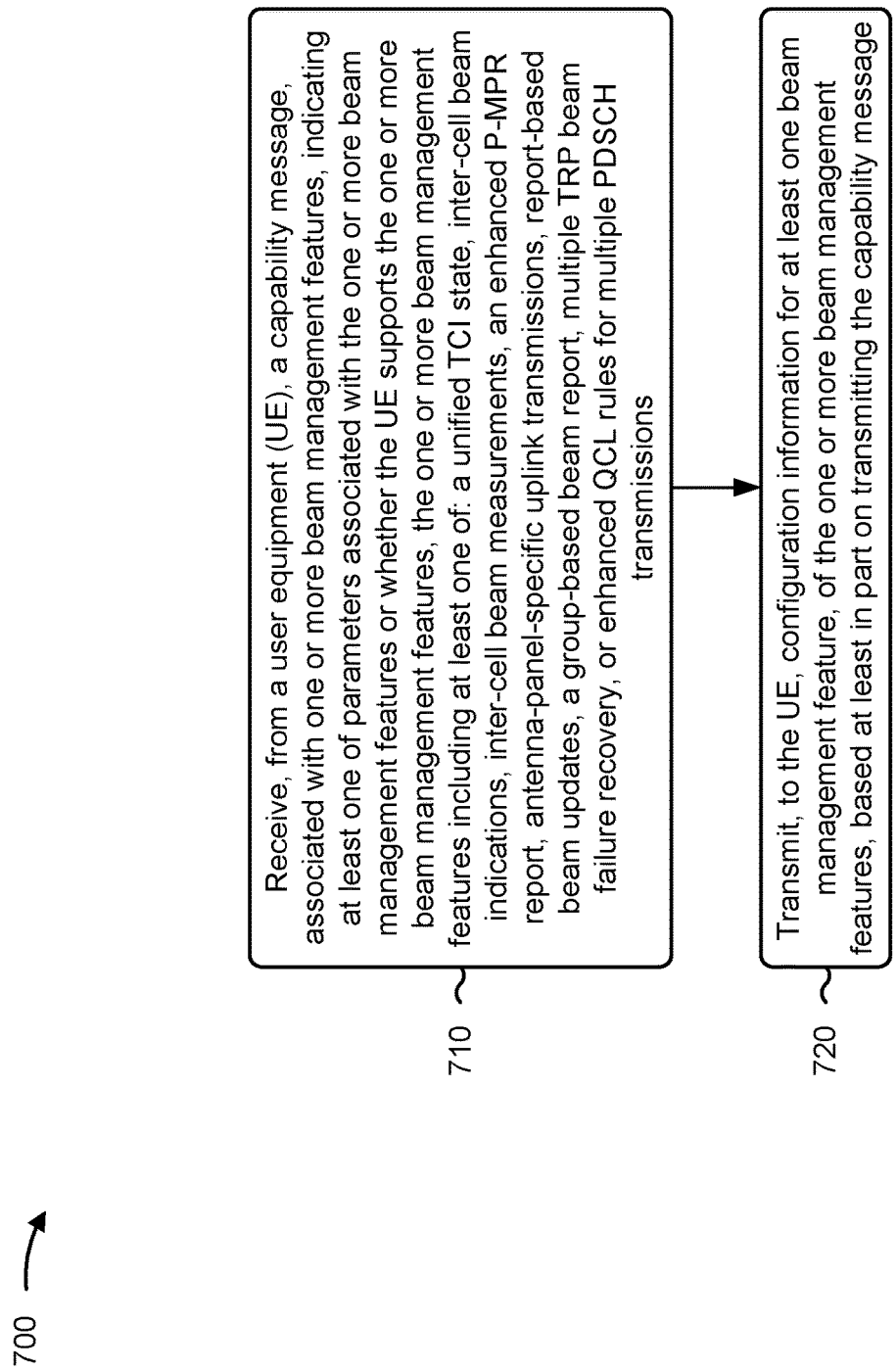
FIG. 7 is a flowchart illustrating an example process performed, for example, by a base station, associated with UE capability signaling for enhanced beam management features, in accordance with the present disclosure.

FIG. 7 is a flowchart illustrating an example process 700 performed, for example, by a base station, associated with UE capability signaling for enhanced beam management features, in accordance with the present disclosure. Example process 700 is an example where the base station (for example, base station 110) performs operations associated with UE capability signaling for enhanced beam management features.

As shown in FIG. 7, in some aspects, process 700 may include receiving, from a UE, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions (block 710). For example, the base station (such as by using communication manager 150 or reception component 902, depicted in FIG. 9) may receive, from a UE, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions, as described above.

As further shown in FIG. 7, in some aspects, process 700 may include transmitting, to the UE, configuration information for at least one beam management feature, of the one or more beam management features, based at least in part on transmitting the capability message (block 720). For example, the base station (such as by using communication manager 150 or transmission component 904, depicted in FIG. 9) may transmit, to the UE, configuration information for at least one beam management feature, of the one or more beam management features, based at least in part on transmitting the capability message, as described above.

Process 700 may include additional aspects, such as any single aspect or any combination of aspects described below or in connection with one or more other processes described elsewhere herein.

In a first additional aspect, the one or more beam management features include the unified TCI state, and the capability message includes an indication of whether the UE supports at least one of joint downlink and uplink TCI states, or separating downlink and uplink TCI states.

In a second additional aspect, alone or in combination with the first aspect, receiving the indication includes receiving an indication of whether the UE supports a unified TCI state type for intra-cell beam management.

In a third additional aspect, alone or in combination with one or more of the first and second aspects, the one or more beam management features include the unified TCI state, and the capability message includes an indication of whether the UE supports TCI-specific power control parameters for the unified TCI state.

In a fourth additional aspect, alone or in combination with one or more of the first through third aspects, receiving the indication of whether the UE supports TCI-specific power control parameters for the unified TCI state includes receiving an indication of whether the UE supports TCI-specific power control parameters for the unified TCI state and an uplink channel of reference signal type.

In a fifth additional aspect, alone or in combination with one or more of the first through fourth aspects, the one or more beam management features include the unified TCI state, and the capability message includes an indication of whether the UE supports a receive beam for a pathloss reference signal associated with the unified TCI state being different than a transmit beam indicated by the unified TCI state.

In a sixth additional aspect, alone or in combination with one or more of the first through fifth aspects, the one or more beam management features include the unified TCI state, and the capability message includes an indication of a supported beam indication scheme for the unified TCI state, where the supported beam indication scheme includes at least one of a MAC-CE based TCI indication, a first MAC-CE based and DCI based TCI indication, where a DCI associated with the supported beam indication scheme schedules a downlink communication, or a second MAC-CE based and DCI based TCI indication, where the DCI associated with the supported beam indication scheme does not schedule any downlink communications.

In a seventh additional aspect, alone or in combination with one or more of the first through sixth aspects, the one or more beam management features include the unified TCI state, and the capability message includes an indication of a supported time gap from a time at which a DCI-based beam indication is received to a time at which a TCI state indicated by the DCI-based beam indication is applied.

In an eighth additional aspect, alone or in combination with one or more of the first through seventh aspects, the DCI-based beam indication is associated with a first SCS and the TCI state is associated with a second SCS, and where receiving an indication of the supported time gap includes receiving an indication of a first time gap value that is based at least in part on the first SCS, and a second time gap value that is based at least in part on the second SCS.

In a ninth additional aspect, alone or in combination with one or more of the first through eighth aspects, the TCI state is associated with multiple SCSs across one or more bandwidth parts or one or more component carriers, and the supported time gap is based at least in part on a largest time gap among multiple time gaps associated with the multiple SCSs.

In a tenth additional aspect, alone or in combination with one or more of the first through ninth aspects, the one or more beam management features include the unified TCI state, and the capability message includes an indication of whether the unified TCI state can be applied to multiple bandwidth parts or multiple component carriers.

In an eleventh additional aspect, alone or in combination with one or more of the first through tenth aspects, the one or more beam management features include the unified TCI state, and the capability message includes an indication of whether the UE supports a first unified TCI state pool for each bandwidth part or each component carrier, or supports a second unified TCI state pool that is configured on one bandwidth part or one component carrier and that is shared by multiple bandwidth parts or multiple component carriers.

In a twelfth additional aspect, alone or in combination with one or more of the first through eleventh aspects, the one or more beam management features include the unified TCI state, and the capability message includes an indication of a quantity of TCI state pools that can be configured across all bandwidth parts or component carriers in a frequency band.

In a thirteenth additional aspect, alone or in combination with one or more of the first through twelfth aspects, the one or more beam management features include the unified TCI state, and the capability message includes an indication of whether the UE supports simultaneous configurations of the unified TCI state and a non-unified TCI state, or a spatial relation on the same bandwidth part or the same component carrier or across multiple bandwidth parts or multiple component carriers.

In a fourteenth additional aspect, alone or in combination with one or more of the first through thirteenth aspects, the one or more beam management features include the unified TCI state, and the capability message includes an indication of a quantity of configured or activated unified TCI states supported by the UE.

In a fifteenth additional aspect, alone or in combination with one or more of the first through fourteenth aspects, the quantity of configured or activated unified TCI states is associated with at least one of a unified TCI state type, all unified TCI state types, a subset of unified TCI state types, activating joint downlink and uplink TCI state types and uplink only TCI state types, activating joint downlink and uplink TCI state types and downlink only TCI state types, a bandwidth part, a component carrier, multiple bandwidth parts, multiple component carriers, a frequency band, or multiple frequency bands.

In a sixteenth additional aspect, alone or in combination with one or more of the first through fifteenth aspects, the quantity of configured or activated unified TCI states is independent of configured or activated non-unified TCI states or spatial relations.

In a seventeenth additional aspect, alone or in combination with one or more of the first through sixteenth aspects, the quantity of configured or activated unified TCI states is based at least in part on a quantity of configured or activated non-unified TCI states or spatial relations.

In an eighteenth additional aspect, alone or in combination with one or more of the first through seventeenth aspects, the one or more beam management features include the unified TCI state and the inter-cell beam indications, and the capability message includes an indication of whether the UE supports a reference signal from a non-serving cell being a source reference signal for the unified TCI state.

In a nineteenth additional aspect, alone or in combination with one or more of the first through eighteenth aspects, the one or more beam management features include the unified TCI state, and the capability message includes an indication of a first supported quantity of CORESETs or a second supported quantity of CORESET QCL assumptions for each bandwidth part or each component carrier in a frequency band.

In a twentieth additional aspect, alone or in combination with one or more of the first through nineteenth aspects, the capability message includes a first one or more capabilities for the one or more beam management features for intra-cell beam management, and receiving a second one or more capabilities for the one or more beam management features for inter-cell beam management.

In a twenty-first additional aspect, alone or in combination with one or more of the first through twentieth aspects, the one or more beam management features include the unified TCI state and the inter-cell beam indications, and the capability message includes an indication of whether the UE supports a receive timing difference between a serving cell and a non-serving cell being larger than a size of a CP used by the UE.

In a twenty-second additional aspect, alone or in combination with one or more of the first through twenty-first aspects, receiving the indication of whether the UE supports the receive timing difference between the serving cell and the non-serving cell being larger than the size of the CP used by the UE includes receiving an indication of a quantity of non-serving cells or groups of cells that the UE can support with the receive timing difference.

In a twenty-third additional aspect, alone or in combination with one or more of the first through twenty-second aspects, receiving the indication of whether the UE supports the receive timing difference between the serving cell and the non-serving cell being larger than the size of the CP used by the UE includes receiving an indication of a supported receive timing difference.

In a twenty-fourth additional aspect, alone or in combination with one or more of the first through twenty-third aspects, the one or more beam management features include the unified TCI state and the inter-cell beam indications, and the capability message includes an indication of whether the UE supports a first timing advance value for a non-serving cell that is different than a second timing advance value for a serving cell.

In a twenty-fifth additional aspect, alone or in combination with one or more of the first through twenty-fourth aspects, the capability message includes an indication of a quantity of timing advance values or timing advance groups for the non-serving cell supported by the UE.

In a twenty-sixth additional aspect, alone or in combination with one or more of the first through twenty-fifth aspects, the one or more beam management features include the unified TCI state and the inter-cell beam measurements, and the capability message includes an indication of whether the UE supports beam measurements using a downlink reference signal associated with a non-serving cell.

In a twenty-seventh additional aspect, alone or in combination with one or more of the first through twenty-sixth aspects, the capability message includes an indication of a quantity of non-serving cells that can be configured for the inter-cell beam measurements.

In a twenty-eighth additional aspect, alone or in combination with one or more of the first through twenty-seventh aspects, the capability message includes an indication of a quantity of cells that can be configured for Layer 1 RSRP reports associated with inter-cell beam management.

In a twenty-ninth additional aspect, alone or in combination with one or more of the first through twenty-eighth aspects, the one or more beam management features include the unified TCI state and the inter-cell beam measurements, and the capability message includes an indication of whether the UE supports measurements associated with a serving cell and a non-serving cell being included in the same measurement report transmitted by the UE.

In a thirtieth additional aspect, alone or in combination with one or more of the first through twenty-ninth aspects, the one or more beam management features include the unified TCI state and the inter-cell beam measurements, and the capability message includes an indication of whether the UE supports measurements of downlink reference signals, associated with different cells and that at least partially overlap in a time domain, being included in the same measurement report transmitted by the UE.

In a thirty-first additional aspect, alone or in combination with one or more of the first through thirtieth aspects, the one or more beam management features include the unified TCI state and the inter-cell beam measurements, and the capability message includes an indication of a quantity of downlink reference signals, associated with different cells and that at least partially overlap in a time domain that can be included in the same measurement report.

In a thirty-second additional aspect, alone or in combination with one or more of the first through thirty-first aspects, the one or more beam management features include the unified TCI state and the inter-cell beam measurements, and the capability message includes an indication of whether the UE supports a receive timing difference between a serving cell and a non-serving cell being larger than a size of a CP for the inter-cell beam measurements.

In a thirty-third additional aspect, alone or in combination with one or more of the first through thirty-second aspects, receiving the indication of whether the UE supports the receive timing difference between the serving cell and the non-serving cell being larger than the size of the CP includes receiving an indication of a quantity of non-serving cells or groups of cells that the UE can support with the receive timing difference for the inter-cell beam measurements.

In a thirty-fourth additional aspect, alone or in combination with one or more of the first through thirty-third aspects, receiving the indication of whether the UE supports the receive timing difference between the serving cell and the non-serving cell being larger than the size of the CP used by the UE includes receiving an indication of a supported receive timing difference for the inter-cell beam measurements.

In a thirty-fifth additional aspect, alone or in combination with one or more of the first through thirty-fourth aspects, the one or more beam management features include the unified TCI state and the inter-cell beam measurements, and the capability message includes an indication of whether the UE supports at least one of Layer 1 event-based inter-cell beam measurement reporting, or MAC-CE event-based inter-cell beam measurement reporting.

In a thirty-sixth additional aspect, alone or in combination with one or more of the first through thirty-fifth aspects, the one or more beam management features include the enhanced P-MPR report, and the capability message includes an indication of whether the UE supports receiving a P-MPR report or a power headroom report for MPE mitigation, where the P-MPR report or the power headroom report includes a resource indicator or a beam indicator.

In a thirty-seventh additional aspect, alone or in combination with one or more of the first through thirty-sixth aspects, the capability message includes an indication of a quantity of beams or antenna panels for a serving cell that can be reported in a single P-MPR report.

In a thirty-eighth additional aspect, alone or in combination with one or more of the first through thirty-seventh aspects, the capability message includes an indication of whether the UE supports a beam-level P-MPR report or an antenna-panel-level P-MPR report.

In a thirty-ninth additional aspect, alone or in combination with one or more of the first through thirty-eighth aspects, the capability message includes an indication of whether the UE supports indicating a measurement parameter associated with the resource indicator or the beam indicator in the enhanced P-MPR report.

In a fortieth additional aspect, alone or in combination with one or more of the first through thirty-ninth aspects, the capability message includes an indication of whether the UE supports receiving the enhanced P-MPR report via a MAC-CE message or a CSI report.

In a forty-first additional aspect, alone or in combination with one or more of the first through fortieth aspects, the one or more beam management features include the antenna-panel-specific uplink transmissions, and the capability message includes an indication of whether the UE supports one or more SRS ports being associated with multiple SRS resources or multiple SRS resource sets.

In a forty-second additional aspect, alone or in combination with one or more of the first through forty-first aspects, the capability message includes an indication of a supported parameter for an antenna panel or an antenna panel group associated with an SRS resource or an SRS resource set from the multiple SRS resources or the multiple SRS resource sets, where the supported parameter includes at least one of an uplink rank, a quantity of SRS ports for the SRS resource or the SRS resource set, or a coherence type for antenna ports associated with the antenna panel or the antenna panel group.

In a forty-third additional aspect, alone or in combination with one or more of the first through forty-second aspects, the capability message includes an indication of one or more supported SRS usage types for the multiple SRS resources or the multiple SRS resource sets.

In a forty-fourth additional aspect, alone or in combination with one or more of the first through forty-third aspects, the capability message includes an indication of a supported application time for associating a resource indicator with at least one of an SRS resource set identifier, an antenna panel group identifier, an SRS resource identifier, a panel identifier, or one or more supported parameters, for the antenna-panel-specific uplink transmissions.

In a forty-fifth additional aspect, alone or in combination with one or more of the first through forty-fourth aspects, the one or more beam management features include the report-based beam updates, and the capability message includes an indication of whether the UE supports updating a beam used by the UE based at least in part on a report transmitted by the UE and without receiving signaling from the base station.

In a forty-sixth additional aspect, alone or in combination with one or more of the first through forty-fifth aspects, the capability message includes an indication of whether the UE supports at least one of beam selection that is based at least in part on the report transmitted by the UE, beam activation that is based at least in part on the report transmitted by the UE, or uplink beam selection, from a set of configured uplink beams, that is based at least in part on the report transmitted by the UE.

In a forty-seventh additional aspect, alone or in combination with one or more of the first through forty-sixth aspects, the one or more beam management features include the group-based beam report, and the capability message includes an indication of one or more capabilities associated with the group-based beam report, where the group-based beam report includes multiple beam groups, and where at least two beam groups, from the multiple beam groups, are associated with different resource sets.

In a forty-eighth additional aspect, alone or in combination with one or more of the first through forty-seventh aspects, the one or more capabilities include at least one of a quantity of beam groups that can be included in the group-based beam report, one or more supported timing schedules of resources to be measured for the group-based beam report, one or more supported transmission timing schedules for the group-based beam report, one or more supported measurement parameters for each beam included in the group-based beam report, or reporting a beam group, from the multiple beam groups, that includes a first beam associated with a serving cell and a second beam associated with a non-serving cell.

In a forty-ninth additional aspect, alone or in combination with one or more of the first through forty-eighth aspects, the one or more beam management features include the multiple TRP beam failure recovery, and the capability message includes an indication of one or more capabilities for the multiple TRP beam failure recovery.

In a fiftieth additional aspect, alone or in combination with one or more of the first through forty-ninth aspects, the one or more supported capabilities for the multiple TRP beam failure recovery include at least one of supporting two or more BFD reference signal sets for each downlink bandwidth part (for example, in a frequency band), a first quantity of BFD reference signal resources that can be included in a BFD reference signal resource set, a second quantity of BFD reference signals that can be included in BFD reference signal resource sets associated with each downlink bandwidth part, one or more supported BFD reference signal types, supporting two or more NBI reference signal sets for each downlink bandwidth part (for example, in a frequency band), a third quantity of NBI reference signals that can be included in an NBI reference signal resource set, a fourth quantity of NBI reference signals that can be included in NBI reference signal resource sets associated with each downlink bandwidth part, a quantity of total resources across one frequency range or all frequency ranges that includes BFD reference signal resources and NBI reference signal resources for multiple TRP beam failure recovery, a fifth quantity of PUCCH scheduling request resources that can be included in a cell group for multiple TRP beam failure recovery, or supporting a reset of CORESETs associated with a failed BFD reference signal.

In a fifty-first additional aspect, alone or in combination with one or more of the first through fiftieth aspects, the one or more beam management features include the enhanced QCL rules for multiple PDSCH transmissions, and the capability message includes an indication of whether the UE supports the enhanced QCL rules associated with the multiple PDSCH transmissions being scheduled by a single DCI message.

In a fifty-second additional aspect, alone or in combination with one or more of the first through fifty-first aspects, a scheduling offset for all PDSCH transmissions included in the multiple PDSCH transmissions is greater than or equal to a time duration associated with the enhanced QCL rules, and the enhanced QCL rules associated with the multiple PDSCH transmissions are indicated by a TCI codepoint included in the single DCI message or are indicated by a TCI state of the single DCI message.

In a fifty-third additional aspect, alone or in combination with one or more of the first through fifty-second aspects, a scheduling offset for at least one PDSCH transmission included in the multiple PDSCH transmissions is less than a time duration associated with the enhanced QCL rules, and the capability message includes an indication that the UE supports at least one of the same one or more QCL assumptions being applied to all PDSCH transmissions included in the multiple PDSCH transmissions, or multiple QCL assumptions being applied to the multiple PDSCH transmissions.

In a fifty-fourth additional aspect, alone or in combination with one or more of the first through fifty-third aspects, the capability message includes an indication that the UE supports a single DCI message scheduling multiple transport blocks for one or more scenarios, where the one or more scenarios include at least one of single TRP communications, multiple DCI multiple TRP communications, single DCI multiple TRP communications, inter-cell multiple TRP communications, inter-cell beam management communications, or single frequency network based multiple TRP communications.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
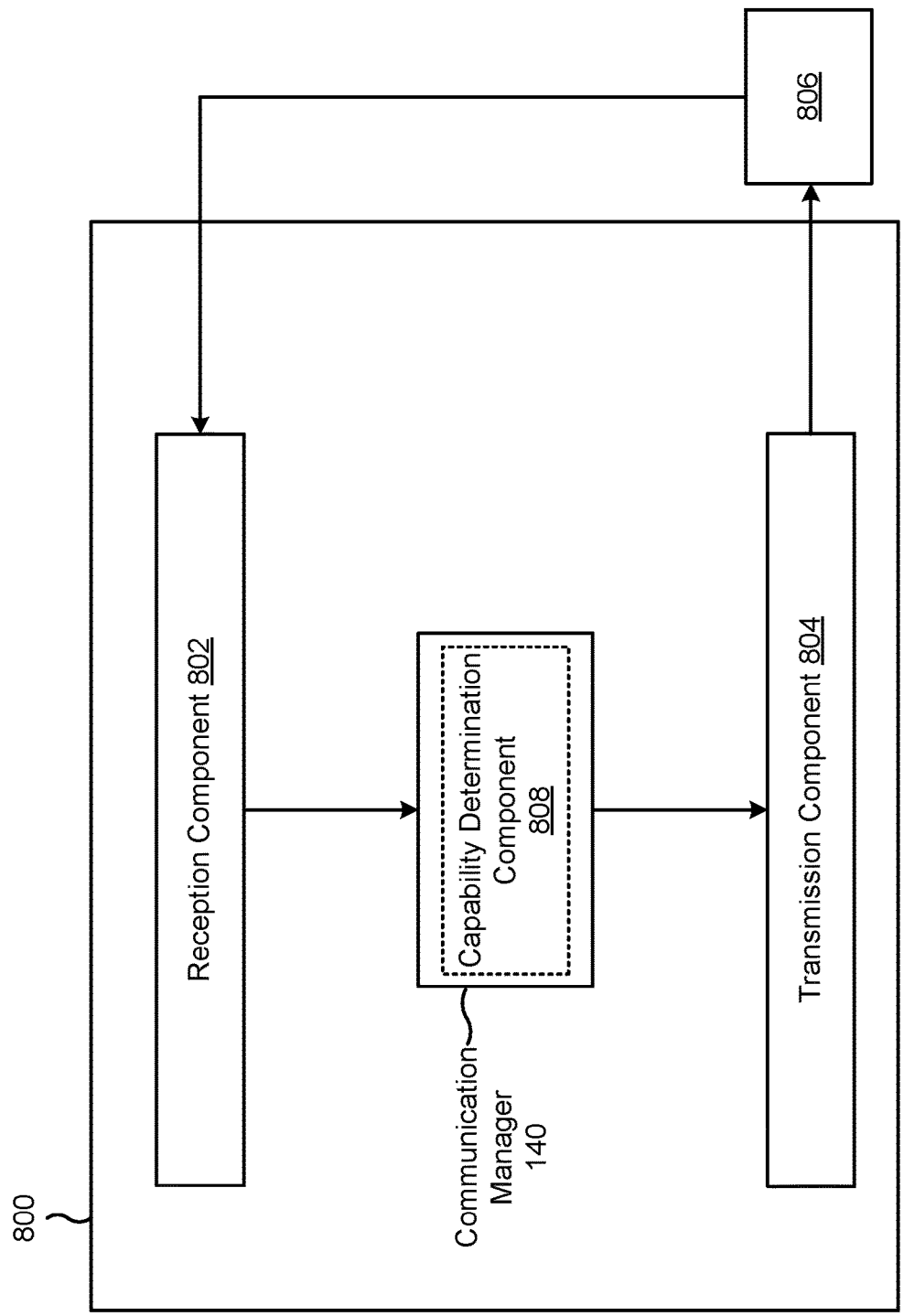
FIG. 8 is a diagram of an example apparatus for wireless communication associated with UE capability signaling for enhanced beam management features, in accordance with the present disclosure.

FIG. 8 is a diagram of an example apparatus 800 for wireless communication associated with UE capability signaling for enhanced beam management features, in accordance with the present disclosure. The apparatus 800 may be a UE, or a UE may include the apparatus 800. In some aspects, the apparatus 800 includes a reception component 802, a transmission component 804, and a communication manager 140, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIG. 5. Additionally or alternatively, the apparatus 800 may be configured to perform one or more processes described herein, such as process 600 of FIG. 6, or a combination thereof. In some aspects, the apparatus 800 may include one or more components of the UE described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The communication manager 140 may transmit or may cause the transmission component 804 to transmit, to a base station, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions. The communication manager 140 may receive or may cause the reception component 802 to receive, from the base station, configuration information for at least one beam management feature, of the one or more beam management features, based at least in part on transmitting the capability message. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a capability determination component 808, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 804 may transmit, to a base station, a capability message, associated with one or more beam management features, indicating at least one of parameters associated with the one or more beam management features or whether the UE supports the one or more beam management features, the one or more beam management features including at least one of: a TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions. The reception component 802 may receive, from the base station, configuration information for at least one beam management feature, of the one or more beam management features, based at least in part on transmitting the capability message.

The capability determination component 808 may determine or identify the at least one of parameters associated with the one or more beam management features or whether the UE supports the one or more beam management features.

The transmission component 804 may transmit an indication of whether the UE supports at least one of: joint downlink and uplink TCI states, or separate downlink and uplink TCI states.

The transmission component 804 may transmit an indication of whether the UE supports TCI-specific power control parameters for the unified TCI state.

The transmission component 804 may transmit an indication of whether the UE supports TCI-specific power control parameters for the unified TCI state and an uplink channel of reference signal type.

The transmission component 804 may transmit an indication of whether the UE supports a receive beam for a pathloss reference signal associated with the unified TCI state being different than a transmit beam indicated by the unified TCI state.

The transmission component 804 may transmit an indication of a supported beam indication scheme for the unified TCI state, wherein the supported beam indication scheme includes at least one of: a MAC-CE based TCI indication; a first MAC-CE based and DCI based TCI indication, wherein a DCI associated with the supported beam indication scheme schedules a downlink communication; or a second MAC-CE based and DCI based TCI indication, wherein the DCI associated with the supported beam indication scheme does not schedule any downlink communications.

The transmission component 804 may transmit an indication of a supported time gap from a time at which a DCI-based beam indication is received to a time at which a TCI state indicated by the DCI-based beam indication is applied.

The transmission component 804 may transmit an indication of the supported time gap that comprises transmitting an indication of: a first time gap value that is based at least in part on the first SCS, and a second time gap value that is based at least in part on the second SCS.

The transmission component 804 may transmit an indication of whether the unified TCI state can be applied to multiple bandwidth parts or multiple component carriers.

The transmission component 804 may transmit an indication of whether the UE supports a first unified TCI state pool for each bandwidth part or each component carrier, or supports a second unified TCI state pool that is configured on one bandwidth part or one component carrier and that is shared by multiple bandwidth parts or multiple component carriers.

The transmission component 804 may transmit an indication of whether the UE supports simultaneous configurations of the unified TCI state and a non-unified TCI state, or a spatial relation on the same bandwidth part or the same component carrier or across multiple bandwidth parts or multiple component carriers.

The transmission component 804 may transmit an indication of a quantity of configured or activated unified TCI states supported by the UE. The transmission component 804 may transmit an indication of whether the UE supports a reference signal from a non-serving cell being a source reference signal for the unified TCI state.

The transmission component 804 may transmit a first one or more capabilities for the one or more beam management features for intra-cell beam management. The transmission component 804 may transmit a second one or more capabilities for the one or more beam management features for inter-cell beam management.

The transmission component 804 may transmit an indication of whether the UE supports a receive timing difference between a serving cell and a non-serving cell being larger than a size of a CP used by the UE. The transmission component 804 may transmit an indication of a quantity of non-serving cells or groups of cells that the UE can support with the receive timing difference. The transmission component 804 may transmit an indication of a supported receive timing difference.

The transmission component 804 may transmit an indication of whether the UE supports a first timing advance value for a non-serving cell that is different than a second timing advance value for a serving cell. The transmission component 804 may transmit an indication of a quantity of timing advance values or timing advance groups for the non-serving cell supported by the UE.

The transmission component 804 may transmit an indication of whether the UE supports beam measurements using a downlink reference signal associated with a non-serving cell. The transmission component 804 may transmit an indication of a quantity of non-serving cells that can be configured for the inter-cell beam measurements.

The transmission component 804 may transmit an indication of whether the UE supports measurements associated with a serving cell and a non-serving cell being included in the same measurement report transmitted by the UE.

The transmission component 804 may transmit an indication of whether the UE supports measurements of downlink reference signals, associated with different cells and that at least partially overlap in a time domain, being included in the same measurement report transmitted by the UE.

The transmission component 804 may transmit an indication of a quantity of downlink reference signals, associated with different cells and that at least partially overlap in a time domain that can be included in the same measurement report.

The transmission component 804 may transmit an indication of whether the UE supports a receive timing difference between a serving cell and a non-serving cell being larger than a size of a CP for the inter-cell beam measurements. The transmission component 804 may transmit an indication of a quantity of non-serving cells or groups of cells that the UE can support with the receive timing difference for the inter-cell beam measurements. The transmission component 804 may transmit an indication of a supported receive timing difference for the inter-cell beam measurements.

The transmission component 804 may transmit an indication of whether the UE supports transmitting a P-MPR report or a power headroom report for MPE mitigation, where the P-MPR report or the power headroom report includes a resource indicator or a beam indicator. The transmission component 804 may transmit an indication of a quantity of beams or antenna panels for a serving cell that can be reported in a single P-MPR report. The transmission component 804 may transmit an indication of whether the UE supports a beam-level P-MPR report or an antenna-panel-level P-MPR report. The transmission component 804 may transmit an indication of whether the UE supports indicating a measurement parameter associated with the resource indicator or the beam indicator in the enhanced P-MPR report.

The transmission component 804 may transmit an indication of whether the UE supports one or more SRS ports being associated with multiple SRS resources or multiple SRS resource sets. The transmission component 804 may transmit an indication of one or more supported SRS usage types for the multiple SRS resources or the multiple SRS resource sets.

The transmission component 804 may transmit an indication of whether the UE supports updating a beam used by the UE based at least in part on a report transmitted by the UE and without receiving signaling from the base station.

The transmission component 804 may transmit an indication of one or more capabilities associated with the group-based beam report, where the group-based beam report includes multiple beam groups, and where at least two beam groups, from the multiple beam groups, are associated with different resource sets.

The transmission component 804 may transmit an indication of one or more capabilities for the multiple TRP beam failure recovery.

The transmission component 804 may transmit an indication of whether the UE supports the enhanced QCL rules associated with the multiple PDSCH transmissions being scheduled by a single DCI message.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
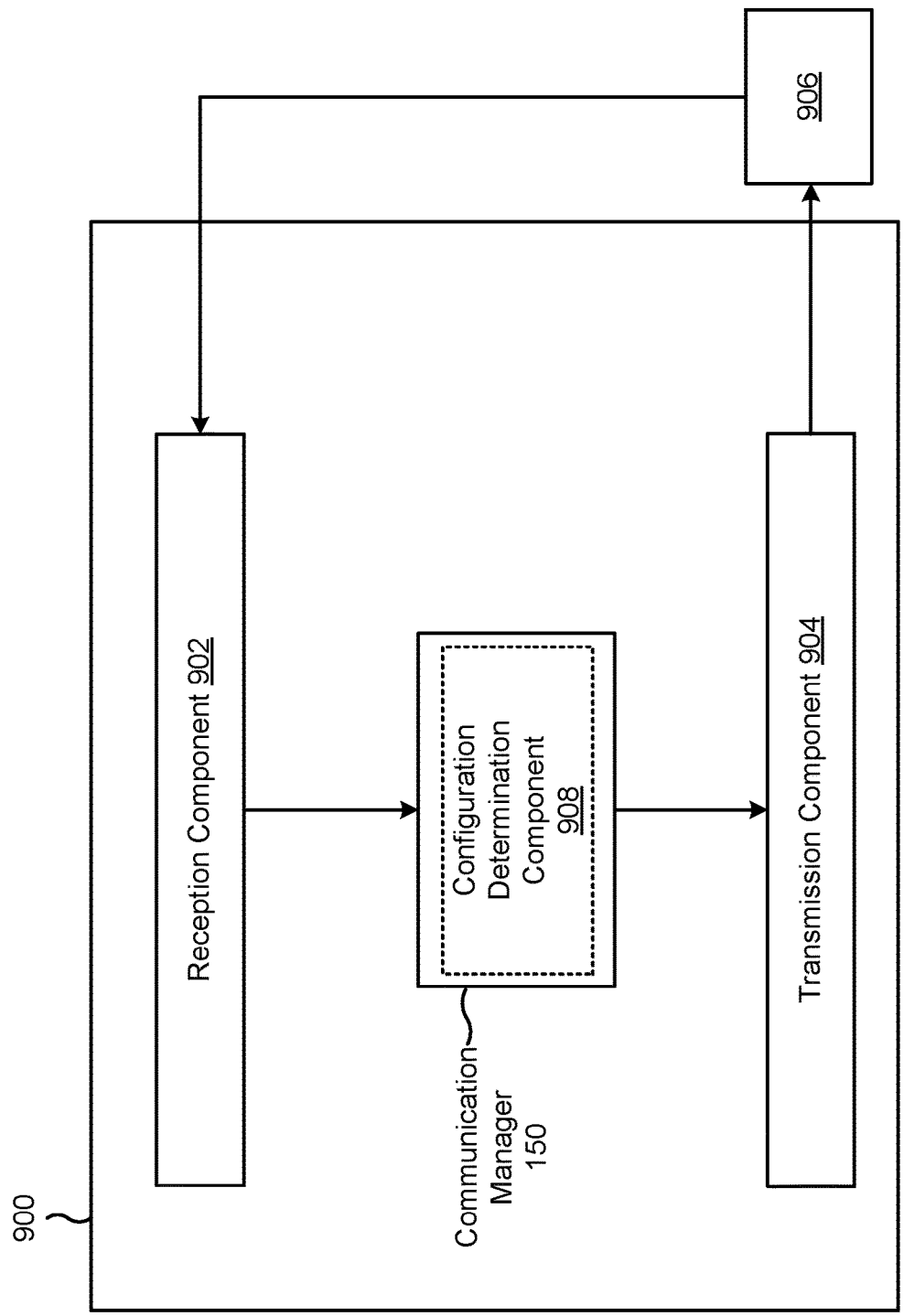
FIG. 9 is a diagram of an example apparatus for wireless communication associated with UE capability signaling for enhanced beam management features, in accordance with the present disclosure.

FIG. 9 is a diagram of an example apparatus 900 for wireless communication associated with UE capability signaling for enhanced beam management features, in accordance with the present disclosure. The apparatus 900 may be a base station, or a base station may include the apparatus 900. In some aspects, the apparatus 900 includes a reception component 902, a transmission component 904, and a communication manager 150, which may be in communication with one another (for example, via one or more buses). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIG. 5. Additionally or alternatively, the apparatus 900 may be configured to perform one or more processes described herein, such as process 700 of FIG. 7, or a combination thereof. In some aspects, the apparatus 900 may include one or more components of the base station described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, the communication manager 150 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The communication manager 150 may receive, or may cause the reception component 902 to receive, from a UE, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions. The communication manager 150 may transmit or may cause the transmission component 904 to transmit, to the UE, configuration information for at least one beam management feature, of the one or more beam management features, based at least in part on transmitting the capability message. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a configuration determination component 908, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive, from a UE, a capability message, associated with one or more beam management features, indicating at least one of parameters associated with the one or more beam management features or whether the UE supports the one or more beam management features, the one or more beam management features including at least one of: a unified TCI state, inter-cell beam indications, inter-cell beam measurements, an enhanced P-MPR report, antenna-panel-specific uplink transmissions, report-based beam updates, a group-based beam report, multiple TRP beam failure recovery, or enhanced QCL rules for multiple PDSCH transmissions. The transmission component 904 may transmit, to the UE, configuration information for at least one beam management feature, of the one or more beam management features, based at least in part on transmitting the capability message.

The configuration determination component 908 may determine the configuration information based at least in part on the at least one of parameters associated with the one or more beam management features or whether the UE supports the one or more beam management features.

The reception component 902 may receive one or more capabilities, described in more detail elsewhere herein, associated with the one or more beam management features.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed unit (DUs), one or more radio units (RUs), or a combination thereof).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 10:
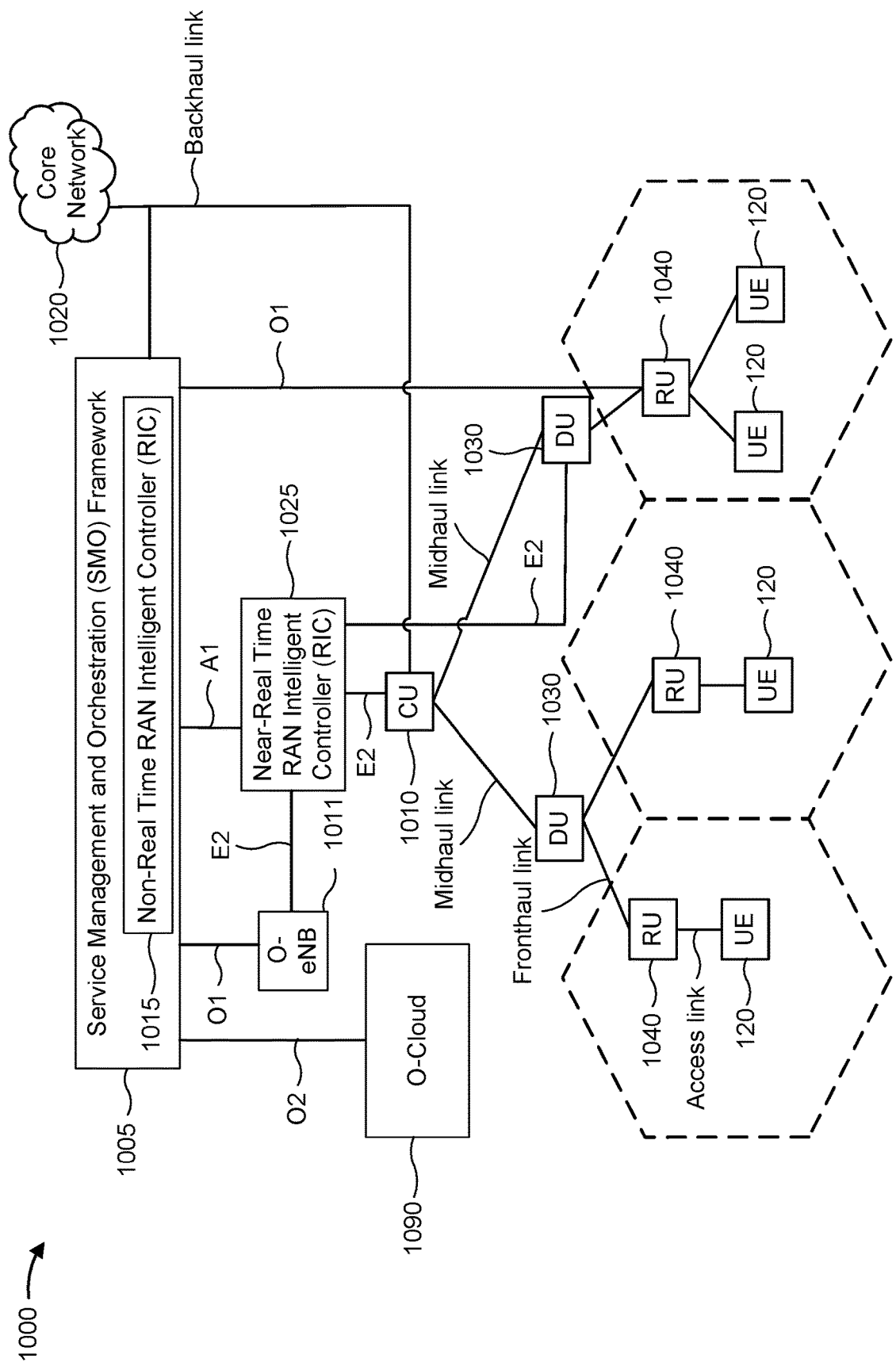
FIG. 10 is a diagram illustrating an example disaggregated base station architecture, in accordance with the present disclosure.

FIG. 10 is a diagram illustrating an example disaggregated base station architecture 1000, in accordance with the present disclosure. The disaggregated base station architecture 1000 may include a CU 1010 that can communicate directly with a core network 1020 via a backhaul link, or indirectly with the core network 1020 through one or more disaggregated control units (such as a Near-RT RIC 1025 via an E2 link, or a Non-RT RIC 1015 associated with a Service Management and Orchestration (SMO) Framework 1005, or both). A CU 1010 may communicate with one or more DUs 1030 via respective midhaul links, such as through F1 interfaces. Each of the DUs 1030 may communicate with one or more RUs 1040 via respective fronthaul links. Each of the RUs 1040 may communicate with one or more UEs 120 via respective radio frequency (RF) access links. In some implementations, a UE 120 may be simultaneously served by multiple RUs 1040.

Each of the units, including the CUs 1010, the DUs 1030, the RUs 1040, as well as the Near-RT RICs 1025, the Non-RT RICs 1015, and the SMO Framework 1005, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1010 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 1010. The CU 1010 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1010 can be logically split into one or more CU-UP units and one or more CU-CP units. A CU-UP unit can communicate bidirectionally with a CU-CP unit via an interface, such as the E1 interface when implemented in an O-RAN configuration. The CU 1010 can be implemented to communicate with a DU 1030, as necessary, for network control and signaling.

Each DU 1030 may correspond to a logical unit that includes one or more base station functions to control the operation of one or more RUs 1040. In some aspects, the DU 1030 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1030 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 1030, or with the control functions hosted by the CU 1010.

Each RU 1040 may implement lower-layer functionality. In some deployments, an RU 1040, controlled by a DU 1030, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1040 can be operated to handle over the air (OTA) communication with one or more UEs 120. In some implementations, real-time and non-real-time aspects of control and user plane communication with the RU(s) 1040 can be controlled by the corresponding DU 1030. In some scenarios, this configuration can enable each DU 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements, which may be managed via an operations and maintenance interface (such as an O1 interface). For virtualized network elements, the SMO Framework 1005 may be configured to interact with a cloud computing platform (such as an open cloud (O-Cloud) platform 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040, non-RT RICs 1015, and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with each of one or more RUs 1040 via a respective O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1025. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via an O1 interface) or via creation of RAN management policies (such as A1 interface policies).

The following provides an overview of some Aspects of the present disclosure:

Aspect 1: A method of wireless communication performed by a user equipment (UE), comprising: transmitting, to a base station, a capability message, associated with one or more beam management features, indicating at least one of parameters associated with the one or more beam management features or whether the UE supports the one or more beam management features, and the one or more beam management features including at least one of: a unified transmission configuration indicator (TCI) state, inter-cell beam indications, inter-cell beam measurements, an enhanced power management maximum power reduction (P-MPR) report, antenna-panel-specific uplink transmissions, report-based beam updates, a group-based beam report, multiple transmission reception point (TRP) beam failure recovery, or enhanced quasi co-location (QCL) rules for multiple physical downlink shared channel (PDSCH) transmissions; and receiving, from the base station, configuration information for at least one beam management feature, of the one or more beam management features, based at least in part on transmitting the capability message.

Aspect 2: The method of Aspect 1, wherein the one or more beam management features include the unified TCI state, and wherein the capability message includes an indication of whether the UE supports at least one of: joint downlink and uplink TCI states, or separate downlink and uplink TCI states.

Aspect 3: The method of Aspect 2, wherein transmitting the indication comprises transmitting an indication of whether the UE supports a unified TCI state type for intra-cell beam management.

Aspect 4: The method of any of Aspects 1-3, wherein the one or more beam management features include the unified TCI state, and wherein the capability message includes an indication of whether the UE supports TCI-specific power control parameters for the unified TCI state.

Aspect 5: The method of Aspect 4, wherein transmitting the indication of whether the UE supports TCI-specific power control parameters for the unified TCI state comprises transmitting an indication of whether the UE supports TCI-specific power control parameters for the unified TCI state and an uplink channel of reference signal type.

Aspect 6: The method of any of Aspects 1-5, wherein the one or more beam management features include the unified TCI state, and wherein the capability message includes an indication of whether the UE supports a receive beam for a pathloss reference signal associated with the unified TCI state being different than a transmit beam indicated by the unified TCI state.

Aspect 7: The method of any of Aspects 1-6, wherein the one or more beam management features include the unified TCI state, and wherein the capability message includes an indication of a supported beam indication scheme for the unified TCI state, wherein the supported beam indication scheme includes at least one of: a medium access control (MAC) control element (MAC-CE) based TCI indication; a first MAC-CE based and downlink control information (DCI) based TCI indication, wherein a DCI associated with the supported beam indication scheme schedules a downlink communication; or a second MAC-CE based and DCI based TCI indication, wherein the DCI associated with the supported beam indication scheme does not schedule any downlink communications.

Aspect 8: The method of any of Aspects 1-7, wherein the one or more beam management features include the unified TCI state, and wherein the capability message includes an indication of a supported time gap from a time at which a DCI-based beam indication is received to a time at which a TCI state indicated by the DCI-based beam indication is applied.

Aspect 9: The method of Aspect 8, wherein the DCI-based beam indication is associated with a first subcarrier spacing (SCS) and the TCI state is associated with a second SCS, and wherein transmitting an indication of the supported time gap comprises transmitting an indication of: a first time gap value that is based at least in part on the first SCS, and a second time gap value that is based at least in part on the second SCS.

Aspect 10: The method of any of Aspects 8-9, wherein the TCI state is associated with multiple subcarrier spacings (SCSs) across one or more bandwidth parts or one or more component carriers, and wherein the supported time gap is based at least in part on a largest time gap among multiple time gaps associated with the multiple SCSs.

Aspect 11: The method of any of Aspects 1-10, wherein the one or more beam management features include the unified TCI state, and wherein the capability message includes an indication of whether the unified TCI state can be applied to multiple bandwidth parts or multiple component carriers.

Aspect 12: The method of any of Aspects 1-11, wherein the one or more beam management features include the unified TCI state, and wherein the capability message includes an indication of whether the UE supports a first unified TCI state pool for each bandwidth part or each component carrier, or supports a second unified TCI state pool that is configured on one bandwidth part or one component carrier and that is shared by multiple bandwidth parts or multiple component carriers.

Aspect 13: The method of any of Aspects 1-12, wherein the one or more beam management features include the unified TCI state, and wherein the capability message includes an indication of a quantity of TCI state pools that can be configured across all bandwidth parts or component carriers in a frequency band.

Aspect 14: The method of any of Aspects 1-13, wherein the one or more beam management features include the unified TCI state, and wherein the capability message includes an indication of whether the UE supports simultaneous configurations of the unified TCI state and a non-unified TCI state, or a spatial relation on a same bandwidth part or a same component carrier or across multiple bandwidth parts or multiple component carriers.

Aspect 15: The method of any of Aspects 1-14, wherein the one or more beam management features include the unified TCI state, and wherein the capability message includes an indication of a quantity of configured or activated unified TCI states supported by the UE.

Aspect 16: The method of Aspect 15, wherein the quantity of configured or activated unified TCI states is associated with at least one of: a unified TCI state type, all unified TCI state types, a subset of unified TCI state types, activated joint downlink and uplink TCI state types and uplink only TCI state types, activated joint downlink and uplink TCI state types and downlink only TCI state types, a bandwidth part, a component carrier, multiple bandwidth parts, multiple component carriers, a frequency band, or multiple frequency bands.

Aspect 17: The method of any of Aspects 15-16, wherein the quantity of configured or activated unified TCI states is independent of configured or activated non-unified TCI states or spatial relations.

Aspect 18: The method of any of Aspects 15-16, wherein the quantity of configured or activated unified TCI states is based at least in part on a quantity of configured or activated non-unified TCI states or spatial relations.

Aspect 19: The method of any of Aspects 1-18, wherein the one or more beam management features include the unified TCI state and the inter-cell beam indications, and wherein the capability message includes an indication of whether the UE supports a reference signal from a non-serving cell being a source reference signal for the unified TCI state.

Aspect 20: The method of any of Aspects 1-19, wherein the one or more beam management features include the unified TCI state, and wherein the capability message includes an indication of a first supported quantity of control resource sets (CORESETs) or a second supported quantity of CORESET QCL assumptions for each bandwidth part or each component carrier in a frequency band.

Aspect 21: The method of any of Aspects 1-20, wherein transmitting the capability message comprises: transmitting a first one or more capabilities for the one or more beam management features for intra-cell beam management; and transmitting a second one or more capabilities for the one or more beam management features for inter-cell beam management.

Aspect 22: The method of any of Aspects 1-21, wherein the one or more beam management features include the unified TCI state and the inter-cell beam indications, and wherein the capability message includes an indication of whether the UE supports a receive timing difference between a serving cell and a non-serving cell being larger than a size of a cyclic prefix (CP) used by the UE.

Aspect 23: The method of Aspect 22, wherein transmitting the indication of whether the UE supports the receive timing difference between the serving cell and the non-serving cell being larger than the size of the CP used by the UE comprises transmitting an indication of a quantity of non-serving cells or groups of cells that the UE can support with the receive timing difference.

Aspect 24: The method of any of Aspects 22-23, wherein transmitting the indication of whether the UE supports the receive timing difference between the serving cell and the non-serving cell being larger than the size of the CP used by the UE comprises transmitting an indication of a supported receive timing difference.

Aspect 25: The method of any of Aspects 1-24, wherein the one or more beam management features include the unified TCI state and the inter-cell beam indications, and wherein the capability message includes an indication of whether the UE supports a first timing advance value for a non-serving cell that is different than a second timing advance value for a serving cell.

Aspect 26: The method of Aspect 25, wherein the capability message includes an indication of a quantity of timing advance values or timing advance groups for the non-serving cell supported by the UE.

Aspect 27: The method of any of Aspects 1-26, wherein the one or more beam management features include the unified TCI state and the inter-cell beam measurements, and wherein the capability message includes an indication of whether the UE supports beam measurements using a downlink reference signal associated with a non-serving cell.

Aspect 28: The method of Aspect 27, wherein the capability message includes an indication of a quantity of non-serving cells that can be configured for the inter-cell beam measurements.

Aspect 29: The method of any of Aspects 27-28, wherein the capability message includes an indication of a quantity of cells that can be configured for Layer 1 reference signal received power (RSRP) reports associated with inter-cell beam management.

Aspect 30: The method of any of Aspects 1-29, wherein the one or more beam management features include the unified TCI state and the inter-cell beam measurements, and wherein the capability message includes an indication of whether the UE supports measurements associated with a serving cell and a non-serving cell being included in a same measurement report transmitted by the UE.

Aspect 31: The method of any of Aspects 1-30, wherein the one or more beam management features include the unified TCI state and the inter-cell beam measurements, and wherein the capability message includes an indication of whether the UE supports measurements of downlink reference signals, associated with different cells and that at least partially overlap in a time domain, being included in a same measurement report transmitted by the UE.

Aspect 32: The method of any of Aspects 1-31, wherein the one or more beam management features include the unified TCI state and the inter-cell beam measurements, and wherein the capability message includes an indication of a quantity of downlink reference signals, associated with different cells and that at least partially overlap in a time domain that can be included in a same measurement report.

Aspect 33: The method of any of Aspects 1-32, wherein the one or more beam management features include the unified TCI state and the inter-cell beam measurements, and wherein the capability message includes an indication of whether the UE supports a receive timing difference between a serving cell and a non-serving cell being larger than a size of a cyclic prefix (CP) for the inter-cell beam measurements.

Aspect 34: The method of Aspect 33, wherein transmitting the indication of whether the UE supports the receive timing difference between the serving cell and the non-serving cell being larger than the size of the CP comprises transmitting an indication of a quantity of non-serving cells or groups of cells that the UE can support with the receive timing difference for the inter-cell beam measurements.

Aspect 35: The method of any of Aspects 33-34, wherein transmitting the indication of whether the UE supports the receive timing difference between the serving cell and the non-serving cell being larger than the size of the CP used by the UE comprises transmitting an indication of a supported receive timing difference for the inter-cell beam measurements.

Aspect 36: The method of any of Aspects 1-35, wherein the one or more beam management features include the unified TCI state and the inter-cell beam measurements, and wherein the capability message includes an indication of whether the UE supports at least one of: Layer 1 event-based inter-cell beam measurement reporting, or medium access control (MAC) control element (MAC-CE) event-based inter-cell beam measurement reporting.

Aspect 37: The method of any of Aspects 1-36, wherein the one or more beam management features include the enhanced P-MPR report, and wherein the capability message includes an indication of whether the UE supports transmitting a P-MPR report or a power headroom report for maximum permissible exposure (MPE) mitigation, wherein the P-MPR report or the power headroom report includes a resource indicator or a beam indicator.

Aspect 38: The method of Aspect 37, wherein the capability message includes an indication of a quantity of beams or antenna panels for a serving cell that can be reported in a single P-MPR report.

Aspect 39: The method of any of Aspects 37-38, wherein the capability message includes an indication of whether the UE supports a beam-level P-MPR report or an antenna-panel-level P-MPR report.

Aspect 40: The method of any of Aspects 37-39, wherein the capability message includes an indication of whether the UE supports indicating a measurement parameter associated with the resource indicator or the beam indicator in the enhanced P-MPR report.

Aspect 41: The method of any of Aspects 37-40, wherein the capability message includes an indication of whether the UE supports transmitting the enhanced P-MPR report via a medium access control (MAC) control element (MAC-CE) message or a channel state information (CSI) report.

Aspect 42: The method of any of Aspects 1-41, wherein the one or more beam management features include the antenna-panel-specific uplink transmissions, and wherein the capability message includes an indication of whether the UE supports one or more sounding reference signal (SRS) ports being associated with multiple SRS resources or multiple SRS resource sets.

Aspect 43: The method of Aspect 42, wherein the capability message includes an indication of a supported parameter for an antenna panel or an antenna panel group associated with an SRS resource or an SRS resource set from the multiple SRS resources or the multiple SRS resource sets, wherein the supported parameter includes at least one of: an uplink rank, a quantity of SRS ports for the SRS resource or the SRS resource set, or a coherence type for antenna ports associated with the antenna panel or the antenna panel group.

Aspect 44: The method of any of Aspects 42-43, wherein the capability message includes an indication of one or more supported SRS usage types for the multiple SRS resources or the multiple SRS resource sets.

Aspect 45: The method of any of Aspects 42-44, wherein the capability message includes an indication of a supported application time for associating a resource indicator with at least one of: an SRS resource set identifier, an antenna panel group identifier, an SRS resource identifier, a panel identifier, or one or more supported parameters, for the antenna-panel-specific uplink transmissions.

Aspect 46: The method of any of Aspects 1-45, wherein the one or more beam management features include the report-based beam updates, and wherein the capability message includes an indication of whether the UE supports updating a beam used by the UE based at least in part on a report transmitted by the UE and without receiving signaling from the base station.

Aspect 47: The method of Aspect 46, wherein the capability message includes an indication of whether the UE supports at least one of: beam selection that is based at least in part on the report transmitted by the UE, beam activation that is based at least in part on the report transmitted by the UE, or uplink beam selection, from a set of configured uplink beams, that is based at least in part on the report transmitted by the UE.

Aspect 48: The method of any of Aspects 1-47, wherein the one or more beam management features include the group-based beam report, and wherein the capability message includes an indication of one or more capabilities associated with the group-based beam report, wherein the group-based beam report includes multiple beam groups, and wherein at least two beam groups, from the multiple beam groups, are associated with different resource sets.

Aspect 49: The method of Aspect 48, wherein the one or more capabilities include at least one of: a quantity of beam groups that can be included in the group-based beam report; one or more supported timing schedules of resources to be measured for the group-based beam report; one or more supported transmission timing schedules for the group-based beam report; one or more supported measurement parameters for each beam included in the group-based beam report; or reporting a beam group, from the multiple beam groups, that includes a first beam associated with a serving cell and a second beam associated with a non-serving cell.

Aspect 50: The method of any of Aspects 1-49, wherein the one or more beam management features include the multiple TRP beam failure recovery, and wherein the capability message includes an indication of one or more capabilities for the multiple TRP beam failure recovery.

Aspect 51: The method of Aspect 50, wherein the one or more supported capabilities for the multiple TRP beam failure recovery include at least one of: supporting two or more beam failure detection (BFD) reference signal sets for each downlink bandwidth part in a frequency band, a first quantity of BFD reference signal resources that can be included in a BFD reference signal resource set, a second quantity of BFD reference signals that can be included in BFD reference signal resource sets associated with each downlink bandwidth part, one or more supported BFD reference signal types, supporting two or more new beam information (NBI) reference signal sets for each downlink bandwidth part in a frequency band, a third quantity of NBI reference signals that can be included in an NBI reference signal resource set, a fourth quantity of NBI reference signals that can be included in NBI reference signal resource sets associated with each downlink bandwidth part, a quantity of total resources across one frequency range or all frequency ranges that includes BFD reference signal resources and NBI reference signal resources for multiple TRP beam failure recovery, a fifth quantity of physical uplink control channel (PUCCH) scheduling request resources that can be included in a cell group for multiple TRP beam failure recovery, or supporting a reset of all control resource sets (CORESETs) associated with a failed BFD reference signal.

Aspect 52: The method of any of Aspects 1-51, wherein the one or more beam management features include the enhanced QCL rules for multiple PDSCH transmissions, and wherein the capability message includes an indication of whether the UE supports the enhanced QCL rules associated with the multiple PDSCH transmissions being scheduled by a single downlink control information (DCI) message.

Aspect 53: The method of Aspect 52, wherein a scheduling offset for all PDSCH transmissions included in the multiple PDSCH transmissions is greater than or equal to a time duration associated with the enhanced QCL rules, and wherein the enhanced QCL rules associated with the multiple PDSCH transmissions are indicated by a TCI codepoint included in the single DCI message or are indicated by a TCI state of the single DCI message.

Aspect 54: The method of any of Aspects 52-53, wherein a scheduling offset for at least one PDSCH transmission included in the multiple PDSCH transmissions is less than a time duration associated with the enhanced QCL rules, and wherein the capability message includes an indication that the UE supports at least one of: a same one or more QCL assumptions being applied to all PDSCH transmissions included in the multiple PDSCH transmissions, or multiple QCL assumptions being applied to the multiple PDSCH transmissions.

Aspect 55: The method of any of Aspects 1-54, wherein the capability message includes an indication that the UE supports a single downlink control information (DCI) message scheduling multiple transport blocks for one or more scenarios, wherein the one or more scenarios include at least one of: single TRP communications, multiple DCI multiple TRP communications, single DCI multiple TRP communications, inter-cell multiple TRP communications, inter-cell beam management communications, or single frequency network based multiple TRP communications.

Aspect 56: A method of wireless communication performed by a base station, comprising: receiving, from a user equipment (UE), a capability message, associated with one or more beam management features, indicating at least one of parameters associated with the one or more beam management features or whether the UE supports the one or more beam management features, and the one or more beam management features including at least one of: a unified transmission configuration indicator (TCI) state, inter-cell beam indications, inter-cell beam measurements, an enhanced power management maximum power reduction (P-MPR) report, antenna-panel-specific uplink transmissions, report-based beam updates, a group-based beam report, multiple transmission reception point (TRP) beam failure recovery, or enhanced quasi co-location (QCL) rules for multiple physical downlink shared channel (PDSCH) transmissions; and transmitting, to the UE, configuration information for at least one beam management feature, of the one or more beam management features, based at least in part on transmitting the capability message.

Aspect 57: The method of Aspect 56, wherein the one or more beam management features include the unified TCI state, and wherein the capability message includes an indication of whether the UE supports at least one of: joint downlink and uplink TCI states, or separate downlink and uplink TCI states.

Aspect 58: The method of Aspect 57, wherein receiving the indication comprises receiving an indication of whether the UE supports a unified TCI state type for intra-cell beam management.

Aspect 59: The method of any of Aspects 56-58, wherein the one or more beam management features include the unified TCI state, and wherein the capability message includes an indication of whether the UE supports TCI-specific power control parameters for the unified TCI state.

Aspect 60: The method of Aspect 59, wherein receiving the indication of whether the UE supports TCI-specific power control parameters for the unified TCI state comprises receiving an indication of whether the UE supports TCI-specific power control parameters for the unified TCI state and an uplink channel of reference signal type.

Aspect 61: The method of any of Aspects 56-60, wherein the one or more beam management features include the unified TCI state, and wherein the capability message includes an indication of whether the UE supports a receive beam for a pathloss reference signal associated with the unified TCI state being different than a transmit beam indicated by the unified TCI state.

Aspect 62: The method of any of Aspects 56-61, wherein the one or more beam management features include the unified TCI state, and wherein the capability message includes an indication of a supported beam indication scheme for the unified TCI state, wherein the supported beam indication scheme includes at least one of: a medium access control (MAC) control element (MAC-CE) based TCI indication; a first MAC-CE based and downlink control information (DCI) based TCI indication, wherein a DCI associated with the supported beam indication scheme schedules a downlink communication; or a second MAC-CE based and DCI based TCI indication, wherein the DCI associated with the supported beam indication scheme does not schedule any downlink communications.

Aspect 63: The method of any of Aspects 56-62, wherein the one or more beam management features include the unified TCI state, and wherein the capability message includes an indication of a supported time gap from a time at which a DCI-based beam indication is received to a time at which a TCI state indicated by the DCI-based beam indication is applied.

Aspect 64: The method of Aspect 63, wherein the DCI-based beam indication is associated with a first subcarrier spacing (SCS) and the TCI state is associated with a second SCS, and wherein receiving an indication of the supported time gap comprises receiving an indication of: a first time gap value that is based at least in part on the first SCS, and a second time gap value that is based at least in part on the second SCS.

Aspect 65: The method of any of Aspects 63-64, wherein the TCI state is associated with multiple subcarrier spacings (SCSs) across one or more bandwidth parts or one or more component carriers, and wherein the supported time gap is based at least in part on a largest time gap among multiple time gaps associated with the multiple SCSs.

Aspect 66: The method of any of Aspects 56-65, wherein the one or more beam management features include the unified TCI state, and wherein the capability message includes an indication of whether the unified TCI state can be applied to multiple bandwidth parts or multiple component carriers.

Aspect 67: The method of any of Aspects 56-66, wherein the one or more beam management features include the unified TCI state, and wherein the capability message includes an indication of whether the UE supports a first unified TCI state pool for each bandwidth part or each component carrier, or supports a second unified TCI state pool that is configured on one bandwidth part or one component carrier and that is shared by multiple bandwidth parts or multiple component carriers.

Aspect 68: The method of any of Aspects 56-67, wherein the one or more beam management features include the unified TCI state, and wherein the capability message includes an indication of a quantity of TCI state pools that can be configured across all bandwidth parts or component carriers in a frequency band.

Aspect 69: The method of any of Aspects 56-68, wherein the one or more beam management features include the unified TCI state, and wherein the capability message includes an indication of whether the UE supports simultaneous configurations of the unified TCI state and a non-unified TCI state, or a spatial relation on a same bandwidth part or a same component carrier or across multiple bandwidth parts or multiple component carriers.

Aspect 70: The method of any of Aspects 56-69, wherein the one or more beam management features include the unified TCI state, and wherein the capability message includes an indication of a quantity of configured or activated unified TCI states supported by the UE.

Aspect 71: The method of Aspect 70, wherein the quantity of configured or activated unified TCI states is associated with at least one of: a unified TCI state type, all unified TCI state types, a subset of unified TCI state types, activated joint downlink and uplink TCI state types and uplink only TCI state types, activated joint downlink and uplink TCI state types and downlink only TCI state types, a bandwidth part, a component carrier, multiple bandwidth parts, multiple component carriers, a frequency band, or multiple frequency bands.

Aspect 72: The method of any of Aspects 70-71, wherein the quantity of configured or activated unified TCI states is independent of configured or activated non-unified TCI states or spatial relations.

Aspect 73: The method of any of Aspects 70-71, wherein the quantity of configured or activated unified TCI states is based at least in part on a quantity of configured or activated non-unified TCI states or spatial relations.

Aspect 74: The method of any of Aspects 56-73, wherein the one or more beam management features include the unified TCI state and the inter-cell beam indications, and wherein the capability message includes an indication of whether the UE supports a reference signal from a non-serving cell being a source reference signal for the unified TCI state.

Aspect 75: The method of any of Aspects 56-74, wherein the one or more beam management features include the unified TCI state, and wherein the capability message includes an indication of a first supported quantity of control resource sets (CORESETs) or a second supported quantity of CORESET QCL assumptions for each bandwidth part or each component carrier in a frequency band.

Aspect 76: The method of any of Aspects 56-75, wherein receiving the capability message comprises: receiving a first one or more capabilities for the one or more beam management features for intra-cell beam management; and receiving a second one or more capabilities for the one or more beam management features for inter-cell beam management.

Aspect 77: The method of any of Aspects 56-76, wherein the one or more beam management features include the unified TCI state and the inter-cell beam indications, and wherein the capability message includes an indication of whether the UE supports a receive timing difference between a serving cell and a non-serving cell being larger than a size of a cyclic prefix (CP) used by the UE.

Aspect 78: The method of Aspect 77, wherein receiving the indication of whether the UE supports the receive timing difference between the serving cell and the non-serving cell being larger than the size of the CP used by the UE comprises receiving an indication of a quantity of non-serving cells or groups of cells that the UE can support with the receive timing difference.

Aspect 79: The method of any of Aspects 77-78, wherein receiving the indication of whether the UE supports the receive timing difference between the serving cell and the non-serving cell being larger than the size of the CP used by the UE comprises receiving an indication of a supported receive timing difference.

Aspect 80: The method of any of Aspects 56-79, wherein the one or more beam management features include the unified TCI state and the inter-cell beam indications, and wherein the capability message includes an indication of whether the UE supports a first timing advance value for a non-serving cell that is different than a second timing advance value for a serving cell.

Aspect 81: The method of Aspect 80, wherein the capability message includes an indication of a quantity of timing advance values or timing advance groups for the non-serving cell supported by the UE.

Aspect 82: The method of any of Aspects 56-81, wherein the one or more beam management features include the unified TCI state and the inter-cell beam measurements, and wherein the capability message includes an indication of whether the UE supports beam measurements using a downlink reference signal associated with a non-serving cell.

Aspect 83: The method of Aspect 82, wherein the capability message includes an indication of a quantity of non-serving cells that can be configured for the inter-cell beam measurements.

Aspect 84: The method of any of Aspects 82-83, wherein the capability message includes an indication of a quantity of cells that can be configured for Layer 1 reference signal received power (RSRP) reports associated with inter-cell beam management.

Aspect 85: The method of any of Aspects 56-84, wherein the one or more beam management features include the unified TCI state and the inter-cell beam measurements, and wherein the capability message includes an indication of whether the UE supports measurements associated with a serving cell and a non-serving cell being included in a same measurement report transmitted by the UE.

Aspect 86: The method of any of Aspects 56-85, wherein the one or more beam management features include the unified TCI state and the inter-cell beam measurements, and wherein the capability message includes an indication of whether the UE supports measurements of downlink reference signals, associated with different cells and that at least partially overlap in a time domain, being included in a same measurement report transmitted by the UE.

Aspect 87: The method of any of Aspects 56-86, wherein the one or more beam management features include the unified TCI state and the inter-cell beam measurements, and wherein the capability message includes an indication of a quantity of downlink reference signals, associated with different cells and that at least partially overlap in a time domain that can be included in a same measurement report.

Aspect 88: The method of any of Aspects 56-87, wherein the one or more beam management features include the unified TCI state and the inter-cell beam measurements, and wherein the capability message includes an indication of whether the UE supports a receive timing difference between a serving cell and a non-serving cell being larger than a size of a cyclic prefix (CP) for the inter-cell beam measurements.

Aspect 89: The method of Aspect 88, wherein receiving the indication of whether the UE supports the receive timing difference between the serving cell and the non-serving cell being larger than the size of the CP comprises receiving an indication of a quantity of non-serving cells or groups of cells that the UE can support with the receive timing difference for the inter-cell beam measurements.

Aspect 90: The method of any of Aspects 88-89, wherein receiving the indication of whether the UE supports the receive timing difference between the serving cell and the non-serving cell being larger than the size of the CP used by the UE comprises receiving an indication of a supported receive timing difference for the inter-cell beam measurements.

Aspect 91: The method of any of Aspects 56-90, wherein the one or more beam management features include the unified TCI state and the inter-cell beam measurements, and wherein the capability message includes an indication of whether the UE supports at least one of: Layer 1 event-based inter-cell beam measurement reporting, or medium access control (MAC) control element (MAC-CE) event-based inter-cell beam measurement reporting.

Aspect 92: The method of any of Aspects 56-91, wherein the one or more beam management features include the enhanced P-MPR report, and wherein the capability message includes an indication of whether the UE supports receiving a P-MPR report or a power headroom report for maximum permissible exposure (MPE) mitigation, wherein the P-MPR report or the power headroom report includes a resource indicator or a beam indicator.

Aspect 93: The method of Aspect 92, wherein the capability message includes an indication of a quantity of beams or antenna panels for a serving cell that can be reported in a single P-MPR report.

Aspect 94: The method of any of Aspects 92-93, wherein the capability message includes an indication of whether the UE supports a beam-level P-MPR report or an antenna-panel-level P-MPR report.

Aspect 95: The method of any of Aspects 92-94, wherein the capability message includes an indication of whether the UE supports indicating a measurement parameter associated with the resource indicator or the beam indicator in the enhanced P-MPR report.

Aspect 96: The method of any of Aspects 92-95, wherein the capability message includes an indication of whether the UE supports receiving the enhanced P-MPR report via a medium access control (MAC) control element (MAC-CE) message or a channel state information (CSI) report.

Aspect 97: The method of any of Aspects 56-96, wherein the one or more beam management features include the antenna-panel-specific uplink transmissions, and wherein the capability message includes an indication of whether the UE supports one or more sounding reference signal (SRS) ports being associated with multiple SRS resources or multiple SRS resource sets.

Aspect 98: The method of Aspect 97, wherein the capability message includes an indication of a supported parameter for an antenna panel or an antenna panel group associated with an SRS resource or an SRS resource set from the multiple SRS resources or the multiple SRS resource sets, wherein the supported parameter includes at least one of: an uplink rank, a quantity of SRS ports for the SRS resource or the SRS resource set, or a coherence type for antenna ports associated with the antenna panel or the antenna panel group.

Aspect 99: The method of any of Aspects 97-98, wherein the capability message includes an indication of one or more supported SRS usage types for the multiple SRS resources or the multiple SRS resource sets.

Aspect 100: The method of any of Aspects 97-99, wherein the capability message includes an indication of a supported application time for associating a resource indicator with at least one of: an SRS resource set identifier, an antenna panel group identifier, an SRS resource identifier, a panel identifier, or one or more supported parameters, for the antenna-panel-specific uplink transmissions.

Aspect 101: The method of any of Aspects 56-100, wherein the one or more beam management features include the report-based beam updates, and wherein the capability message includes an indication of whether the UE supports updating a beam used by the UE based at least in part on a report transmitted by the UE and without receiving signaling from the base station.

Aspect 102: The method of Aspect 101, wherein the capability message includes an indication of whether the UE supports at least one of: beam selection that is based at least in part on the report transmitted by the UE, beam activation that is based at least in part on the report transmitted by the UE, or uplink beam selection, from a set of configured uplink beams, that is based at least in part on the report transmitted by the UE.

Aspect 103: The method of any of Aspects 56-102, wherein the one or more beam management features include the group-based beam report, and wherein the capability message includes an indication of one or more capabilities associated with the group-based beam report, wherein the group-based beam report includes multiple beam groups, and wherein at least two beam groups, from the multiple beam groups, are associated with different resource sets.

Aspect 104: The method of Aspect 103, wherein the one or more capabilities include at least one of: a quantity of beam groups that can be included in the group-based beam report; one or more supported timing schedules of resources to be measured for the group-based beam report; one or more supported transmission timing schedules for the group-based beam report; one or more supported measurement parameters for each beam included in the group-based beam report; or reporting a beam group, from the multiple beam groups, that includes a first beam associated with a serving cell and a second beam associated with a non-serving cell.

Aspect 105: The method of any of Aspects 56-104, wherein the one or more beam management features include the multiple TRP beam failure recovery, and wherein the capability message includes an indication of one or more capabilities for the multiple TRP beam failure recovery.

Aspect 106: The method of Aspect 105, wherein the one or more supported capabilities for the multiple TRP beam failure recovery include at least one of: supporting two or more beam failure detection (BFD) reference signal sets for each downlink bandwidth part in a frequency band, a first quantity of BFD reference signal resources that can be included in a BFD reference signal resource set, a second quantity of BFD reference signals that can be included in BFD reference signal resource sets associated with each downlink bandwidth part, one or more supported BFD reference signal types, supporting two or more new beam information (NBI) reference signal sets for each downlink bandwidth part in a frequency band, a third quantity of NBI reference signals that can be included in an NBI reference signal resource set, a fourth quantity of NBI reference signals that can be included in NBI reference signal resource sets associated with each downlink bandwidth part, a quantity of total resources across one frequency range or all frequency ranges that includes BFD reference signal resources and NBI reference signal resources for multiple TRP beam failure recovery, a fifth quantity of physical uplink control channel (PUCCH) scheduling request resources that can be included in a cell group for multiple TRP beam failure recovery, or supporting a reset of all control resource sets (CORESETs) associated with a failed BFD reference signal.

Aspect 107: The method of any of Aspects 56-106, wherein the one or more beam management features include the enhanced QCL rules for multiple PDSCH transmissions, and wherein the capability message includes an indication of whether the UE supports the enhanced QCL rules associated with the multiple PDSCH transmissions being scheduled by a single downlink control information (DCI) message.

Aspect 108: The method of Aspect 107, wherein a scheduling offset for all PDSCH transmissions included in the multiple PDSCH transmissions is greater than or equal to a time duration associated with the enhanced QCL rules, and wherein the enhanced QCL rules associated with the multiple PDSCH transmissions are indicated by a TCI codepoint included in the single DCI message or are indicated by a TCI state of the single DCI message.

Aspect 109: The method of any of Aspects 107-108, wherein a scheduling offset for at least one PDSCH transmission included in the multiple PDSCH transmissions is less than a time duration associated with the enhanced QCL rules, and wherein the capability message includes an indication that the UE supports at least one of: a same one or more QCL assumptions being applied to all PDSCH transmissions included in the multiple PDSCH transmissions, or multiple QCL assumptions being applied to the multiple PDSCH transmissions.

Aspect 110: The method of any of Aspects 56-109, wherein the capability message includes an indication that the UE supports a single downlink control information (DCI) message scheduling multiple transport blocks for one or more scenarios, wherein the one or more scenarios include at least one of: single TRP communications, multiple DCI multiple TRP communications, single DCI multiple TRP communications, inter-cell multiple TRP communications, inter-cell beam management communications, or single frequency network based multiple TRP communications.

Aspect 111: An apparatus for wireless communication at a device, comprising a processor; memory coupled with the processor; and instructions stored in the memory and executable by the processor to cause the apparatus to perform the method of one or more of Aspects 1-55.

Aspect 112: A device for wireless communication, comprising a memory and one or more processors coupled to the memory, the one or more processors configured to perform the method of one or more of Aspects 1-55.

Aspect 113: An apparatus for wireless communication, comprising at least one means for performing the method of one or more of Aspects 1-55.

Aspect 114: A non-transitory computer-readable medium storing code for wireless communication, the code comprising instructions executable by a processor to perform the method of one or more of Aspects 1-55.

Aspect 115: A non-transitory computer-readable medium storing a set of instructions for wireless communication, the set of instructions comprising one or more instructions that, when executed by one or more processors of a device, cause the device to perform the method of one or more of Aspects 1-55.

Aspect 116: An apparatus for wireless communication at a device, comprising a processor; memory coupled with the processor; and instructions stored in the memory and executable by the processor to cause the apparatus to perform the method of one or more of Aspects 56-110.

Aspect 117: A device for wireless communication, comprising a memory and one or more processors coupled to the memory, the one or more processors configured to perform the method of one or more of Aspects 56-110.

Aspect 118: An apparatus for wireless communication, comprising at least one means for performing the method of one or more of Aspects 56-110.

Aspect 119: A non-transitory computer-readable medium storing code for wireless communication, the code comprising instructions executable by a processor to perform the method of one or more of Aspects 56-110.

Aspect 120: A non-transitory computer-readable medium storing a set of instructions for wireless communication, the set of instructions comprising one or more instructions that, when executed by one or more processors of a device, cause the device to perform the method of one or more of Aspects 56-110.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
at least one memory; and
at least one processor communicatively coupled with the at least one memory, the at least one processor configured to cause the UE to:
transmit a capability message, associated with one or more beam management features, indicating at least one of parameters associated with the one or more beam management features or whether the UE supports the one or more beam management features, the one or more beam management features including at least use of a unified transmission configuration indicator (TCI) state, wherein the capability message includes an indication of at least one of:
whether the UE supports TCI-specific power control parameters for the unified TCI state,
a supported time gap from a time at which a downlink control information (DCI)-based beam indication is received to a time at which a TCI state indicated by the DCI-based beam indication is applied, or
a quantity of configured or activated joint downlink and uplink TCI states supported by the UE; and
receive configuration information for at least one beam management feature, of the one or more beam management features, based at least in part on transmitting the capability message.

2. The UE of claim 1, wherein the DCI-based beam indication is associated with a first subcarrier spacing (SCS) and the TCI state is associated with a second SCS, and wherein the capability message includes an indication of:
a first time gap value that is based at least in part on the first SCS, and
a second time gap value that is based at least in part on the second SCS.

3. The UE of claim 1, wherein the TCI state is associated with multiple subcarrier spacings (SCSs) across one or more bandwidth parts or one or more component carriers, and wherein the supported time gap is based at least in part on a largest time gap among multiple time gaps associated with the multiple SCSs.

4. The UE of claim 1, wherein the quantity of configured or activated joint downlink and uplink TCI states is independent of configured or activated non-unified TCI states or spatial relations.

5. The UE of claim 1, wherein the quantity of configured or activated joint downlink and uplink TCI states is based at least in part on a quantity of configured or activated non-unified TCI states or spatial relations.

6. The UE of claim 1, wherein the one or more beam management features further include antenna-panel-specific uplink transmissions, and wherein the capability message includes an indication of whether the UE supports one or more sounding reference signal (SRS) ports being associated with multiple SRS resources or multiple SRS resource sets.

7. The UE of claim 6, wherein the capability message includes an indication of a supported application time for associating a resource indicator with at least one of: an SRS resource set identifier, an antenna panel group identifier, an SRS resource identifier, a panel identifier, or one or more supported parameters, for the antenna-panel-specific uplink transmissions.

8. The UE of claim 1, wherein the one or more beam management features further include multiple TRP beam failure recovery, and wherein the capability message includes an indication of one or more capabilities for the multiple TRP beam failure recovery.

9. The UE of claim 8, wherein the one or more capabilities for the multiple TRP beam failure recovery include a quantity of beam failure detection (BFD) reference signals that can be included in BFD reference signal resource sets associated with each downlink bandwidth part.

10. The UE of claim 8, wherein the one or more capabilities for the multiple TRP beam failure recovery include a quantity of beam failure detection (BFD) reference signals that can be included in a BFD reference signal resource set.

11. A base station for wireless communication, comprising:
at least one memory; and
at least one processor communicatively coupled with the at least one memory, the at least one processor configured to cause the base station to:
receive, from a user equipment (UE), a capability message, associated with one or more beam management features, indicating at least one of parameters associated with the one or more beam management features or whether the UE supports the one or more beam management features, the one or more beam management features including at least use of a unified transmission configuration indicator (TCI) state, wherein the capability message includes an indication of at least one of:
whether the UE supports TCI-specific power control parameters for the unified TCI state,
a supported time gap from a time at which a downlink control information (DCI)-based beam indication is received to a time at which a TCI state indicated by the DCI-based beam indication is applied, or
a quantity of configured or activated joint downlink and uplink TCI states supported by the UE; and
transmit, to the UE, configuration information for at least one beam management feature, of the one or more beam management features, based at least in part on receiving the capability message.

12. A method of wireless communication performed by a user equipment (UE), comprising:
transmitting a capability message, associated with one or more beam management features, indicating at least one of parameters associated with the one or more beam management features or whether the UE supports the one or more beam management features, the one or more beam management features including at least use of a unified transmission configuration indicator (TCI) state, wherein the capability message includes an indication of at least one of:
whether the UE supports TCI-specific power control parameters for the unified TCI state, a supported time gap from a time at which a downlink control information (DCI)-based beam indication is received to a time at which a TCI state indicated by the DCI-based beam indication is applied, or a quantity of configured or activated joint downlink and uplink TCI states supported by the UE; and receiving configuration information for at least one beam management feature, of the one or more beam management features, based at least in part on transmitting the capability message.

13. The method of claim 12, wherein the DCI-based beam indication is associated with a first subcarrier spacing (SCS) and the TCI state is associated with a second SCS, and wherein transmitting an indication of the supported time gap comprises transmitting an indication of:

a first time gap value that is based at least in part on the first SCS, and a second time gap value that is based at least in part on the second SCS.

14. The method of claim 12, wherein the TCI state is associated with multiple subcarrier spacings (SCSs) across one or more bandwidth parts or one or more component carriers, and wherein the supported time gap is based at least in part on a largest time gap among multiple time gaps associated with the multiple SCSs.

15. The method of claim 12, wherein the one or more beam management features further include antenna-panel-specific uplink transmissions, and wherein the capability message includes an indication of whether the UE supports one or more sounding reference signal (SRS) ports being associated with multiple SRS resources or multiple SRS resource sets.

16. The method of claim 12, wherein the one or more beam management features further include multiple TRP beam failure recovery, and wherein the capability message includes an indication of one or more capabilities for the multiple TRP beam failure recovery.

17. The method of claim 16, wherein the one or more capabilities for the multiple TRP beam failure recovery include a quantity of beam failure detection (BFD) reference signals that can be included in BFD reference signal resource sets associated with each downlink bandwidth part.

18. The method of claim 16, wherein the one or more capabilities for the multiple TRP beam failure recovery include a quantity of beam failure detection (BFD) reference signals that can be included in a BFD reference signal resource set.

19. The method of claim 16, wherein the one or more capabilities for the multiple TRP beam failure recovery include supporting two or more beam failure detection (BFD) reference signal sets for each downlink bandwidth part in a frequency band.

20. A method of wireless communication performed by a base station, comprising:

receiving, from a user equipment (UE), a capability message, associated with one or more beam management features, indicating at least one of parameters associated with the one or more beam management features or whether the UE supports the one or more beam management features, the one or more beam management features including at least use of a unified transmission configuration indicator (TCI) state, wherein the capability message includes an indication of at least one of:

whether the UE supports TCI-specific power control parameters for the unified TCI state, a supported time gap from a time at which a downlink control information (DCI)-based beam indication is received to a time at which a TCI state indicated by the DCI-based beam indication is applied, or a quantity of configured or activated joint downlink and uplink TCI states supported by the UE; and transmitting, to the UE, configuration information for at least one beam management feature, of the one or more beam management features, based at least in part on receiving the capability message.

\* \* \* \* \*